US011655904B1

(12) United States Patent
Chandler, Jr. et al.

(10) Patent No.: US 11,655,904 B1
(45) Date of Patent: May 23, 2023

(54) VALVE CONTROL SYSTEM

(71) Applicant: Chandler Systems, Inc., Ashland, OH (US)

(72) Inventors: William D Chandler, Jr., Ashland, OH (US); Aaron R Wolfe, Ashland, OH (US); Cody A Harbaugh, Ashland, OH (US); Patrick Frazer, Ashland, OH (US)

(73) Assignee: CHANDLER SYSTEMS, INC., Ashland, OH (US)

( * ) Notice: Subject to any disclaimer, the term of this patent is extended or adjusted under 35 U.S.C. 154(b) by 0 days.

(21) Appl. No.: 17/898,609

(22) Filed: Aug. 30, 2022

Related U.S. Application Data

(60) Provisional application No. 63/240,016, filed on Sep. 2, 2021.

(51) Int. Cl.
  *F16K 11/07* (2006.01)
  *C02F 1/42* (2023.01)
  *F16K 31/00* (2006.01)
  *F16K 31/06* (2006.01)

(52) U.S. Cl.
  CPC ............ *F16K 11/0716* (2013.01); *C02F 1/42* (2013.01); *F16K 31/001* (2013.01); *F16K 31/002* (2013.01); *F16K 31/0686* (2013.01); *C02F 2201/005* (2013.01); *C02F 2303/16* (2013.01)

(58) Field of Classification Search
  CPC .................. F16K 11/0716; F16K 11/07; C02F 2201/005; C02F 1/42; C02F 2303/16; C02F 2209/02; C02F 2209/03
  See application file for complete search history.

(56) References Cited

U.S. PATENT DOCUMENTS

| 4,659,463 | A  | * | 4/1987  | Chandler  | C02F 3/1294 210/264 |
| 7,008,530 | B2 | * | 3/2006  | Stocchiero | C02F 1/42 210/191 |
| 8,328,162 | B2 | * | 12/2012 | Prescott  | F16K 31/05 251/290 |

(Continued)

FOREIGN PATENT DOCUMENTS

CA        2583046 A1 * 9/2007 .......... B01J 49/0095

*Primary Examiner* — David Colon-Morales
(74) *Attorney, Agent, or Firm* — Ralph E. Jocke; Walker & Jocke

(57) ABSTRACT

An exemplary liquid treatment system includes at least one control valve in operative connection with a liquid treatment tank. The liquid treatment tank includes treatment material therein that is operative to treat the liquid that passes therethrough. The liquid treatment material is periodically regenerated to restore treatment function. At least one valve controller is operative to control the flow of liquid through the liquid treatment tank and to deliver treated liquid to liquid use devices. A further tank is operative to produce a saturated liquid solution of regeneration material that is usable to regenerate the liquid treatment material in the liquid treatment tank. The further tank includes at least one pressure sensor and at least one temperature sensor. The at least one pressure sensor and at least one temperature sensor are in operative connection with the at least one valve controller to determine that adequate saturated regeneration material is produced and delivered to the liquid treatment tank.

34 Claims, 45 Drawing Sheets

(56) References Cited

U.S. PATENT DOCUMENTS

| | | | |
|---|---|---|---|
| 8,529,768 B2* | 9/2013 | Chandler, Jr. | C02F 1/42 |
| | | | 210/687 |
| 8,945,384 B2* | 2/2015 | Gruett | B01J 49/85 |
| | | | 210/275 |
| 9,714,715 B2* | 7/2017 | Chandler, Jr. | C02F 5/00 |
| 9,758,387 B2* | 9/2017 | Gruett | B01J 49/85 |
| 10,011,500 B1* | 7/2018 | Chandler, Jr. | C02F 1/004 |
| 10,012,319 B1* | 7/2018 | Chandler, Jr. | F16K 11/0716 |
| 10,233,093 B2* | 3/2019 | Mueller | F16K 31/5286 |
| 10,479,699 B1* | 11/2019 | Chandler, Jr. | C02F 1/78 |
| 10,495,230 B1* | 12/2019 | Chandler, Jr. | C02F 5/00 |
| 10,745,297 B2* | 8/2020 | Liu | B01J 49/75 |
| 10,822,250 B1* | 11/2020 | Chandler, Jr. | F16K 31/5286 |
| 10,822,251 B1* | 11/2020 | Chandler, Jr. | C02F 1/42 |
| 10,829,388 B1* | 11/2020 | Chandler, Jr. | C02F 1/42 |
| 10,948,091 B1* | 3/2021 | Chandler, Jr. | F16K 31/5286 |
| 2014/0013839 A1* | 1/2014 | Chandler, Jr. | B01J 49/85 |
| | | | 73/290 R |
| 2016/0229704 A1* | 8/2016 | Bardwell | C02F 1/42 |
| 2017/0197854 A1* | 7/2017 | Chandler, Jr. | C02F 1/74 |

* cited by examiner

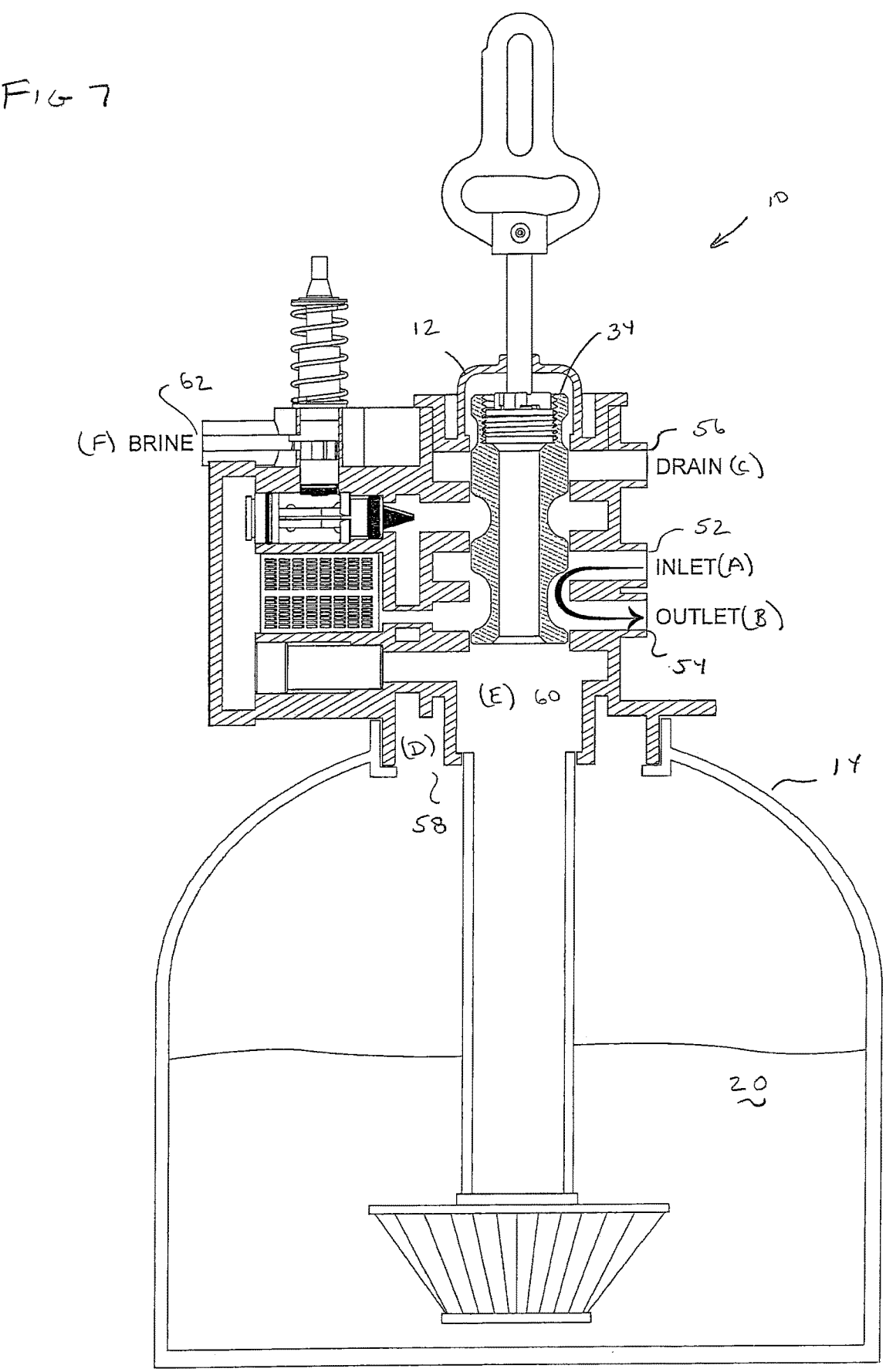

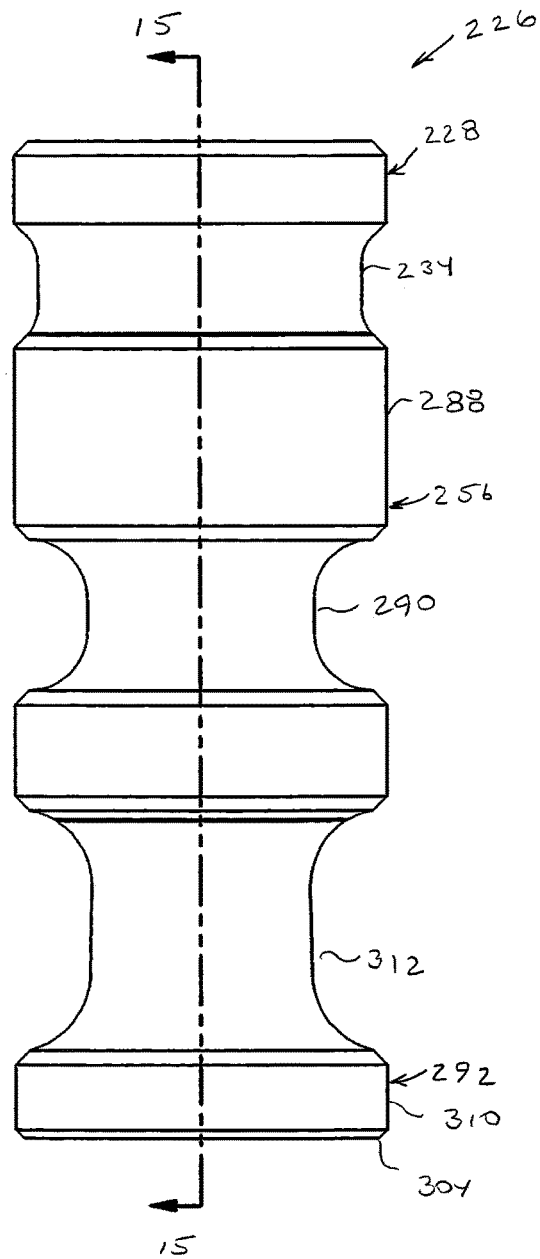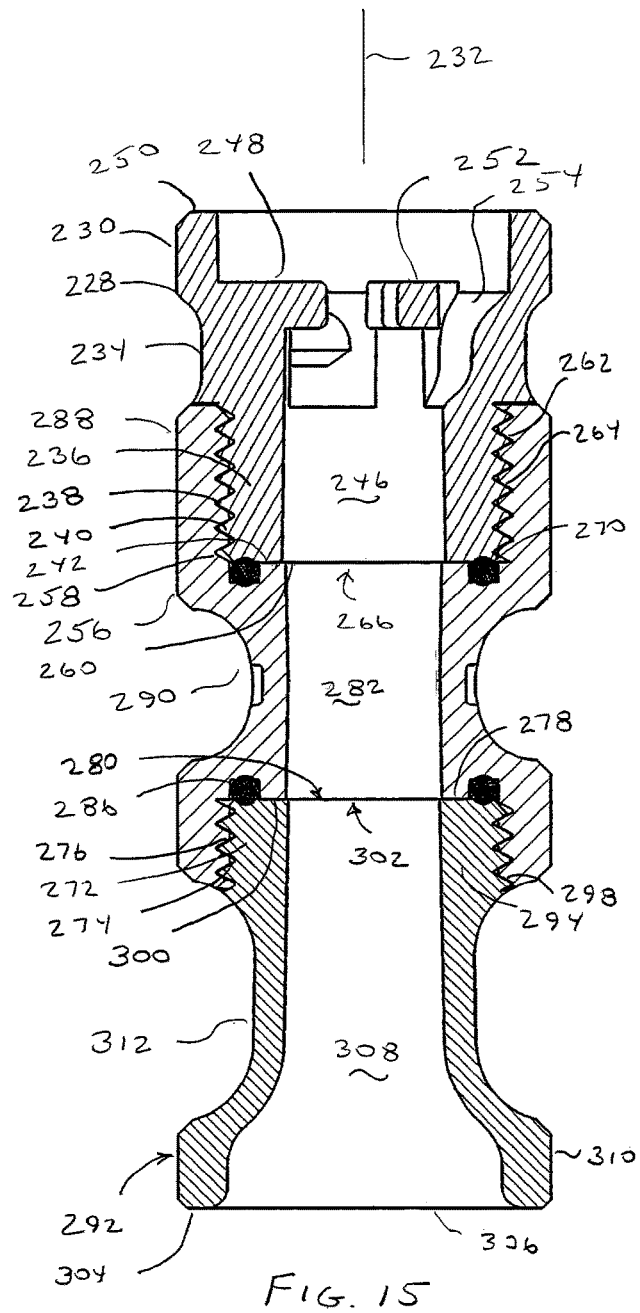
FIG. 14
FIG. 15

VALVE CONTROL SYSTEM

TECHNICAL FIELD

Exemplary arrangements relate to piston valves with annular passages which may be classified in CPC Class F16K 11/0716; US Class 137, Subclass 625.69. Exemplary arrangements relate to valve and system arrangements that are utilized in connection with devices which require fluid flow through multiple flow paths, for example, systems for water treatment.

BACKGROUND

Valve arrangements for controlling the flow of liquids may have numerous different forms. In situations where the liquid is required to be selectively directed to multiple different flow paths, such arrangements can be complex. Additional complexity may arise when different flow sequences and flow paths are required in connection with different process steps involving a liquid. Further complexity arises when liquids are required to be mixed with other fluids in connection with carrying out process flows. Additional complexity sometimes arises when multiple liquid treatment devices are utilized in a common system.

Valve and control system arrangements may benefit from improvements.

SUMMARY

Exemplary arrangements include a valve controller that operates to control a valve arrangement that is capable of selectively directing a liquid to multiple different flow paths. An exemplary arrangement includes a control valve having a valve body. An exemplary valve body includes an elongated longitudinal cylinder bore. The cylinder bore is in fluid communication with a plurality of different liquid ports which include inlet and outlet ports. The ports are in fluid connection with a plurality of respective generally annular passages extending adjacent to the bore within the valve.

An exemplary valve element comprising a piston is movably positionable longitudinally within the cylinder bore. The exemplary piston includes a profile configuration which includes a plurality of longitudinally disposed annular flow cavities. Selectively positioning the piston longitudinally in the bore through operation of a valve controller causes the different ports of the valve to be placed in fluid communication. The exemplary valve controller is operative to enable the valve to be used in conjunction with other process equipment for purposes of selectively directing the flow of liquid through the equipment in different flow paths during a plurality of process steps. Such process steps may include steps involving mixing of the liquid with other fluids and materials as required. The exemplary valve further includes the capability to selectively shut off liquid flow and to provide bypass flow in order to stop and bypass the flow of liquid from certain process equipment associated with the valve.

Exemplary arrangements specifically relate to a water control valve and valve controller that is selectively operative to enable the removal of undesirable chemicals from water. The exemplary valve is operative to enable flow conditions to be changed to regenerate an ion exchange resin material in a tank when necessary to maintain optimal performance of the system in removing undesirable substances. Exemplary arrangements further provide a valve that includes the functionality of an integrated water shutoff valve and a bypass valve. This exemplary valve arrangement eliminates the need for separate valves and piping to accomplish such functions. Such capabilities also enable systems that include a plurality of liquid treatment tanks to have one or more tanks in a service condition while one or more other tanks are in other conditions.

Further exemplary arrangements include at least one valve controller for operation of the exemplary valve or valves. Other exemplary arrangements relate to liquid treatment systems.

Numerous other useful arrangements and features are described in connection with the exemplary arrangements discussed herein.

BRIEF DESCRIPTION OF DRAWINGS

FIG. 7 is a view similar to FIG. 1 which shows the flow of liquid through the treatment tank bypassed through the valve.

FIG. 14 is a side view of the exemplary alternative piston of the valve shown in FIG. 13.

FIG. 15 is a side cross-sectional view of the alternative piston taken along line 15-15 in FIG. 14.

DETAILED DESCRIPTION

The exemplary arrangements described herein may be used in conjunction with the components, features, systems and methods described in one or more U.S. patent application Ser. No. 14/698,381 filed Apr. 28, 2015; U.S. Pat. No. 14,698,399 filed Apr. 28, 2015; Ser. No. 15/590,733 filed May 9, 2017; Ser. No. 16/009,376 filed Jun. 15, 2018; Ser. No. 15/960,955 filed Apr. 24, 2018; 62/119,507 filed Feb. 23, 2015; 62/069,897 filed Oct. 29, 2014; 61/986,423 filed Apr. 30, 2014; Ser. No. 14/024,918 filed Sep. 12, 2010; 61/607,343 filed Mar. 6, 2012; 61/513,450 filed Jul. 29, 2011; 61/494,449 filed Jun. 8, 2011 and/or U.S. Pat. Nos. 8,535,540; 9,714,715; 9,970,558; 10,012,319; 10,011,500; 10,012,319; 10,479,699; 10,494,267; 10,494,268; 10,495,230; 10,590,008; 10,633,262; 10,822,250; 10,822,251; 10,822,252; 10,822,252; 10,829,388; 10,865,122; 10,865,123; 10,865,124; and 10,948,091 the disclosures of each of which are incorporated herein by reference in their entirety.

Figure 1:
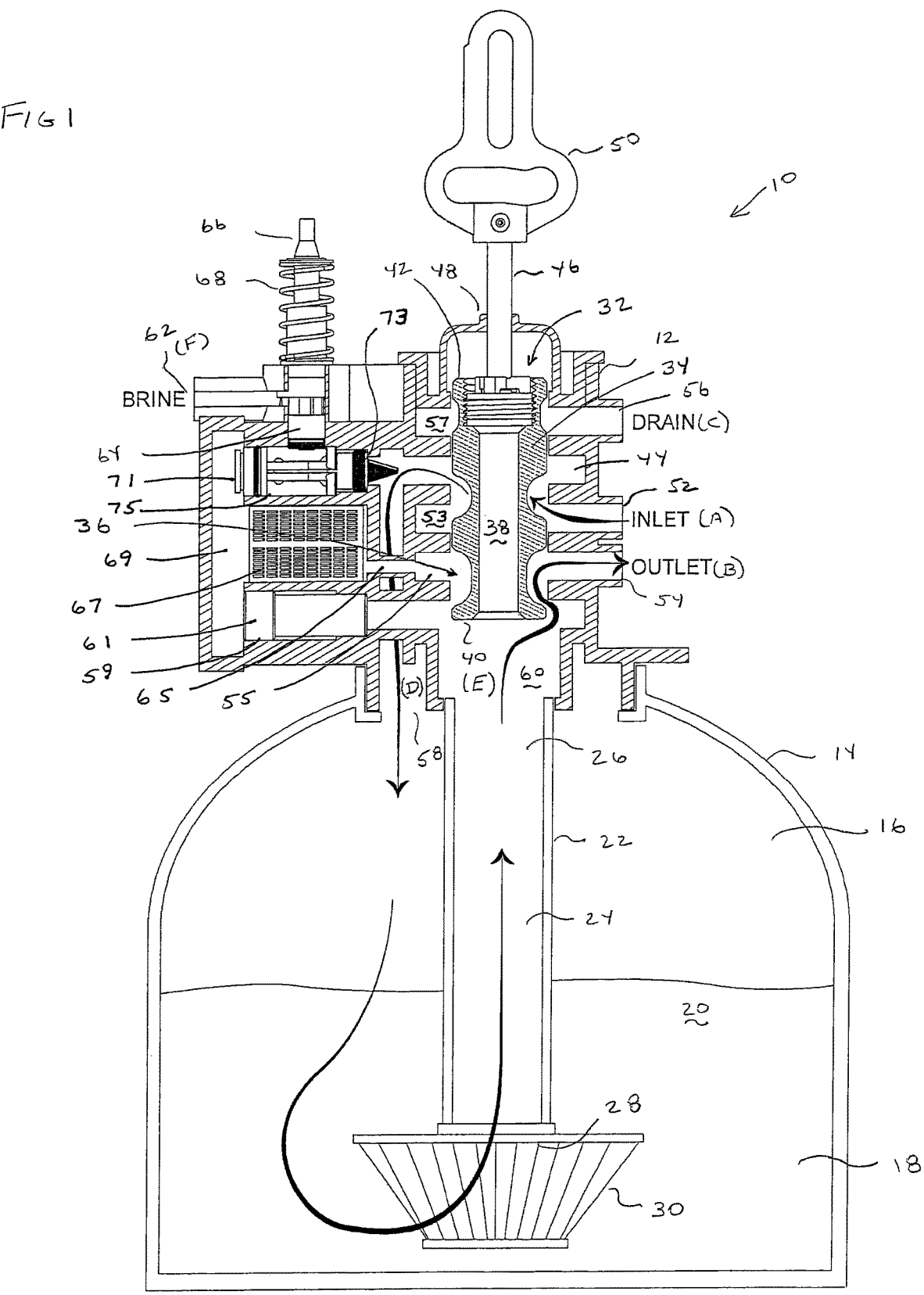
FIG. 1 is a schematic cross-sectional view of an exemplary control valve including a movable piston and a plurality of annular flow passages configured for use in connection with a water treatment tank.

Referring now to the drawings and particularly FIG. 1, it is shown therein an exemplary control valve generally indicated 10. Control valve 10 includes a valve body 12. The valve body 12 is schematically represented and is comprised of one or more parts which function in the manner that is represented schematically in FIGS. 1-8.

The exemplary valve is used in operative connection with a water treatment tank 14. Tank 14 of the exemplary arrangement is a water softener tank that extends generally vertically with the valve 10 positioned at the top thereof via a threaded or other releasable connection. It should be appreciated that the water treatment application is only an exemplary use for the control valve configuration and that the proportions of the tank as shown in the Figures are not necessarily representative of tanks that may be utilized in connection with the control valve described. Rather, in most water treatment arrangements the exemplary valve will be used with a vertically elongated tank which is many times longer than the height of the valve body. Further the exemplary valve may be used in conjunction with other types of processing systems and equipment.

The exemplary water treatment tank includes a top portion 16 and a bottom portion 18. The exemplary tank includes a water treatment material 20 therein. In some exemplary arrangements, the water treatment material 20 comprises resin material that is suitable for ion exchange with mineral laden water that is treated by flowing therethrough. Such resin material may be comprised of plastic beads or zeolite material that has a negative charge. The exemplary operation of the water treatment tank includes capturing ions in water that make the water "hard" such as calcium and magnesium ions and replacing such ions in the water with ions that are not undesirable such as sodium ions. In other arrangements other types of treatment materials other than ion exchange resin materials may be used. These materials may include absorbent materials, filtration materials, catalytic materials, dissolving materials, reacting materials or other types of materials. Of course it should be understood that the types of liquid processing, treatment materials and methods described are exemplary and in other arrangements, other types or additional types of equipment, materials, structures and elements for treating water or other liquids may be used.

In the exemplary arrangement, the tank 14 includes a central tube 22 extending vertically therein. Tube 22 includes an internal tube conduit 24. The exemplary tube conduit extends between a top end 26 of the tube and a bottom end 28 of the tube. The bottom end of the tube is fluidly open to the area of the tank that includes the resin material. The bottom end of the tube is in operative connection with a strainer 30. Strainer 30 operates to prevent the resin from entering the fluid conduit inside the tube.

The exemplary valve body includes at least one valve element that selectively places ports of the valve in fluid communication. An exemplary valve body includes an elongated cylindrical bore 32. The bore 32 is elongated in a longitudinal direction which is the vertical direction as the valve is shown in FIG. 1. The longitudinal direction may alternatively be referred to as an axial direction herein. The bore 32 has a movable cylindrical piston 34 therein. The exemplary piston 34 includes on its outer circumferential surface, a plurality of longitudinally spaced recessed annular flow cavities such as cavity 36. The exemplary piston 34 also includes a longitudinal flow cavity 38. Longitudinal flow cavity 38 extends through the piston from a first longitudinal end 40 to a second longitudinal end 42.

The exemplary valve body further includes a plurality of annular flow cavities 44 for example, that extend in at least partially surrounding relation of the bore 32. Although not shown in the drawings of this arrangement, but as described in the incorporated disclosures, exemplary arrangements include resilient seals that operatively extend between the piston and the walls of the valve body that extend radially inward toward the bore. The resilient seals are operative to prevent fluid flow between the radially outwardly disposed annular surfaces of the piston and the annular radially inward extending walls bounding the flow cavities of the valve body. In exemplary arrangements, the seals are configured to prevent fluid flow other than through flow cavities that are in operative fluid connection through the selective longitudinal positioning of the piston as described herein.

In the exemplary arrangement, the piston 34 is in operative connection with a piston rod 46. The piston rod 46 is operatively connected to the second longitudinal end of the piston. The exemplary piston rod is operatively connected to the piston through a releasable threaded connection as shown. In the exemplary arrangement the threaded connection includes a coupling with fluid openings therethrough that enables the flow of liquid through the longitudinal flow passage. The coupling also enables the piston to be removed and replaced with a piston of a different configuration.

The exemplary piston rod extends through an opening 48 in the valve body. A suitable resilient seal is provided adjacent the opening so as to prevent the escape of liquid from the inside of the valve body around the piston rod. The piston rod is operatively connected at the end outside the valve body to an actuator bracket 50. The actuator bracket 50 is in operative connection with a valve controller of a type later described herein and/or as described in the incorporated disclosures. The valve controller including at least one motor thereof is operative to selectively longitudinally move the actuator bracket and the piston rod so as to selectively longitudinally position the piston to provide different flow conditions. Of course it should be understood that this valve element configuration is exemplary and that in other arrangements other at least one valve element configurations such as rotating elements, shutter elements, gates, balls or other types of fluid flow directing elements may be used.

The exemplary valve body includes a plurality of ports. The ports include an inlet port 52 which is designated with the letter A for purposes of brevity. The exemplary inlet port is in operative connection with a source of untreated water. In exemplary arrangements, the source of untreated water may be a well, reservoir or other source of water that requires the treatment provided by passing the water through the water treatment material tank. In exemplary arrangements the untreated water is provided at an elevated pressure to the inlet port 52. This is accomplished through the use of a pump, the head of liquid in a tank or reservoir, or other suitable method for providing the water to the inlet port at a positive pressure. As represented schematically in Figures, the inlet port A is in operative fluid connection with an annular flow cavity 53 within the exemplary valve body.

The valve body further includes an outlet port 54. Outlet port 54 which is designated B for purposes of brevity, is configured to be in operative connection with one or more devices that use treated water. For example, the outlet port 54 may be fluidly connected to a piping system within the building in which the water treatment equipment is installed. In such an exemplary system the exemplary outlet port B is in operative connection with treated water use devices such as faucets, showers, hot water tanks, etc. which deliver, store and/or use water that has been treated by having passed through the tank. Of course this application is exemplary. As represented in Figures, the outlet port B is in operative connection with an annular flow cavity 55 within the valve body that is longitudinally disposed from the annular cavity in the valve body that is connected to Port A.

The exemplary valve body further includes a drain port 56. Drain port 56 which is designated C for purposes of brevity is configured in the exemplary system to be in operative connection with a drain which receives waste water. The drain port 56 is in operative connection with an annular flow cavity 57 within the valve body as represented in the Figures. Further it should be understood that although the drain port C is configured to be in connection with a wastewater drain, the water passed from the exemplary drain port may be captured for treatment and recycling or for other suitable purposes.

The exemplary valve body further includes a first tank port 58. The first tank port 58 is labeled D for purposes of brevity herein. In the exemplary arrangement the first tank port D is fluidly connected through the valve to a first area at the top of a tank. This first area is on an upper side of the resin material 20 in the tank. In the exemplary arrangement the first tank port 58 is above the level of the resin material 20 as shown. Of course it should be understood that this arrangement is exemplary and other arrangements of components may be used.

The exemplary valve body further includes a second tank port 60. The second tank port 60 which is labeled E for purposes of brevity, is in operative connection with the tube conduit 24 within the tube 22. The second tank port 60 is in operative fluid connection with the lower area of the tank through an opening at the bottom end 28 of the tube and the strainer 30. The second tank port 60 is in operative fluid connection with the lower side of the resin material.

The exemplary valve body further includes a further port that in the exemplary system is referred to as brine port 62. Brine port 62 which is labeled F for purposes of brevity, is configured for operative connection with a brine tank. The brine tank of exemplary arrangements may provide a slurry of water softener salt and water which produces a brine solution which is utilized for regenerating the resin material in the tank in a manner that is later discussed. The exemplary brine port 62 is in operative connection with a movable valve member 64. The movable valve member 64 is movable within the valve body and depending on the position of the movable valve member, is operative to place the brine port 62 in fluid connection with at least one fluid cavity within the valve body. In this exemplary arrangement a moveable plunger 66 is in operative connection with the at least one movable valve member 64. A spring 68 is in operative connection with the plunger and serves to bias the plunger upwardly from the valve body as shown so as to close the valve member 64. As later explained in detail, the at least one motor of the valve controller is operative to selectively move the plunger 66 so as to operatively connect the brine port to flow cavities within the valve for purposes of delivering treated water out of the valve from the brine port and for receiving brine material from the brine tank.

In the exemplary arrangement the valve includes an injector 71. The injector 71 is positioned in a passage 75. The injector further includes a check valve 73. The check valve 73 enables flow from the injector to the flow cavity 44 and prevents flow in the opposite direction. In the exemplary arrangement the injector is removably positionable in the passage 75.

The exemplary valve body further includes a passage 59. In the configuration shown in FIG. 1, the passage 59 is closed by a removable plug 61.

The exemplary valve body further includes a passage 65. Passage 65 is fluidly connected with annular cavity 55. The valve body further includes a chamber 69. Chamber 69 is in fluid communication with passage 65. A screen 67 is positioned fluidly intermediate of the passage 65 and the chamber 69. Chamber 69 is in fluid connection with the injector 71.

The exemplary arrangement of the control valve of FIG. 1 operates in an exemplary system in a manner similar to that described in greater detail in the incorporated disclosures. A valve controller that is in operative connection and with the actuator bracket moves the bracket along the longitudinal direction which is the vertical direction as shown in FIG. 1 and selectively axially positions the piston to achieve a plurality of flow conditions along different flow paths through flow passages in the valve. In an exemplary first condition of the valve represented in FIG. 1, untreated water is received into the valve through the inlet A. Water passes through the valve cavities of the piston and the valve body as represented by the arrows shown in FIG. 1. The untreated water is in fluid connection through the valve with the first tank port D. In this flow condition the check valve 73 prevents flow of untreated water through the injector 71 to cavity 55 and the outlet B. Untreated water flows from the first tank port downward through the top of the tank and into the resin material 20. In some exemplary arrangements the top of the tank may include a gas such as air or oxygen to react with contaminant materials in the incoming water to produce reaction products that can be more readily separated from the water. In the exemplary arrangement the water passing through the resin material undergoes an ion exchange in which calcium, magnesium and other positively charged ions in the water are captured by the resin and replaced in the water with sodium ions which are present in the resin.

In the condition shown in FIG. 1 the water that has been treated by passing downward through the resin passes through the strainer 30 and travels upwardly through the tube conduit 24 to the second tank port E. From this position the now treated water passes through the fluid passages in the valve body from the second tank port E to the treated water outlet port B. The treated water is passed from the water outlet B to piping and to the devices which use the treated water.

Figure 2:
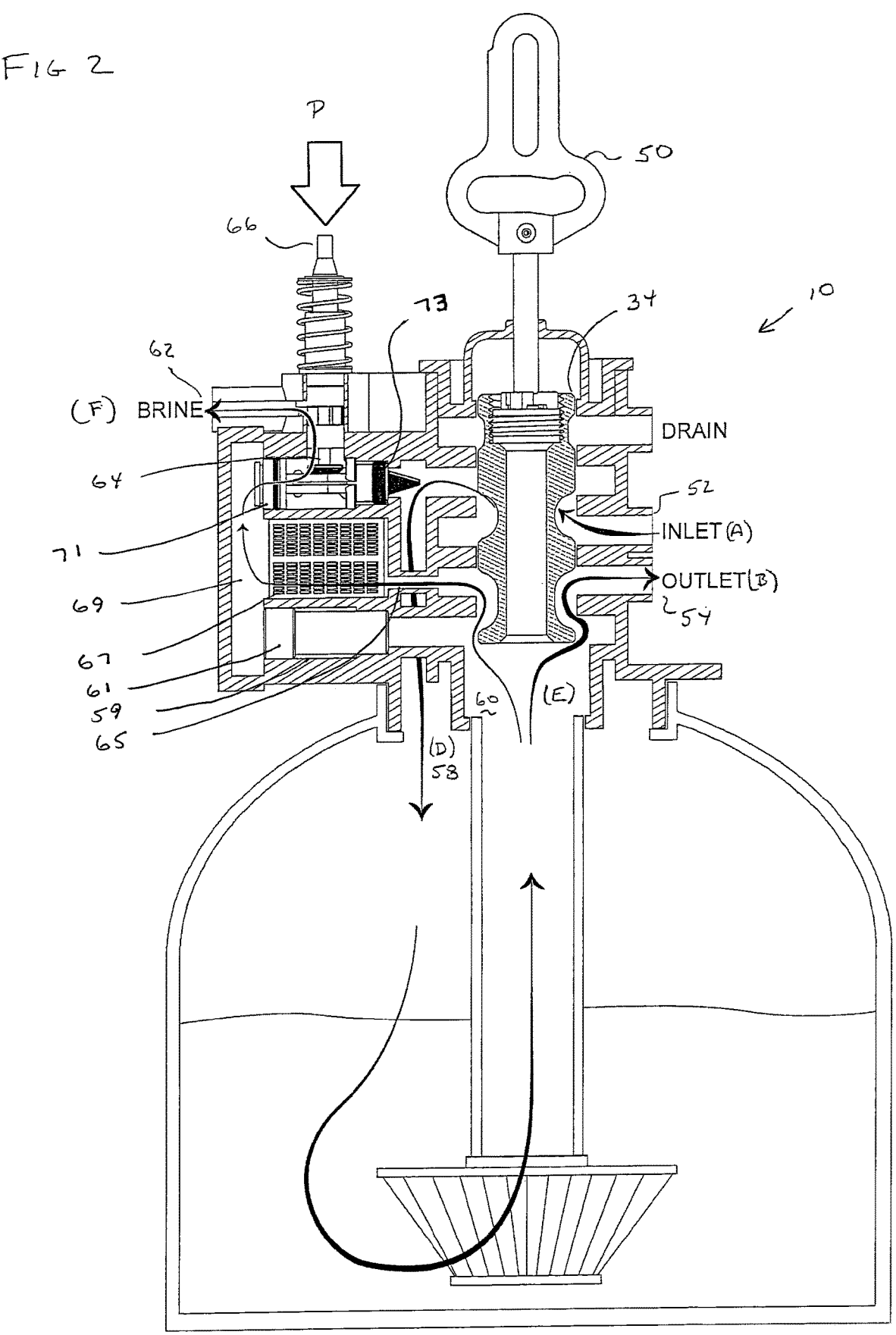
FIG. 2 is a view similar to FIG. 1 which shows the control valve in a different operating condition.

In the exemplary arrangement the valve controller operates the valve to deliver treated water from the brine port F of the valve to the brine tank at selected appropriate times. This is done in the exemplary system so that the brine solution is available for delivery to the valve 10 and the resin material 20 when required. In order to provide available brine, the valve controller is operative to depress plunger 66 downward as represented by arrow P as shown in FIG. 2. Moving the plunger downward is operative to move the movable valve member 64. Movement of the valve member 64 enables water that has been treated by passing through the resin and received at the second tank port E to be passed out of the valve through the brine port F.

In this valve configuration, the treated water passes through the passage 65, through the screen 67 and into the chamber 69. From the chamber 69 the water flows into the interior of the body of the injector 71 (later described in detail) and to the brine port F past the open valve element 64. It should be noted that the check valve 73 prevents the flow of untreated water into the body of the injector 71. Further, passage 59 which has a configuration similar to the passage which includes the injector body 71, is fluidly blocked by the plug 61 so as to require treated water to flow through the passage 65, the screen 67 and chamber 69 into the injector body.

In the exemplary system treated water is passed out through the brine port for a sufficient time to enable production of suitable brine solution by mixing of the water with water softener salt that has been placed in the brine tank. The production of the brine and the measurement of the salt levels and other features associated with the brine tank are discussed in the incorporated disclosures. Arrangements for the production of brine are further discussed herein. As can be appreciated from FIG. 2, with the piston 34 positioned as shown, while treated water is being delivered to the brine tank the exemplary valve continues to deliver treated water from the second tank port E of the tank to the water outlet B.

After a period of operation of the exemplary system, the amount of water that has been treated by passing through the resin material causes the ions in the resin material to change their character to the point that the undesirable calcium and magnesium ions in the untreated water are no longer satisfactorily replaced through the ion exchange with the more desirable sodium ions. When this condition occurs, the resin treatment material can be cleaned and regenerated in the manner discussed in the incorporated disclosures and as described herein, so as to return the resin material to satisfactory performance. In various arrangements the need to regenerate the resin may be determined on a timed basis, on the basis of the amount of water that has passed through the tank, or based upon sensing the properties of the treated water that has been delivered from the outlet B through suitable electronic sensors. This may be done in some arrangements through operation of a master controller as described in the incorporated disclosures. As can be appreciated, in exemplary systems while the resin in the water softener is being regenerated, treated water may be supplied to the devices and systems that use treated water from a storage tank holding a supply of treated water or by treating the water with another water treatment device.

Figure 3:
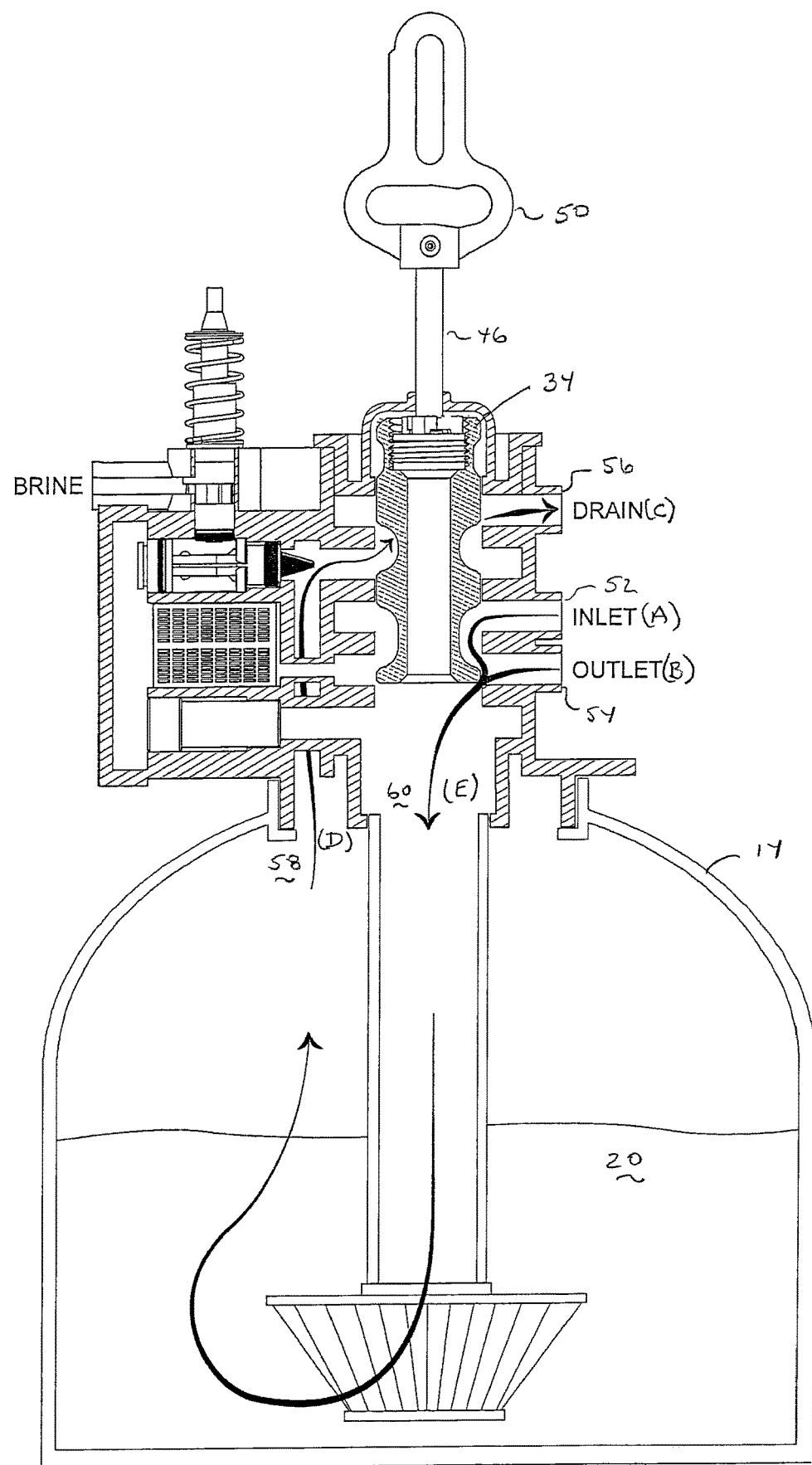
FIG. 3 is a view similar to FIG. 1 which shows the control valve in yet another operating condition.

Operation of the exemplary valve in a first step in a treatment media regeneration process is represented in FIG. 3. As shown in FIG. 3, the piston 34 of the valve is moved so as to be disposed upward from the positions shown in FIGS. 1 and 2. This is done in the exemplary arrangement by moving the piston in the longitudinal direction by movement of the actuator bracket 50 and the piston rod 46.

Movement of the piston 34 to the position shown in FIG. 3 causes the inlet and outlet ports A and B of the valve to be in fluid connection with the second tank port E. Further in this position of the piston, the first tank port D is in operative connection through the valve body with the drain C. As represented by the water flow arrows shown in FIG. 3, the untreated water at the elevated pressure and some treated water which can be drawn back through the water outlet port B, pass through the valve to the second tank port E and downward through the tube 22. The water passes through the bottom of the tube and outwardly through the strainer. The water is dispersed and flows upwardly through the resin 20 so as to backwash the resin. The backwash represents a reversal from the normal flow during water treatment and causes particles and other materials that have been captured in the resin to flow upward in the tank.

The water flowing upward in the tank flows into the first tank port D and through the valve body to the drain port C. As a result, the particulates and other contaminants that can be dislodged and removed by backwashing the resin are caused to flow out the top of the tank, through the valve and are discharged to a suitable waste drain through the drain port C. The backwash portion of the cycle continues for a suitable time in accordance with the programming of the valve controller or associated master controller to achieve the release of the majority of the particulates and contaminants that have been captured in the resin material. The backwash operation may be continued on a timed or other basis sufficient to complete the operation.

Figure 4:
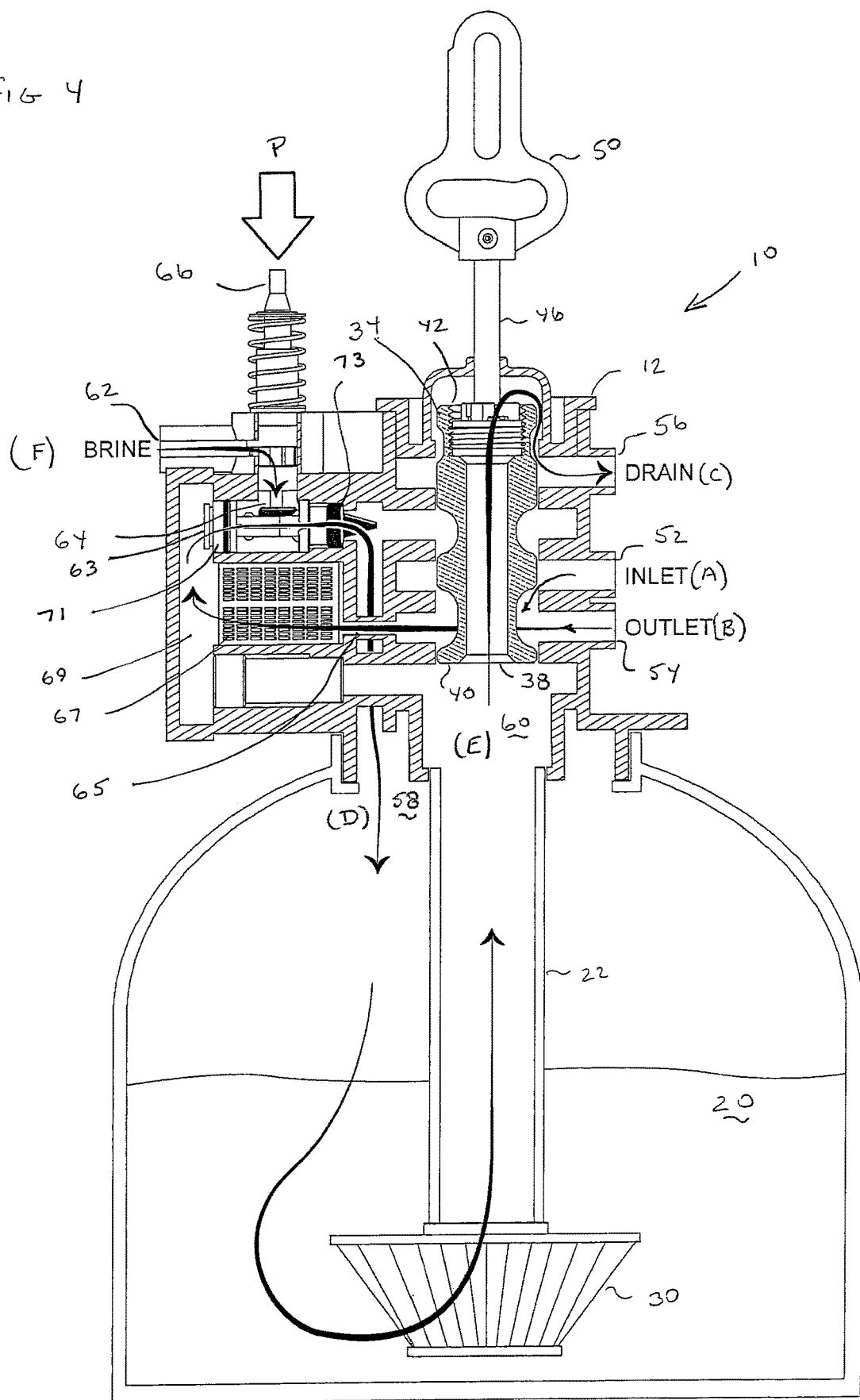
FIG. 4 is a view similar to FIG. 1 which shows the control valve in another operating condition.

At the conclusion of the backwash function, the exemplary valve controller is operative to change the condition of the valve to that shown in FIG. 4. In the axial position of the piston 34 shown in FIG. 4, water under higher pressure from the inlet A as well as water pulled from the outlet B passes through the valve body to the first tank port D. In this condition, the exemplary valve controller is operative to depress the plunger 66 and move the movable valve member 64 so as to open a flow path in the valve body. This causes the brine port F to enable brine solution to be received by the valve from the brine tank, into the flow of water as it moves through the valve body and to the first tank port D at the top of the tank. In exemplary arrangements brine delivered to the brine port F may be pressurized through operation of a pump or similar device so as to facilitate the delivery of the brine into the valve body. In other arrangements, the brine may be moved into the flow of water through venturi action or other suitable action which is suitable for causing the brine to be moved into the brine port F and mixed in the water that is flowing through the flow cavities of the valve body 12, such as in arrangements later discussed herein.

In the exemplary arrangement, treated water flows through the passage 65 and the screen 67 into the chamber 69. From the chamber, the water flows through an opening 63 and into the interior of the body of the injector 71. The incoming brine from brine port F mixes with the water in the interior of the injector body and flows in the direction in which flow is permitted past the check valve 73 at the inward end of the injector 71. Once the brine containing water passes the check valve 73, it flows through an interior passage of the valve to the first tank port D.

In the position of the exemplary valve element and valve controller represented in FIG. 4, water including the fresh water softener salt solution passes through the area at the top of the tank and passes downward into the resin material 20. The ions from the brine material flow into and migrate in the resin material, regenerating the supply of sodium ions therein and displacing the calcium, magnesium and other ions currently bonded to the resin particles therein. The water and the ions that are displaced from the resin material pass through the strainer 30 at the bottom of the tube 22 and flow upwardly to the second tank port E at the bottom of the valve. In this position of the valve piston 34 the water passing upwardly through the tube 22 passes through the longitudinal flow cavity 38 of the piston, through the flow cavity at the top of the valve body and out the drain port C. As a result, undesirable material is washed out of the resin and moved to the drain port.

Figure 5:
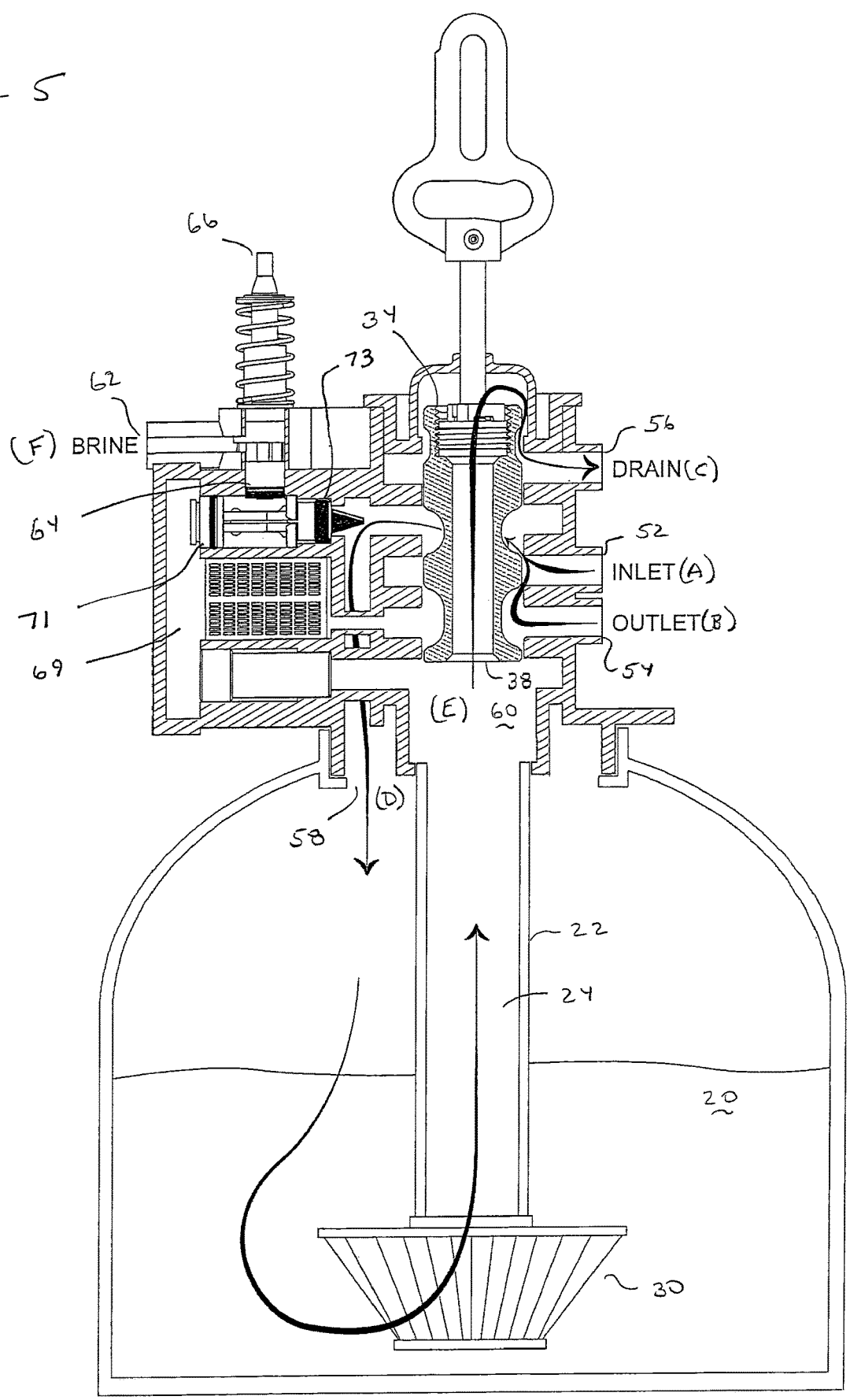
FIG. 5 is a view similar to FIG. 1 which shows the control valve in another operating condition.

The condition of the valve represented in FIG. 4 is maintained through operation of the valve controller and/or a master controller in communication therewith for a period of time sufficient to draw an amount of brine into the tank that will regenerate the resin. Thereafter the exemplary valve controller operates to cause the plunger 66 to no longer be positioned to cause the movable valve member 64 to enable brine to enter the valve body through the brine port F. As represented in FIG. 5, the at least one motor of the valve controller changes the position of piston 34 such that untreated water from the inlet A and water otherwise received from the outlet B pass through the valve body to the first tank port D. The check valve 73 of the injector 71 prevents flow to chamber 69 through the injector. The water which no longer has the new brine mixed therein passes downwardly through the bed of resin material 20 through the strainer and into the tube conduit 24 within the tube 22.

In this condition of the exemplary valve, the water from the tube conduit passes upwardly through the tube 22 and the second tank port E, through the longitudinal flow cavity 38 in the piston and outwardly to the drain port C of the valve body. Such flow through the resin provides a rinse function which is operative to cause any remaining regenerate brine material in excess of that which is captured within the resin material to be rinsed out and passed to the drain. The condition of the valve shown in FIG. 5 is maintained through operation of the valve controller and/or a master controller for a sufficient time to clear the excess regenerate material from the tank. This may be done in some arrangements on a timed basis or other basis sufficient to accomplish the function.

Generally after regenerating the resin material as just described, the exemplary valve is returned by the valve controller to the flow condition which is shown in FIG. 1. In this condition, untreated water enters the inlet A of the valve body, passes through the valve body to the first tank port D. The water then passes through the resin 20 where it undergoes water treatment to remove undesirable materials and ion exchange is accomplished. The treated water then passes upwardly through the tube 22 to the second tank port E. The treated water then passes out of the valve body through the outlet B through which it is delivered to the water distribution system in the building and the water use devices. Generally the valve remains in this condition until the cycle for regenerating the resin material needs to be repeated.

It should be noted that in the exemplary arrangement the position of the piston 34 in the rinse position of the valve shown in FIG. 5, is immediately linearly longitudinally adjacent to the piston position 34 when the valve is in its usual service mode of operation in which untreated water is treated by flowing through the resin in the resin in the tank 14. This configuration minimizes the introduction of untreated water or other undesirable material when the condition of the valve is changed between the last step in which the remaining regenerate material is rinsed and removed from the tank, and the valve causes the system to go back into normal service mode. Of course it should be understood that this approach is exemplary and in other arrangements other approaches may be used.

The exemplary control valve 10 further provides the function of a valve shutoff which in the exemplary system separates the water treatment tank 14 from the untreated water inlet A. This function can avoid the need for an external shutoff valve to prevent untreated water from flowing to the control valve and the tank.

Figure 6A:
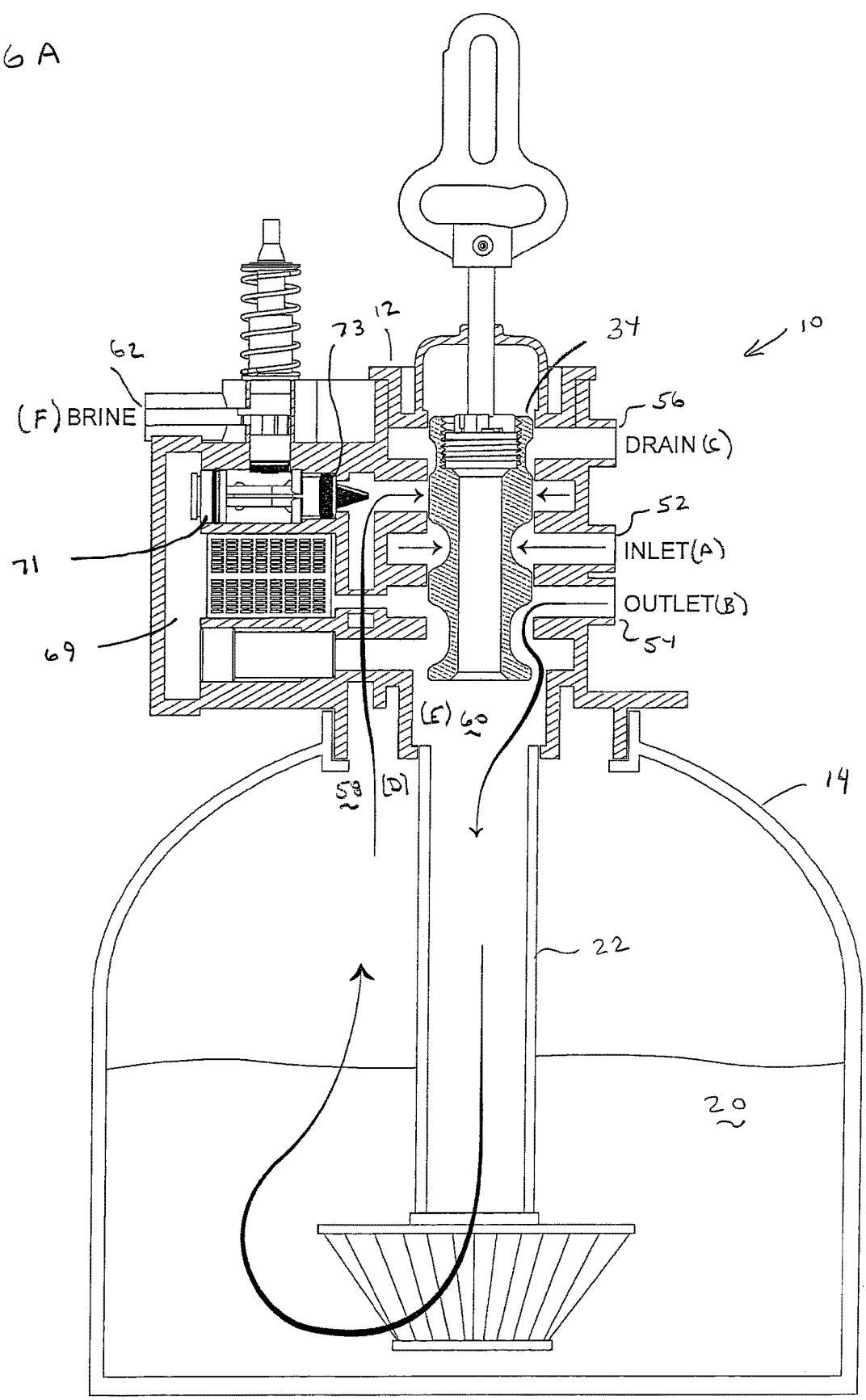
FIG. 6A is a view similar to FIG. 1 showing the control valve in another operating condition in which flow of liquid into the valve is shut off and pressure on the outlet port is maintained.

FIG. 6A represents the condition of the exemplary valve 10 in a shutoff condition. As can be appreciated in the exemplary system when it is desired to shut off the flow of untreated water to the valve and to the tank, the valve controller operates to cause the piston 34 to be moved axially to the position shown in FIG. 6A. In this position of the piston 34, the flow of untreated water into the inlet A is stopped by the axial position of the piston in which the annular flow cavities then connected to the inlet are not open to any other flow cavities within the valve.

As represented in FIG. 6A, the first tank port D is likewise in communication with a flow cavity within the valve that is not fluidly connected to any other flow cavity. In this position of the piston, the water outlet B is in operative connection with the second tank port E. Water pressure is effectively maintained at the outlet B unless a water use device is turned on which reduces such pressure. As a result, flow is effectively discontinued on a selective basis through actuation of the valve controller. Of course it should be understood that this particular configuration is exemplary and in other arrangements, other configurations may be utilized for purposes of shutting off the flow between the water inlet A and the water outlet B.

Figure 6B:
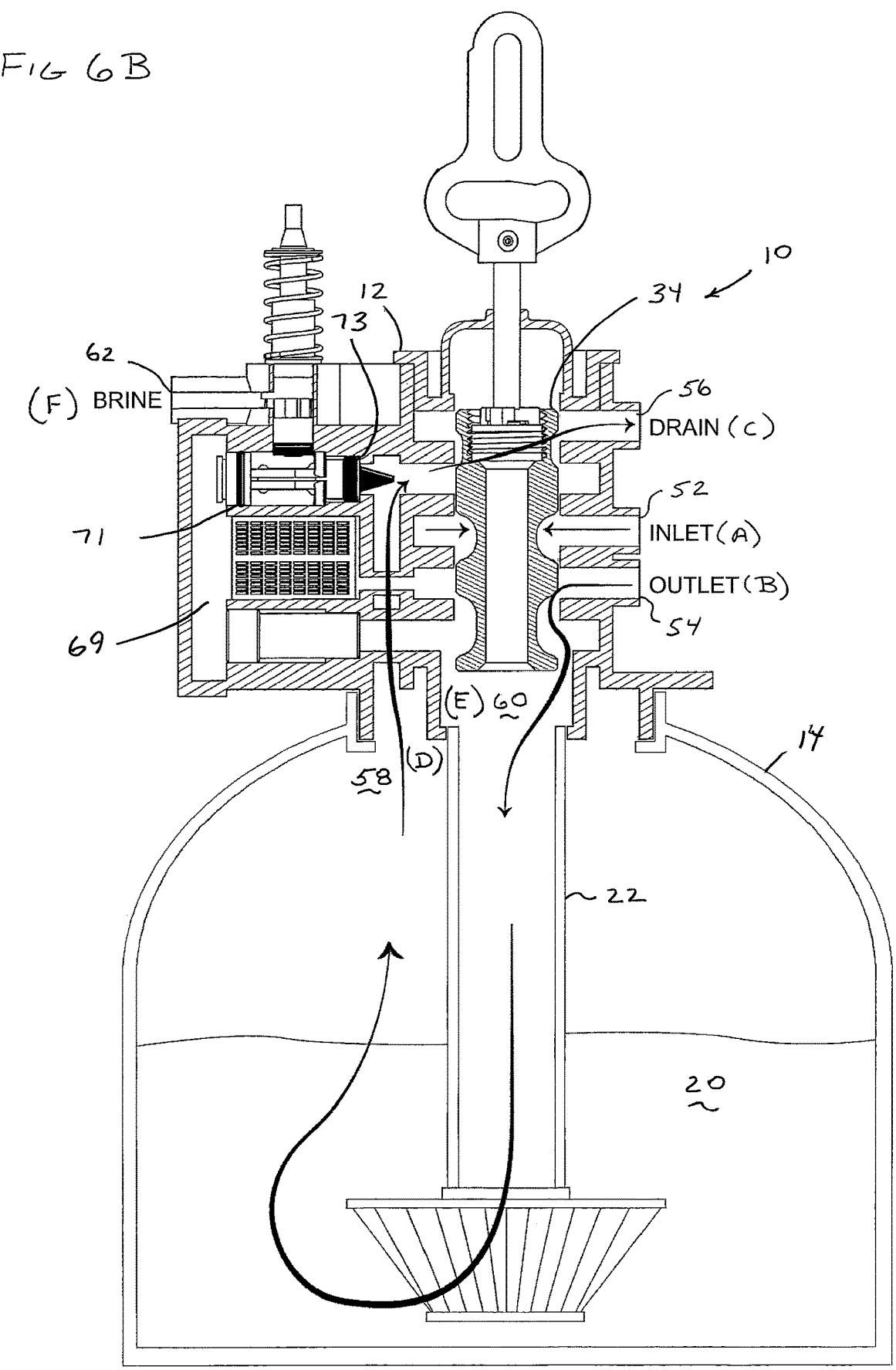
FIG. 6B is a view similar to FIG. 1 showing the control valve in another operating condition in which flow of liquid into the valve is shut off and pressure on the outlet port is relieved.

FIG. 6B represents the exemplary valve in a further shutoff condition. In the shutoff condition shown in FIG. 6B, the exemplary piston 34 is in a somewhat different longitudinal position from the position of the piston in FIG. 6A. In the position shown in FIG. 6B, the flow of untreated water into inlet A is stopped and untreated water supplied at the inlet does not flow through the valve to any other port.

However, in the position of the piston 34 in FIG. 6B fluid pressure at outlet port B is relieved to the drain port C. This is achieved by having fluid ports B, E, D and C in fluid communication. In this position of the valve element almost all the fluid pressure is released from the outlet port C as well as from the lines and devices of the water delivery system to which the valve is connected.

In some exemplary arrangements the valve may be placed with the valve element in the shut off position shown in FIG. 6A or FIG. 6B depending on the circumstances under which flow through the valve is shut off. For example in systems for water management such as described in the incorporated disclosures, the valve may be controlled by a master controller and/or a slave controller to be in the shutoff condition with pressure maintained on the outlet port B when the fluid flow is to be shut off, but the delivery system is to remain pressurized at the normal level. In such circumstances the exemplary valve is configured as shown in FIG. 6A. However, if the water management system operates in response to conditions where the outlet port and water distribution system is programmed to be depressurized, the controller operates to configure the exemplary valve in the shutoff position shown in FIG. 6B. This may be done for example, when a probable system leak is detected. In such circumstances the central master controller of the water management system may operate to minimize water damage, by not only shutting off further incoming water, but also by relieving pressure at the outlet port B so that water in the distribution system can pass out of the valve to the drain C. This may reduce the amount of water which comes out of the system at the site of the leak. Of course this approach is exemplary and in other arrangements, other approaches may be used.

A further feature of the exemplary arrangement of valve 10 when used in the exemplary water treatment system is the ability to operate the valve controller to allow incoming water to bypass the water treatment tank 14. For example in an exemplary system there are some situations such as when delivering water to an external spigot to wash off a sidewalk, irrigate plants and the like, when it may not matter that the water used is untreated. Further in some situations the amount of water required for a particular activity may be relatively large compared to the amount of water that is used in circumstances where it is highly desirable for the water to be treated by having been treated by having passed through the tank 14.

In situations where it is desirable to deliver untreated water for use by a particular device, the exemplary valve controller may be operated to cause the piston 34 in the valve 10 to be moved to the longitudinal position shown in FIG. 7. In this piston position, untreated water which is delivered at the inlet A is passed through the valve body directly to the outlet B without passing through the resin material 20 in the tank. In this way, the untreated water is provided to the water use devices for as long as untreated water is desired. After the activity is accomplished for which the untreated water will be used, suitable signals can be delivered to the valve controller to return the valve condition to that shown in FIG. 1 in which the water is again treated by passing through the tank.

Of course it should be understood that the valve configuration shown is exemplary and in other arrangements other valve configurations having different valve body arrangements, valve element configurations, ports and other structures may be utilized. Further, while the exemplary arrangement has been described in connection with a water treatment process, other arrangements may be utilized in connection with other types of fluid treatment equipment and processes.

The exemplary arrangement of the valve controller includes features that enable the valve controller housing to be readily installed in connection with the valve. Further this exemplary construction enables the valve controller to be readily replaced or serviced.

Figure 8:
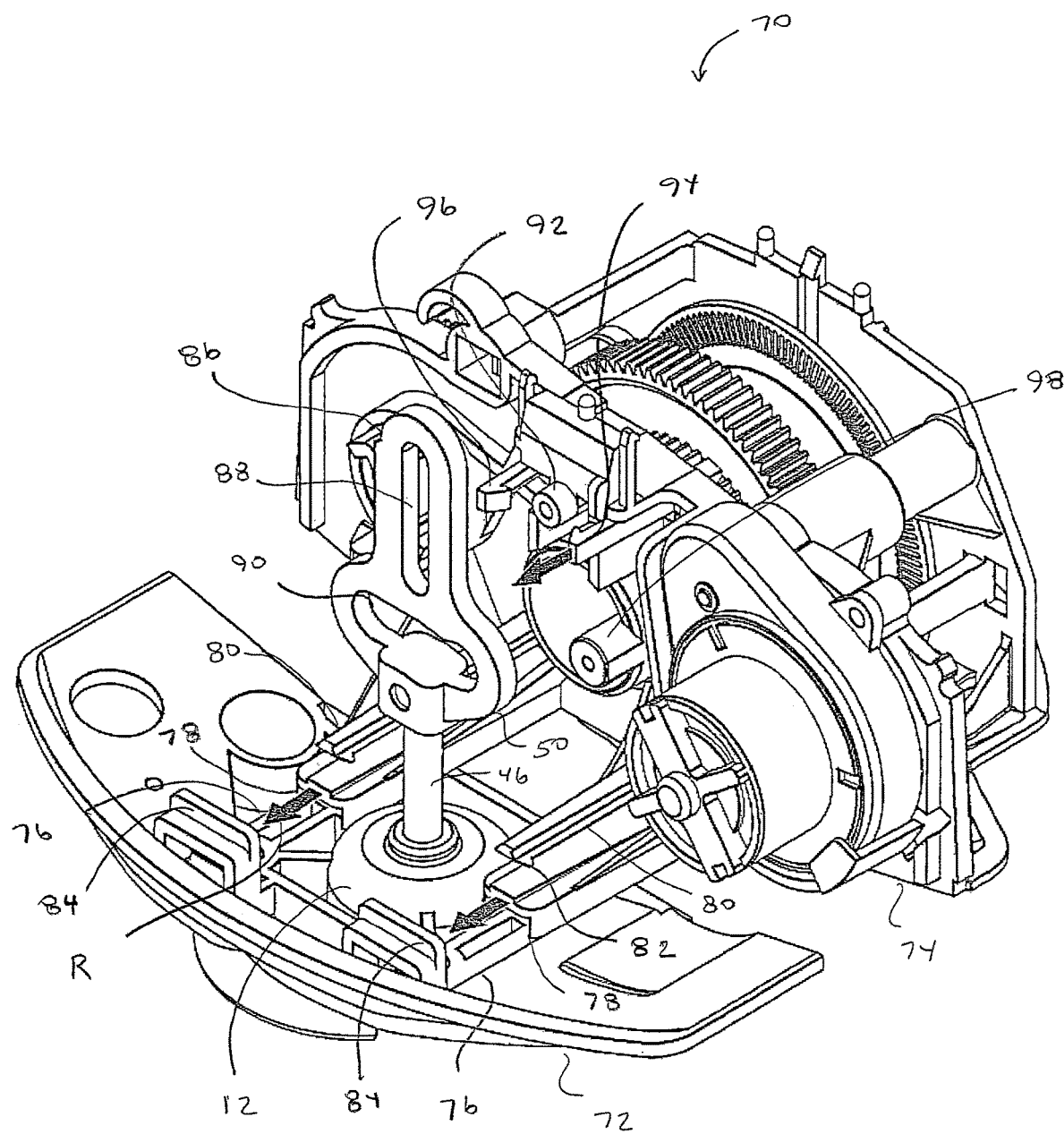
FIG. 8 is an isometric view showing an exemplary valve controller housing and a valve base being moved toward an operative position.
Figure 9:
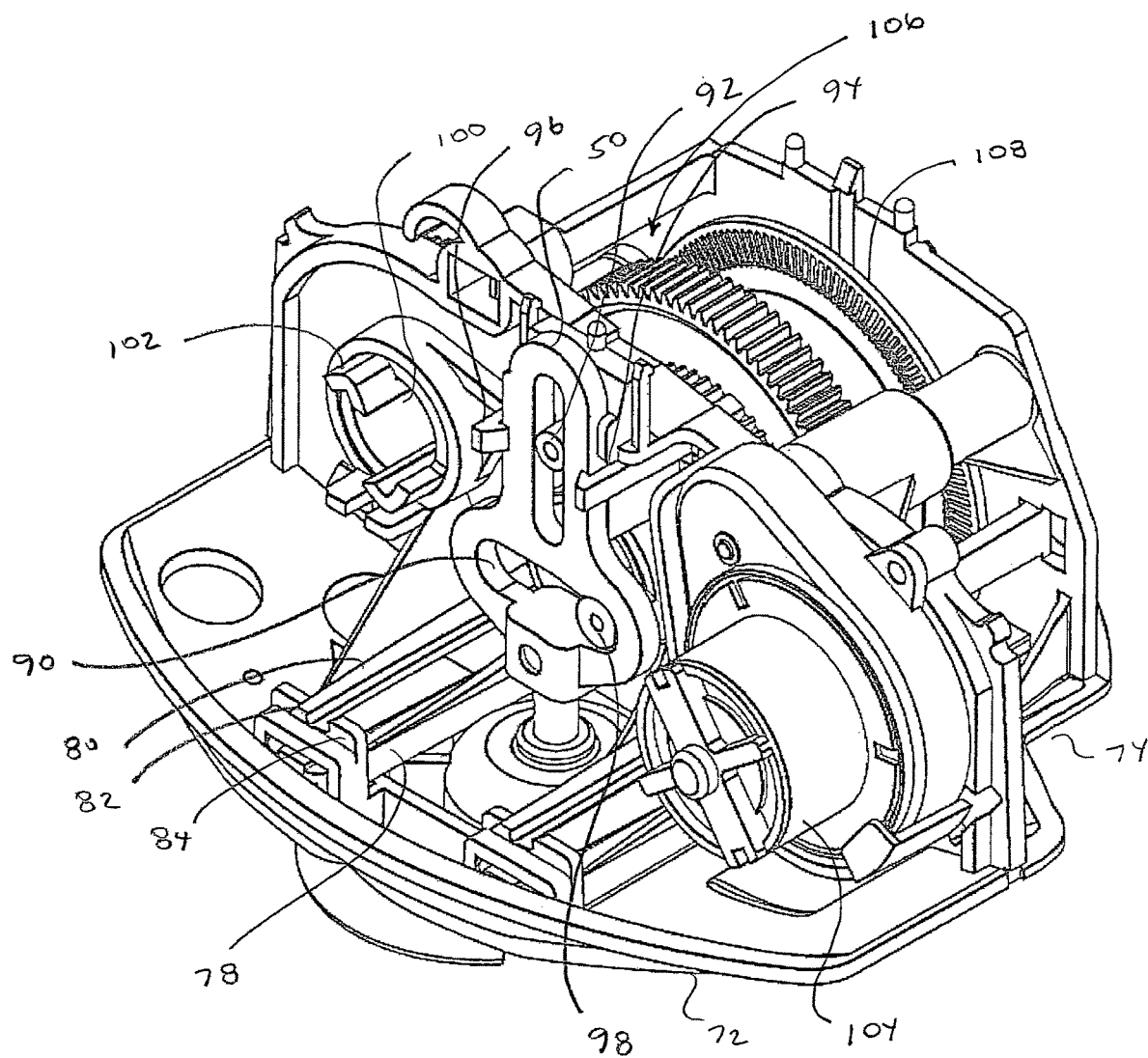
FIG. 9 shows the valve base and valve controller housing in an operative position.

An exemplary arrangement of the valve controller 70 is represented in FIGS. 8 and 9. The exemplary valve controller is operative to selectively move the actuator bracket 50 and the piston rod 46 to position the piston 34 longitudinally along an axis within the valve body 12 in the manner previously discussed herein. The actuator 70 may include the features and devices of the incorporated disclosures so as to carry out this function. Of course it should be appreciated that in other arrangements, other types of structures, devices and mechanisms may be utilized for purposes of providing selectively controlled movement of one or more valve elements.

In the exemplary arrangement of the controller 70 a valve base 72 is configured to be in operative connection with the valve body 12 of the valve 10. A valve controller housing 74 is configured to be selectively engageable with the valve base and placed in an operative position in which the valve controller may change the condition of the valve. The valve controller housing 74 is also configured to be readily disengageable from the valve base for reconfiguration, replacement or repair.

In the exemplary arrangement, the valve controller housing and the valve base include interengaging projections and slots to provide for the secure engagement and selective disengagement of the valve base and housing. Although it should be understood that the interengaging projections and slots may be in fixed connection with either of the engageable components, in this exemplary arrangement the valve base includes a pair of elongated rail projections 76. The pair of elongated rail projections 76 extend on opposed sides of the piston rod 46 and extend generally perpendicular to the longitudinal direction in which the piston rod is moveable.

The exemplary elongated rail projections are configured to be engaged in captured relation by elongated recessed slots 78. Elongated slots 78 extend in portions of the valve controller housing 74. The exemplary slots 78 are configured such that the rails 76 once extended therein are captured and immovable in all directions except along the direction of the rail projections designated by arrows R in FIG. 8. The secure engagement of the projections and slots may be achieved in different arrangements by interengaging tabs, flanges or other structures on the projections and slots which only enable such items to be engaged and disengaged by movement along the direction of arrows R.

The exemplary valve controller housing 74 further includes a pair of deformable members 80. Deformable members 80 each terminate at a hook 82. Each hook 82 is configured to engage and hold tabs 84 that are operatively connected with at least one wall when the valve controller housing is in the operative position as shown in FIG. 9. It should be understood, however, that the hook and tab configuration shown is exemplary and in other arrangements, the configuration may be reversed such that the hooks are included in engagement with the valve base and the structures for engaging the hooks are included on the valve controller housing. Further, other structures may be utilized for selectively holding and releasing the valve base and valve controller housing in the operative position.

In the exemplary arrangement, the actuator bracket 50 is configured to be readily operatively engaged with and disengaged from the structures which operate to selectively move the actuator bracket which are part of the valve controller housing. In the exemplary arrangement, the actuator bracket 50 includes a longitudinally elongated guide yoke portion 86. Guide yoke portion 86 includes a longitudinally elongated guide slot 88. The exemplary actuator bracket is further configured to include an actuator recess 90. Actuator recess 90 includes an elongated actuator slot that is elongated in a direction transverse to the longitudinal direction.

In an exemplary arrangement, the guide slot 88 in the guide yoke portion is configured to accept a guide pin 92 on the housing in movable relation therein. In the exemplary arrangement, the valve controller housing 74 includes a pair of deformable holding projections 94. The holding projections are spaced apart in symmetric relation relative to guide pin 92 and are sized to enable the guide yoke portion 86 to extend in movable relation between the holding projections. In the exemplary arrangement, each of the holding projections includes an angled hook end 96. Hook ends 96 of the holding projections 94 extend in facing relation and are configured to enable the guide yoke portion to be moved between the holding projections and held between the projections by the hook ends. As a result, the guide yoke portion is enabled to move in a longitudinal direction while positioned between the holding projections and in guided relation in the longitudinal direction by the guide pin 92. Further the hook ends 96 serve to prevent the guide yoke portion from moving out of the area between the holding projections and being disengaged from the guide pin.

It should be understood that this approach is exemplary and in other arrangements, one or more guide pins may be positioned on an actuator bracket which engage with slots or other openings in the housing. Further other structures may be utilized for engaging the actuator bracket or similar structures in releasable movable connection.

Further in the exemplary arrangement, the actuator recess 90 is configured to receive therein an actuator pin 98. Actuator pin 98 of the exemplary arrangement is operative to be selectively moved in an arcuate path responsive to operation of the valve controller 70. In the exemplary arrangement, the actuator pin 98 is positioned on a rotatable member that is selectively rotated so as to control the relative (axial) vertical position of the actuator pin, and thus control the movement and longitudinal position of the piston 34 through longitudinal movement of the actuator bracket 50.

In the exemplary arrangement, the actuator pin is selectively moved in an arcuate path which causes the pin 98 to move relatively transversely within the actuator recess 90. The selective positioning of the actuator pin 98 along its arcuate path as determined through operation of the valve controller 70 is usable to selectively position the actuator bracket 50 and the piston 34 in operative connection therewith, in the desired axial/longitudinal positions to achieve the desired flow conditions through the valve.

Further, the exemplary arrangement enables the bracket to be readily operatively disengaged from the valve controller housing 74. As can be appreciated, disengagement of the deformable members 80 from the tabs allows relative movement of the valve base 72 and the valve controller housing 74 along the direction of arrow R and in an opposed direction from when the base and housing are being engaged. In the exemplary arrangement, the holding projections 94 are movable and deformable to enable the hook ends 96 to release the guide yoke portion 86 of the bracket 50 from being held in intermediate relation of the holding projections 94. In addition, in this exemplary arrangement the actuator pin 98 may be moved out of the elongated actuator slot 90. Thus the actuator housing and the components attached thereto may be readily disengaged from the valve base 72. Thereafter a new valve controller housing 74 may be readily engaged with the valve base 72 and the actuator bracket 50. Such replacement may be done for repair or maintenance purposes. Alternatively an alternative valve actuator housing may be installed to provide additional or different features and functions for operation of the valve and related components such as the exemplary water treatment system. For example a valve controller that operates based on wired connections with other system components may be replaced with a valve controller that communicates wirelessly with other components, and vice versa. Alternatively the valve controller may be replaced to convert the valve and associated equipment to operate via a different method of operation. Such operations and systems may include those described in the incorporated disclosures. Of course it should be understood that these approaches are exemplary and in other arrangements, other approaches may be used.

Further in the exemplary arrangement as shown in FIG. 9 the valve controller housing 74 includes a rotatable member 100 which includes cam surfaces 102 thereon. The cam surfaces 102 are configured to operatively engage the plunger 66 and displace the plunger so as to control the movement of the movable valve member 64 within the valve body. In the exemplary arrangement the rotatable member 100 and cam surfaces 102 are configured so that the valve controller housing 74 can be disengaged from the valve base 72 without interference with the plunger member 66. This further facilitates the ready installation and replacement of the valve controller housing. As can be appreciated, this exemplary valve controller includes a pair of cam surfaces 102 which enables opening the movable valve member twice during a single rotation of the rotatable member. This may correspond, for example, to operation of the valve and its associated equipment in connection with a method that requires opening of the movable valve element 64 two times during a particular operation cycle such as the one previously described. Of course it should be understood that in other arrangements and systems, different numbers of cam surfaces may be utilized. Further other exemplary arrangements may include valves with additional valve elements and cam members or other actuators so as to enable the introduction of other liquids and fluids into the valve at various selected cycle times during operation of the valve and the associated equipment.

As represented in FIG. 9, the exemplary valve controller includes at least one motor 104. The motor 104 is in operative connection with a transmission generally referred to as 106. The transmission of the exemplary arrangement includes a plurality of connected gears or similar motion transmission devices that are selectively moved through operation of the motor 104. The transmission 106 of the exemplary arrangement is operative to move the actuator pin 98, rotatable member 100 and other structures which control the positioning of the valve components in a coordinated manner so as to achieve the desired coordinated operation of the valve structures. Further the exemplary valve controller includes an encoder 108. The encoder 108 moves in coordinated relation with one or more components of the transmission. One or more sensors (such as an optical sensor) is in operative connection with the encoder through operation of control circuitry such as is described in the incorporated disclosures. The encoder and associated sensor or sensors may be utilized to determine the then current status and/or position of the valve components so as to enable the valve controller to selectively move the various components associated with the valve in the desired manner. Of course it should be understood that the transmission, motor, encoder and other structures of the valve controller shown are exemplary and in other arrangements, other types of valve controller arrangements may be utilized.

Figure 10:
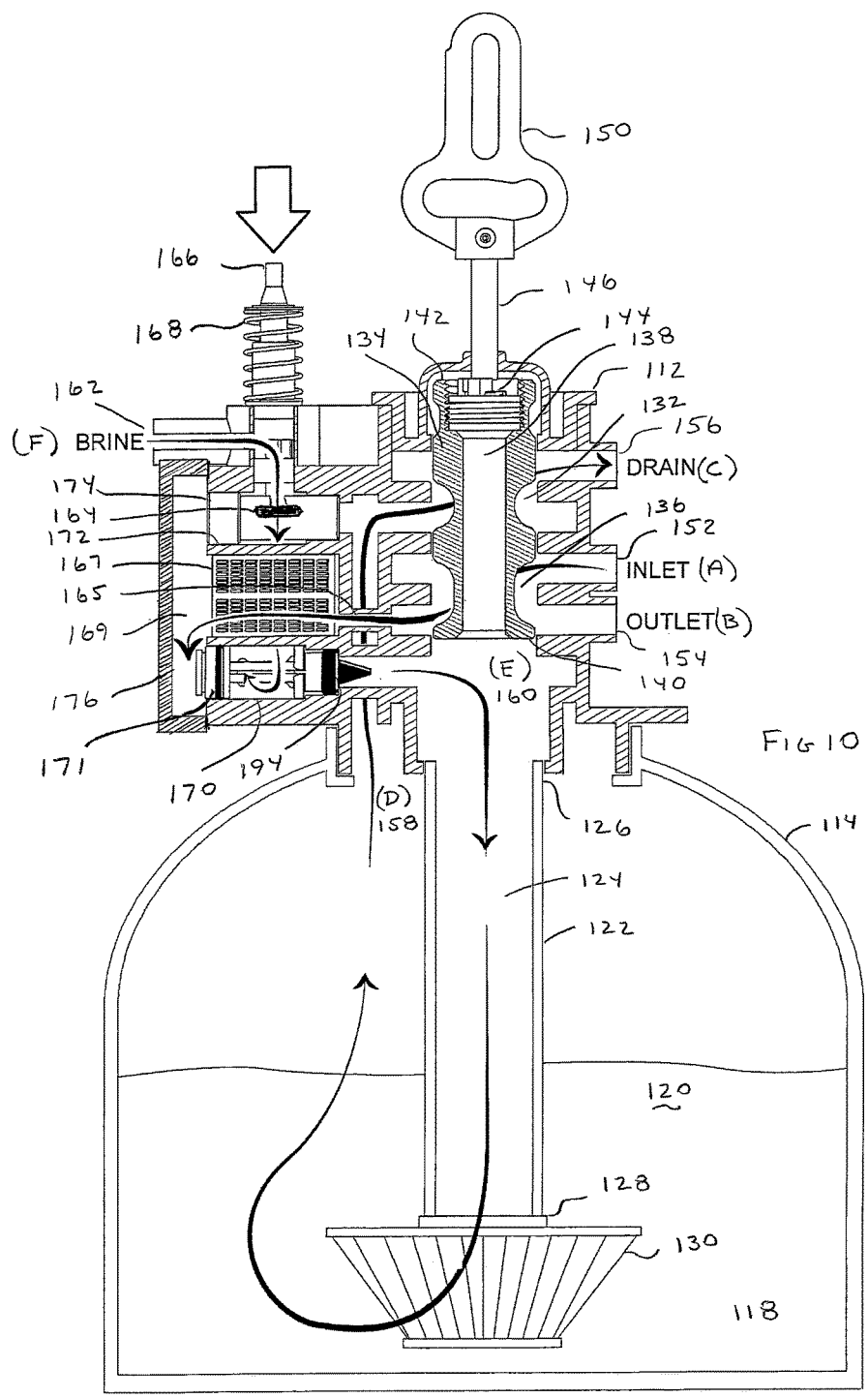
FIG. 10 is a schematic cross-sectional view of an alternative exemplary control valve.

FIG. 10 shows schematically an alternative arrangement of a control valve generally indicated 110. Control valve 110 is generally similar to control valve 10 previously described except as otherwise mentioned. Control valve 110 corresponds to a control valve that has been reconfigured so as to enable the carrying out of different functional processes as discussed herein.

Control valve 110 includes a valve body 112. Valve body 112 is configured for operative attachment to the water treatment tank 114. This may be for example by releasable threaded connection. In exemplary arrangements valve body 112 may be similar to body 12. Like the previously described water treatment tank, the exemplary tank has a top portion 116 and a bottom portion 118. The exemplary tank houses water treatment material such as a resin material 120. The resin material may be one of the types like those previously described. Of course other types of water treatment materials or combinations of materials may be used in other arrangements. Further it should be understood that the water treatment process performed using the control valve is merely one example of an application for the particular control valve arrangement.

The exemplary water treatment tank includes therein a tube 122 which provides a conduit 124 between the top and bottom portions of the tank. The top end of the tube 126 is operatively connected to the valve body 112. The bottom end of the tube 128 is in operative connection with a strainer 130.

Similar to the previously described control valve 10, the valve body 112 includes at least one movable valve element. The exemplary valve includes a generally cylindrical, longitudinally extending bore 132. A piston 134 is selectively movable in the longitudinal or axial direction within the bore 132. It should be noted that the exemplary piston 134 has the same configuration as piston 34 of the previously described arrangement. As in the prior arrangement the exemplary valve is configured to enable the piston to be changeable.

As discussed in connection with the previously described arrangement, piston 134 includes a plurality of annular recesses which define annular flow cavities 136. Annular flow cavities also generally surround the bore and are longitudinally spaced within the body of the valve. Piston 134 also includes a longitudinal flow cavity therethrough 138. Piston 134 includes a first longitudinal end 140 and a second longitudinal end 142. As in the case with the previously described arrangement, the second longitudinal end includes a threaded portion adjacent the second longitudinal end 144 which is releasibly engageable with a coupling 144. The coupling 144 of the exemplary arrangement provides for operative releasable connection of the piston 134 and a piston rod 146. As with the prior arrangement, the coupling 144 enables fluid to flow therethrough through the longitudinal flow cavity 138 of the piston.

In the exemplary arrangement associated with the control valve 110, the piston 146 is in operative connection with an actuator bracket 150. Actuator bracket 150 is configured to be moved by a valve controller which may be similar to the valve controller 70 previously discussed. Of course it should be understood that in other arrangements, other types of valve controllers may be used.

Like previously described control valve 10, control valve 110 further includes an inlet port 152 which is labeled A for purposes of brevity herein. The valve also includes an outlet port 154 labeled B. The exemplary valve further includes a drain port 156 labeled C. Valve 110 further includes a first tank port 158 labeled D and a second tank port 160 labeled E. The exemplary valve 110 further includes a brine port 162 (labeled F). The brine port F similar to the previously described arrangement, is connected to a fluid passage within the valve which is opened and closed through selective movement of a movable valve member 164. The movable valve member 164 is moved between open and closed positions through movement of a plunger 166 which is biased toward the valve member closing position by a spring 168. As is the case with the prior described arrangement, the plunger 166 may be selectively moved between the open and closed positions of the valve through operation of the valve controller. This may be done by engagement with cam surfaces such as cam surfaces 102 previously described or through other types of valves and actuators. Of course in other arrangements, other approaches may be used.

Similar to the previously described valve, valve 110 includes a flow passage 165 which is fluidly connected to a chamber 169. A screen 167 is positioned such that fluid passes through the screen 167 to reach the chamber 169.

Valve 110 includes a passage 170 similar to passage 59 that is disposed below the passage 165 as shown and a further passage 172 similar to passage 75 that is disposed above passage 165. An injector 171 that is similar to injector 71 is positioned in passage 170. The injector 171 includes a check valve 194. A plug 174 which may be similar to the plug 61 of the previously described arrangement is positioned in passage 172. In the exemplary arrangement a fluid passage that is not separately shown extends between the passage 172 and passage 170. This fluid passage is separate from the fluid passage 165 and enables the brine port F to communicate with both passages 170 and 172. In this exemplary arrangement, the plug 174 positioned in the passage 172 enables the brine port F to be in communication with the passage 170 and the injector 171. This enables the injector body to be in fluid communication with the brine port when the valve member 164 is open.

In the exemplary valve 110 a removable cover 176 closes the chamber 169. In the exemplary arrangement suitable sealing elements such as gaskets and fastening members such as screws are provided to enable holding the cover to the rest of the valve body and for maintaining the chamber 169 in fluid tight engagement therewith. In the exemplary arrangement the cover 176 enables selectively accessing the passages 170 and 172 as well as the plug and injector that may be positioned therein. This enables the exemplary valve 110 to be configured such that the injector may be selectively positioned in either one of the fluid passages 170 or 172. Likewise the plug 174 can be selectively positioned in the other one of the passages 170 or 172 in which the injector 171 is not currently positioned.

Figure 11:
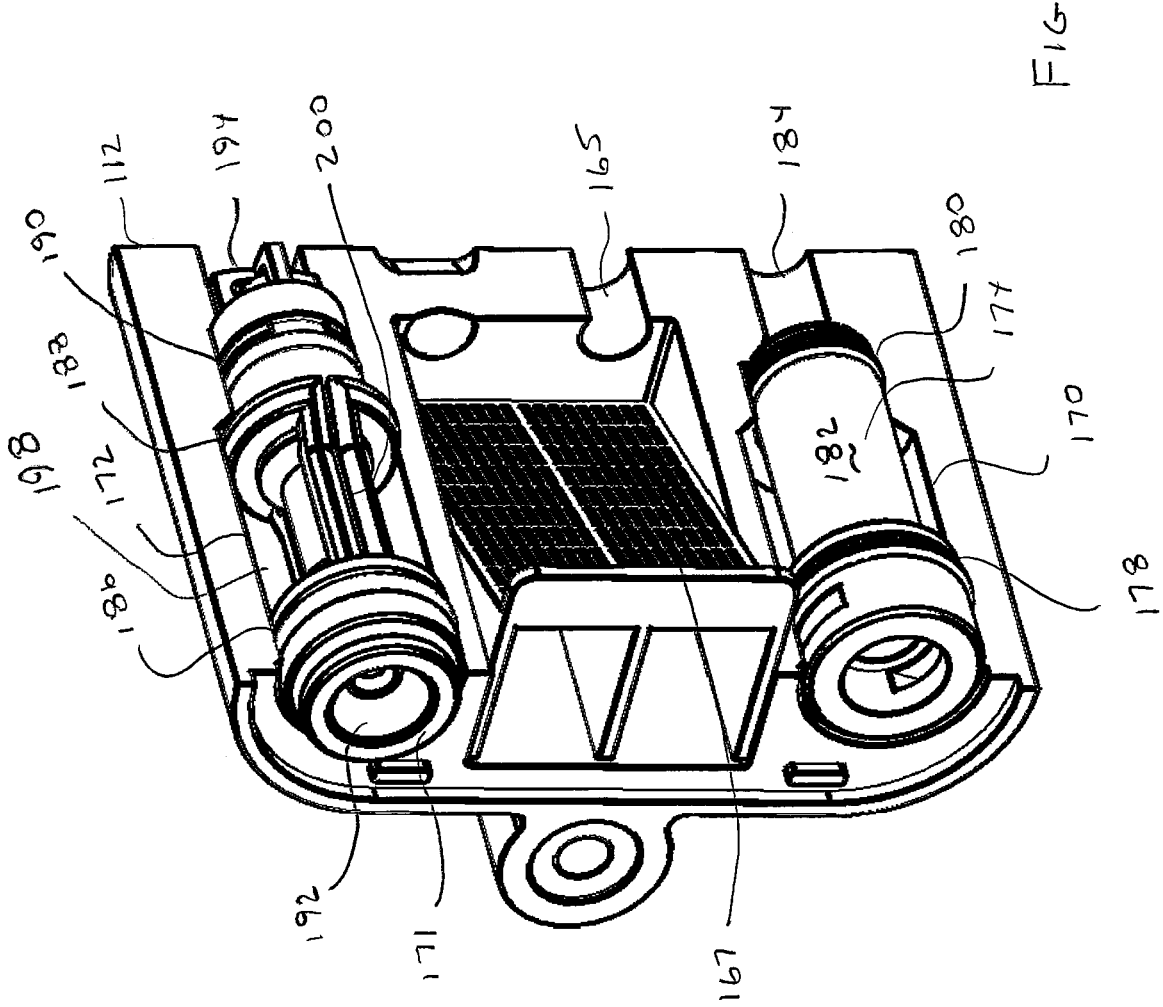
FIG. 11 is an isometric partial cutaway view of a portion of the valve associated with a changeable injector.
Figure 12:
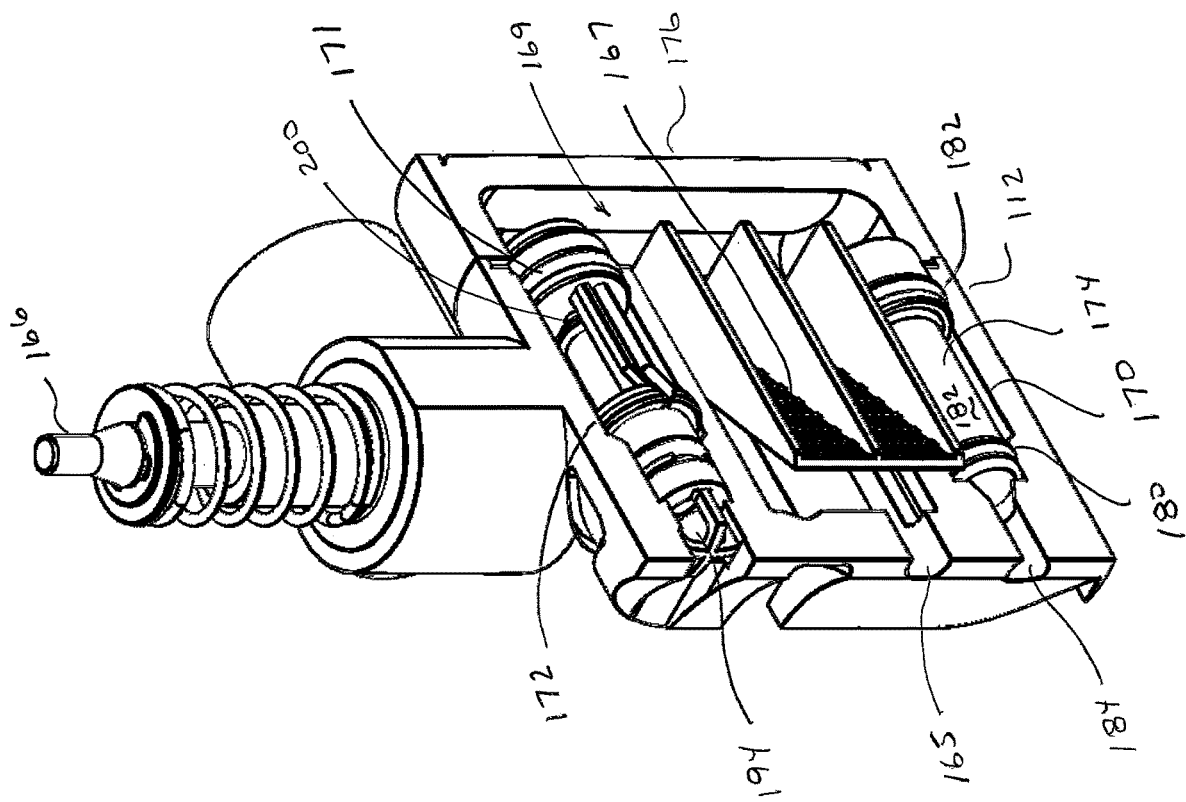
FIG. 12 is an opposite hand partial cutaway showing the portion of the valve in FIG. 11.

FIGS. 11 and 12 are cutaway views of the portion of the valve body 112 and the passages 170 and 172. In the arrangement shown in FIGS. 11 and 12, the injector 171 is shown positioned in passage 172 while the plug 174 is positioned in passage 170. This corresponds to the configuration of the injector and plug shown in valve 10 that has the positions of the injector and plug reversed from that shown in valve 110. Thus as can be appreciated, the exemplary valve 110 enables a person assembling the valve initially to selectively position the injector body 171 and plug 174 in either passage 170 or passage 172 as is appropriate for the operation of the particular control valve. Further this exemplary configuration may enable a service technician or person modifying the valve to remove the cover and change the positions of the injector body and the plug so as to modify the operational capabilities of the valve. Further in other alternative arrangements the valve may be configured to have plugs positioned in both of the passages 170 and 172. This might be done, for example, to have a valve that operates not to have brine solution or other material introduced into the liquid that passes through the valve. Alternatively in still other arrangements injectors or other elements may be positioned in both of the fluid passages. This might be done, for example, in valve configurations where in multiple positions of the piston, it is desirable to introduce brine solution or other material into the liquid flow.

It should also be appreciated that alternative arrangements may be utilized in connection a valve configuration like that described. For example, check valves or other arrangements may be utilized so as to allow fluid flow in an opposite direction from that permitted by the check valve of the injector so that fluid may be enabled to flow into the chamber 169 in certain longitudinal positions of the piston for producing a desired flow path. Further in other alternative arrangements, the chamber 169 may have multiple segregated areas so as to be in connection with additional ports or flow paths through the valve. Such capabilities may provide additional flow alternatives to the valve which enable the valve to provide additional capabilities. As can be appreciated, those skilled in the art can develop numerous changeable valve configurations suitable for different processes and equipment from the description provided herein.

Further in the exemplary arrangement the plug 174 includes disposed annular seals 178 and 180. These disposed annular seals are comprised of resilient material that engage the adjacent walls of the flow passage so as to provide fluid tight engagement therewith. However, as can be appreciated, the body portion 182 of the plug 174 that extends between the seals is spaced inwardly from the annular wall bounding the passage 170. This provides the capability for fluid to occupy and flow in the area between the annular wall bounding the passage and the body portion 182 without the fluid being able to flow directly into the chamber 169 or the passage 184 which can fluidly connect with the area adjacent to the second tank port 160. As can be appreciated, this exemplary construction of the plug 174 when positioned in the passage 172 as represented in FIG. 10 enables the brine solution which enters the passage 172 to flow around the body portion 182 of the plug member and into the chamber 170 to reach the injector 171.

As also shown in FIGS. 11 and 12, the exemplary injector 171 includes disposed annular resilient seals 186, 188 and 190 which engage in sealing relation the adjacent annular wall bounding the passage 172. The exemplary injector includes a liquid inlet 192 similar to opening 63 at a first end, and an outlet from the check valve 194 at the opposed end. In the exemplary arrangement the seals 186 and 188 bound an area 198 which can be filled with the brine solution which is received therein when the valve member 164 is open. Brine in the area 198 is drawn through openings 200 in the injector body as liquid flows therethrough. This causes the brine solution to be mixed with the liquid as it flows through the injector body in the manner previously discussed. Treated water can also be delivered from area 198 to the port F in an appropriate valve condition like that previously discussed. Of course it should be understood that this injector configuration is exemplary and in other valve and system arrangements, other approaches and configurations may be used.

In the exemplary system used in conjunction with valve 110 and shown in FIG. 10, the valve may be operated in conjunction with the water treatment tank in a manner similar to that previously described in connection with valve 10. However, in this exemplary arrangement, the selective positioning of the piston 134 by the valve controller associated with the valve enables the regeneration of the resin material 120 housed in the tank 114 via the upward flow of the brine solution rather than via a downward flow of the brine solution such as is described in connection with the operation of valve 10 and represented in FIG. 4. In the prior described example of the system used in connection with valve 10, the brine solution acts to regenerate the resin material housed in the tank by flowing from the upper surface thereof and to the bottom area and out the tube 22. In the operation of valve 110, regeneration is accomplished by distributing the brine solution initially from the bottom end of the tube 128 and having the solution migrate radially outwardly from the strainer and upwardly through the resin so as to provide for regeneration thereof. This may be more effective for some resin materials or tank configurations. Further it should be appreciated that because in some exemplary arrangements the piston 134 and valve body 112 may be identical to piston 34 and valve body 12 respectively, the change in capability from downflow regeneration to upflow regeneration may be accomplished by changing the respective positions of the injector and the plug within the valve body and changing the programming associated with the controller so that the controller positions the piston in a different position (e.g. the position shown in FIG. 4 for downflow and the position shown in FIG. 10 for upflow). This is useful in that the need for servicers and installers to have a stock of different valves for upflow and downflow regeneration can be avoided.

As can be appreciated, the method for configuring the exemplary valve for either upflow or downflow regeneration includes removing the cover 176 to access the chamber 169. The injector 171 and the plug 174 are positioned in the passages 170, 172 in the manner appropriate for the regeneration approach desired for the unit. The cover 176 is then installed to fluidly seal chamber 169. The valve controller 70 is programmed via one or more inputs through an appropriate input device such as a laptop or handheld computer, which inputs controller executable instructions that cause the piston to move to the appropriate position for the regeneration approach to be used. Alternatively the changes in the methods of operation of the controller directly attached to the valve may be modified by a master controller in a manner described in the incorporated disclosures. Further these method steps can be used to change the regeneration approach of an existing unit. This capability of the exemplary arrangements to be configured as desired without the need to change valve bodies, pistons or actuators can be useful and cost effective.

In the exemplary operation of the valve 110, the valve is enabled to operate in a manner similar to that discussed in connection with valve 10 and is represented in FIGS. 1-3 and 5-7.

It should be appreciated that in the exemplary arrangement, the plug 174 is configured so that treated water can be directed out of the brine port F in a manner similar to that described in FIG. 2 due to the configuration of the plug and the annular flow chamber which extends around the central body portion 182 thereof. As a result, treated water is enabled to be delivered from the area 198 of the injector body, to the brine port and into a brine tank holding material so as to produce a brine solution which can later be introduced to regenerate the resin in a manner like that discussed in connection with the prior arrangement.

When the resin material 120 in the water treatment tank 114 is to be regenerated, the piston 134 is axially moved to the position shown in FIG. 10. In this position, brine solution produced in the brine tank is drawn into the brine port F due to the opening of the movable valve element 164. The brine is drawn through the annular chamber around the central body portion 182 of the plug 174 and passes through the fluid passage into the area 198 of the injector body 171. Water flows from the inlet A through the passage 165 and into the chamber 169. From the chamber 169, the water flows through the injector body 171 where it is mixed with the brine solution and passes downwardly through the tube 122. The regenerate brine laden water then passes through the bottom of the tube 128 through the strainer and upwardly through the resin material 120 where it replaces the ions of contaminants that have been removed from the water previously treated. The released ions and other contaminants flow upwardly through the first tank port D and out through the drain C of the valve. This process is carried out for a sufficient time so as to regenerate the capabilities of the resin to remove undesirable materials from water which is passed therethrough after completion of the resin regeneration cycle. Of course it should be understood that these approaches and configurations are exemplary and in other arrangements, other configurations and process approaches may be utilized. Further it may be appreciated that the water treatment application for valve 110 and the structures and elements described in connection therewith is only one of many exemplary applications in which such elements and structures may be used.

Figure 13:
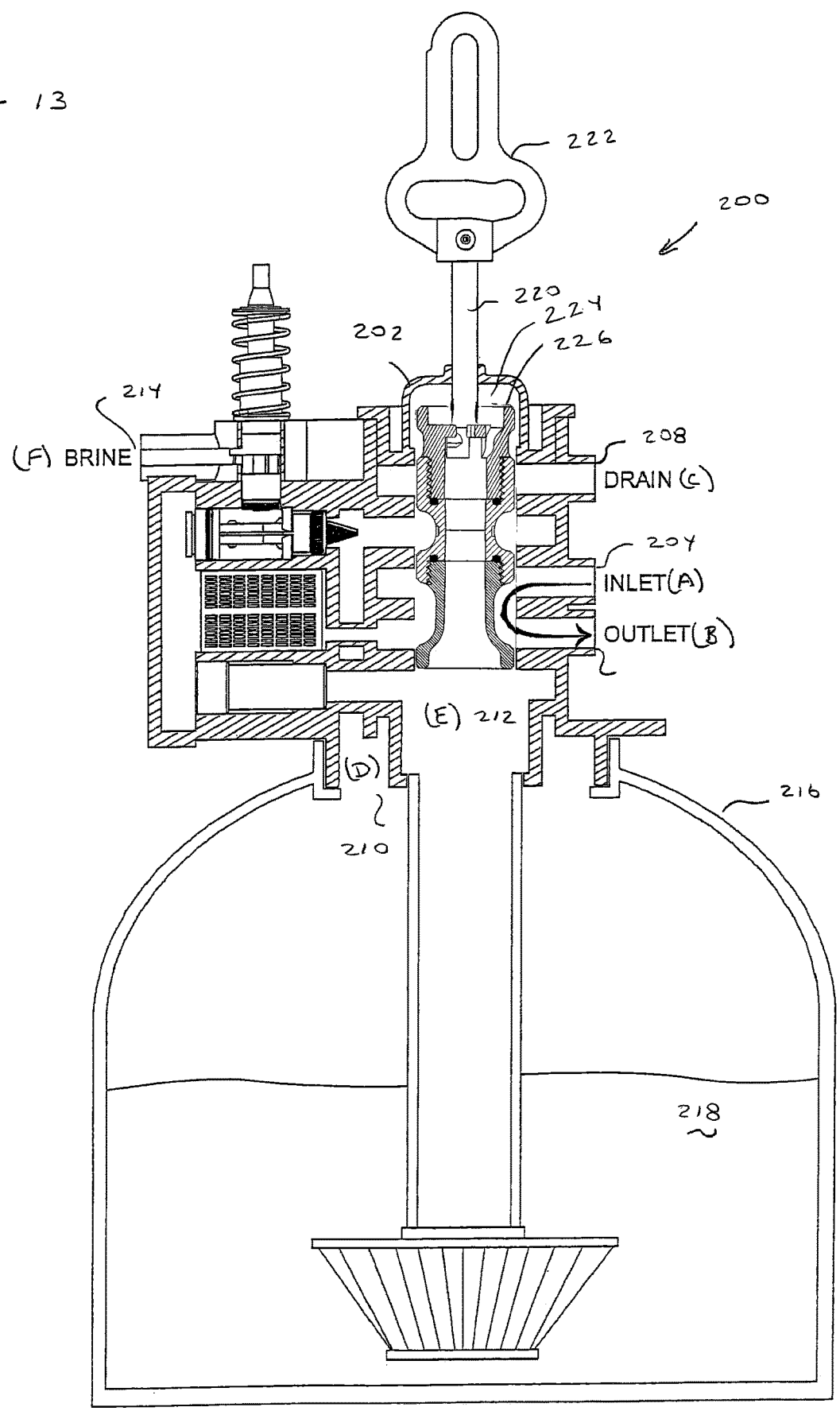
FIG. 13 is a schematic cross-sectional view of an alternative exemplary control valve including an alternative movable piston valve element.
Figure 16:
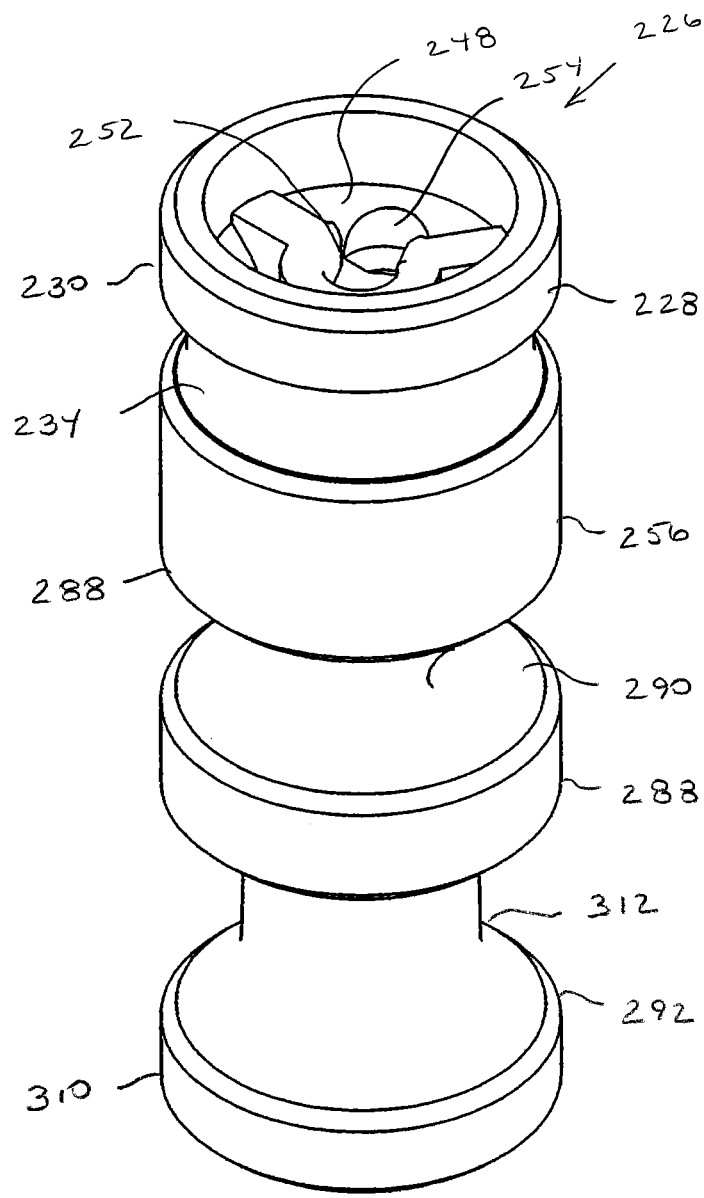
FIG. 16 is a front top left perspective view of the alternative piston.
Figure 17:
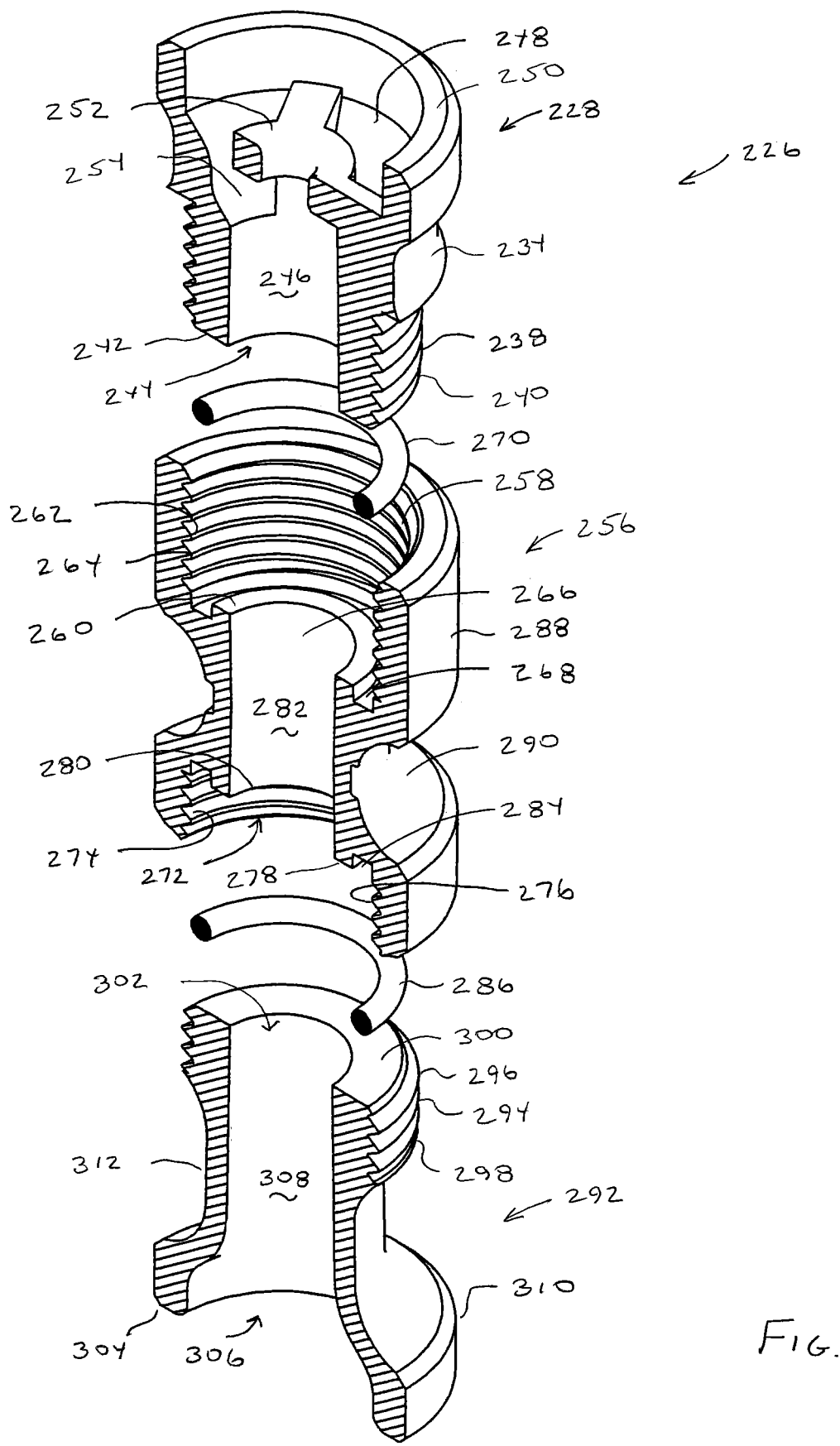
FIG. 17 is a front top left perspective exploded view of the exemplary alternative piston.

FIG. 13 shows of further alternative arrangement of a liquid treatment control valve 200. Valve 200 may include features similar to those discussed in connection with the previously described valves 10 and 110. Valve 200 includes a valve body 202. Valve 200 further includes an inlet port 204 (labeled A) and an outlet port 206 (labeled B). Valve 200 further includes a drain port 208 (labeled C), a first tank port 210 (labeled D) and a second tank port 212 (labeled E). The exemplary valve further includes a brine port 214 (labeled F). The exemplary liquid treatment valve 200, similar to the previously described valves is in fluid connection with a tank 216 which includes therein a liquid treatment material 218. The liquid treatment material may include a resin material, filtration material or other suitable material for treating the liquid that is passed through the valve and the tank.

Similar to the previously described valves, valve 200 is in operative connection with a valve controller that includes at least one motor therein. The at least one motor is operated to axially position a piston rod 220 via movement of an actuator bracket 222 in a manner like that previously discussed. Of course it should be understood that the previously described valve controller structures are exemplary and in other arrangements other approaches may be used.

Similar to the previously described valves, valve body 202 includes an axially elongated bore 224 therein. A valve element comprising a cylindrical piston 226 is selectively axially positionable by the actuator in the bore 224. By selectively axially positioning the piston 226 in the bore, the exemplary valve is enabled to provide numerous flow conditions similar to those previously discussed. Of course it should be understood that valve 200 is exemplary and in other arrangements other or different flow conditions from those previously discussed may be achieved.

As shown in greater detail in FIGS. 14-17, the exemplary piston is comprised of at least two releasably engageable pieces. The exemplary piston 226 is comprised of three releasably engageable pieces that during operation of the valve are held in engaged relation. A first piece 228 includes an annular outer wall 230. The annular outer wall extends in centered relation relative to a longitudinal axis 232. An annular first piece recess 234 extends in the annular outer wall 230. Recess 234 performs the function of one of the annular flow cavities that extend in the pistons of the valves that have been previously discussed.

The exemplary first piece 228 further includes an axially centered first piece projection 236. First piece projection 236 is bounded by an annular outer cylindrical wall 238. The annular outer cylindrical wall 238 extends parallel to the axis and includes at least one radially extending projection or recess thereon. In the exemplary arrangement the at least one projection or recess includes threads 240. However it should be understood that in other arrangements the at least one radially extending projection or recess may include other types of structures that are suitable for releasably engaging and holding pieces of the piston together in engaged relation, such as twist locks, clips, bayonet type connectors and other connecting structures. The exemplary first piece projection 236 terminates in a radially extending first end surface 242. The exemplary first end surface 242 includes a first inner opening 244 therein. The first inner opening 244 is in fluid connection with an axially extending passage 246 that extends in the first piece 228.

First piece 228 includes a radially extending further first end surface 248. Surface 248 in the exemplary arrangement is axially recessed from an annular upper surface 250 of the first piece 228. End surface 248 extends on the first piece at an end that is axially opposed of the first end surface 242. The exemplary further end surface 248 includes a piston rod coupling 252 thereon. The exemplary piston rod coupling 252 is releasably engageable with piston rod 220. An outer opening 254 extends through end surface 248. Outer opening 254 is in fluid communication with the axially extending passage 246. The outer opening 254 is configured such that fluid may pass therethrough when the piston rod coupling 254 is engaged with the piston rod.

The exemplary piston 226 further includes a second piece 256. The exemplary second piece includes a cylindrical axially centered second piece recess 258. Recess 258 is configured to receive the first piece projection 236 therein. Exemplary recess 258 terminates axially within the second piece at a radially extending second end surface 260. The second piece recess 258 is bounded radially by an annular recess wall 262. The annular recess wall 262 includes at least one further radially extending projection or recess. In the exemplary arrangement the at least one radially extending projection or recess of the annular recess wall 262 includes threads 264 that are engaged with threads 240 of the first piece. Of course it should be understood that in other arrangements other types of interengaging projections and recesses may be used.

In the exemplary arrangement the second end surface 260 includes an axially centered second end opening 266 therein. The second end surface further includes an annular recess 268 that extends in surrounding relation of the second end opening 266. An annular resilient piston seal 270 is positioned axially in intermediate relation and in fluid tight engagement with each of the first piece 228 and the second piece 256. In the exemplary arrangement the seal 270 extends in the annular recess 268. Of course it should be understood that this configuration is exemplary and in other arrangements other seal retaining structures may be utilized, which may include without limitation, a recess in first end surface 242 of the first piece and/or annular recesses in each of the first piece and the second piece. Further it should be understood that in other arrangements annular recesses to help position a seal need not be provided.

Exemplary second piece 256 further includes a further second piece recess 272. Recess 272 is a cylindrical radially centered recess that is bounded by a further annular recess wall 274. The further annular recess wall 274 includes at least one further additional radially extending projection or recess which in the exemplary arrangement comprises threads 276. The exemplary second piece recess 272 is bounded axially inward in the second piece by a radially extending further second end surface 278. Radially extending further second end surface 278 includes a further second end opening 280 therein. An axially extending passage 282 fluidly extends between the further second end opening 280 and the second end opening 266.

In the exemplary arrangement the radially extending second end surface 278 includes therein a further annular recess 284. The further annular recess 284 is in axially centered relation with the further second end opening 280. A further annular resilient piston seal 286 extends in the annular recess 284. Second piece 256 further includes a cylindrical second piece annular outer wall 288. Second piece annular outer wall 288 includes an annular second piece recess 290. Recess 290 serves as an annular flow cavity of the exemplary piston 266.

The exemplary piston 266 further includes a third piece 292. Third piece 292 includes an axially centered third piece projection 294. Third piece projection 294 includes an annular outer third piece cylindrical wall that extends parallel to the axis 232. The annular outer third piece cylindrical wall 296 includes at least one additional radially extending projection or recess. In the exemplary arrangement the radially extending projection or recess of cylindrical wall 296 comprises threads 298 that are in interengaged relation with threads 276 of the second piece 256. Of course it should be understood that this arrangement is exemplary and in other arrangements other releasably engageable projections and recesses for engaging the pieces of the piston in a releasably engageable manner may be used.

The exemplary third piece projection 294 terminates axially inwardly at a radially extending third end surface 300. Exemplary third end surface 300 includes therein an axially centered third end opening 302. The exemplary resilient annular piston seal 286 extends axially intermediate and in fluid tight relation with each of the third end surface 300 and the second end surface 278. The engagement of the seal 286 in the annular recess 284 helps to position the seal in a proper position to maintain fluid tight relation between the third piece 292 and the second piece 256. Of course it should be understood that in other arrangements the annular recess may be included in the third piece instead of in the second piece, or that both the second piece and the third piece may include such recesses. In still other exemplary arrangements the seal may not require such annular recesses to provide suitable seal positioning.

The exemplary third piece 292 of the piston 266 includes a further third end surface 304. Further third end surface 304 is axially disposed on the third piece from the third end surface 300. Further third end surface 304 includes therein an axially centered further third end opening 306. Further third end opening 306 is in fluid communication with a third axially extending passage 308. Third axially extending passage 308 fluidly extends between further third end opening 306 and third end opening 302.

The exemplary third piece 292 includes a third piece annular outer wall 310. Annular outer wall 310 includes an annular third piece recess 312 that extends therein. The exemplary annular third piece recess 312 serves as an annular flow cavity of the exemplary piston 226. As can be appreciated the first piece 228, second piece 256 and third piece 292 of the exemplary piston 226 is configured such that when the interengaging projections and recesses which hold the pieces together are fully engaged, the respective radially extending abutting surfaces such as first end surface 242 and second end surface 260, and third end surface 302 and end surface 278 are engaged such that the relative positions of the annular recesses 234, 290, 312 are in the desired axially spaced relation. As a result the axial positioning of the top first piece 228 of piston 226 by the at least one motor of the valve controller results in the plurality of axially disposed annular recesses on the exterior of the piston being precisely positioned so that the annular flow passages provide the desired flow conditions of the valve.

As can be appreciated, in the assembled condition of the piston 226 the aligned fluid passages 308, 282 and 246 provide fluid communication between the further third end opening 306 and the outer opening 254. As a result the passages provide a longitudinal flow passage through the entire axial length of the piston in a manner similar to longitudinal flow cavity 38 of piston 34 previously discussed. Further in the exemplary arrangement, the annular resilient piston seals 270 and 286 maintain the passage that extends axially through the interior of the piston fluidly separated from fluid in contact with the outer cylindrical surfaces of the piston. Further in the exemplary arrangement the resilient seals 270, 286 engage the immediately adjacent pieces in contacting relation. Such resilient contact by the seals on each axial side thereof serves to reduce the risk of relative rotational movement of the first piece 228 and the second piece 256, as well as the relative rotational movement of the second piece 256 and the third piece 292.

In exemplary arrangements the piston structure which is comprised of at least two releasably engaged piston pieces, enables the assembly of pistons which have different annular flow cavities located in different axial positions. This enables providing different desired flow properties for fluid flow within a valve body. Further in exemplary arrangements different configurations of pistons may be produced by selectively engaging and disengaging piston pieces having different configurations. This enables changing the flow characteristics of the particular valve. Further in exemplary arrangements, the releasably engageable piston pieces may be comprised of molded plastic or other suitable materials that can be readily formed in different desired dimensions, contours and configurations. Such contours may be provided so as to achieve desired flow properties for the flow of liquid through the different annular passages. Of course it should be understood that these approaches are exemplary, and in other arrangements other approaches may be used.

A further alternative control valve 320 is shown in cross-section in FIGS. 18-23. The alternative control valve includes features similar to the control valves previously described except as otherwise indicated. The exemplary control valve 320 includes a valve body 322. The exemplary valve body includes a cylindrical internal bore 324 that extends along an axis 326. A piston 328 is positioned in the bore 324 and is axially movable and selectively positionable along the axis 326. A piston rod 330 extends in the valve body and is in attached operative connection with the piston 328 at a first axial end 332 of the piston. The piston rod 330 extends outside the valve body and is in operative connection with at least one motor which may be similar to one of the motors previously discussed or described in the incorporated disclosures. The at least one motor may be included in a valve controller or similar unit that is operable to selectively axially position the piston relative to the bore. In the exemplary arrangement the axial position of the piston 328 is operative to determine the fluid flow condition of the valve in a manner like that previously discussed.

In the exemplary arrangement the valve body includes a plurality of annular flow cavities 334. The exemplary annular flow cavities extend in surrounding relation of the bore 324. The annular flow cavities are bounded by radially extending walls which are in engagement with annular resilient seals 336. The annular resilient seals 336 are configured to engage the cylindrical outer surfaces of the piston 328 in fluid tight relation when the cylindrical outer surface of the piston is adjacent thereto.

Figure 24:
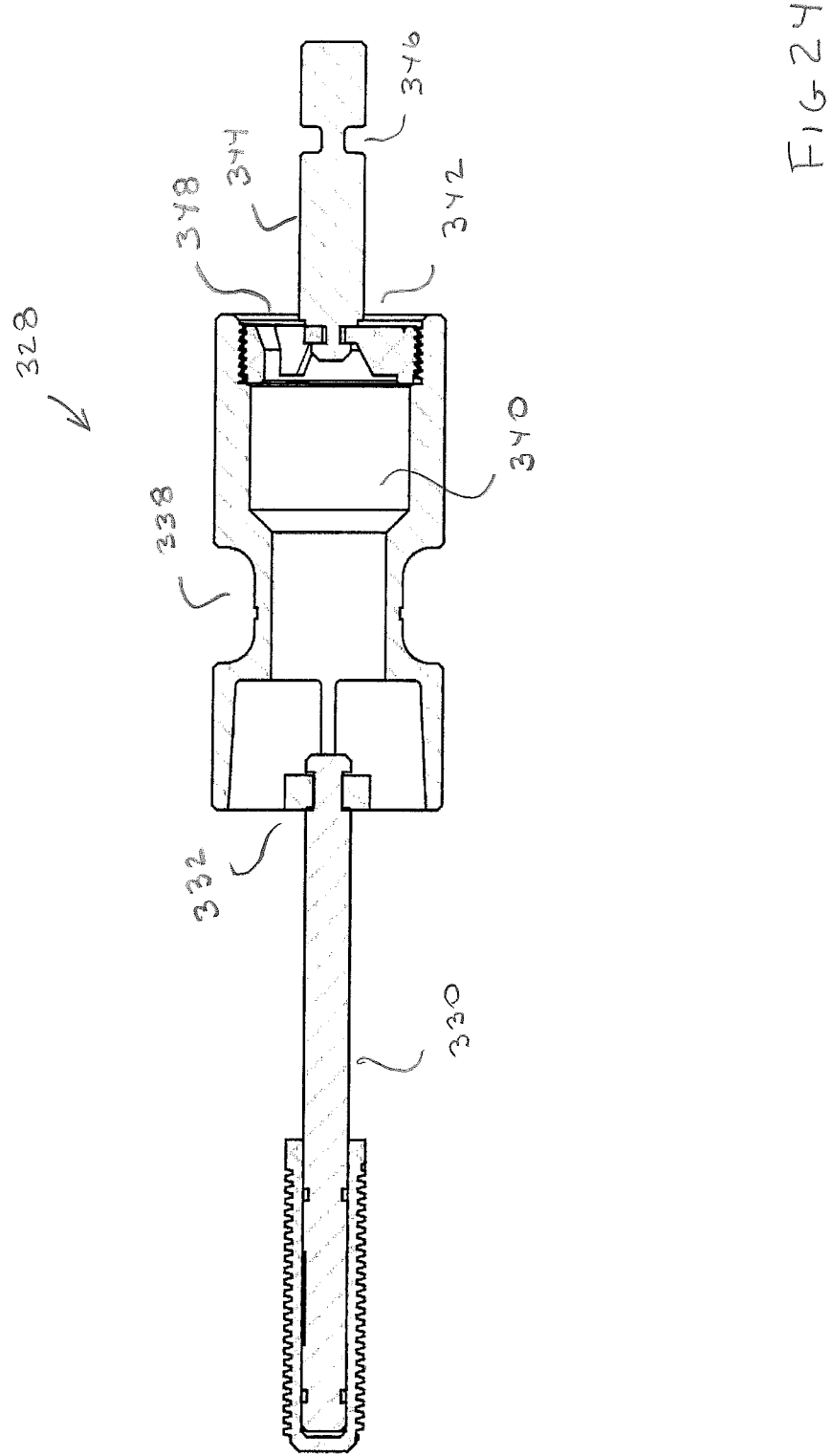
FIG. 24 is a cross-sectional view of the piston of the control valve shown in FIG. 18.

As shown in FIG. 24 the exemplary piston 328 includes at least one annular flow cavity 338 in the outer cylindrical surface thereof. The exemplary piston further includes at least one axial flow passage 340 that in the exemplary arrangement extends through the larger diameter portion of the piston. The at least one axial flow passage extends through the piston from the first axial end 332 to a second axial end 342. The exemplary piston 328 further includes a piston extension 344. Piston extension 344 extends axially from the second axial end 342. In the exemplary arrangement the piston extension has a maximum outside diameter that is smaller than the remainder of the piston. The piston extension further includes an annular recess 346 that serves as an annular flow cavity in a manner like that later discussed.

The exemplary piston 328 is configured so that the piston extension is releasably engaged with the remainder of the piston. The exemplary releasable connection is achieved through the use of a threadably engaged mount 348 which is releasably engaged at the second axial end 342 of the piston. The exemplary mount 348 includes fluid passages therethrough which are part of the at least one axial flow passage 340 through the piston. As will later become apparent the piston extension enables the exemplary control valve arrangement to operate as part of a water softener in which the piston extension provides for the delivery of treated water to a water softener salt brine holding tank, and to receive water softener salt brine from the holding tank into the valve. Of course, these capabilities are exemplary and in other arrangements other approaches may be used.

In the exemplary valve arrangement 320 the piston extension is journaled in and axially movable in a piston extension opening 350 in a radially extending divider wall 352. The piston extension opening 350 is bounded by a resilient piston extension opening seal 354. The piston extension opening seal 354 enables engagement of the cylindrical outer surface of the piston extension in fluid tight relation in most axial positions of the piston such that liquid in the bore of the valve is prevented from flowing across divider wall 352. The exemplary piston extension is further journaled in and axially movable in a further piston extension opening 356. Further piston extension opening 356 extends in a further radially extending divider wall 358 that is axially disposed from the piston extension divider wall 352. The further piston extension opening 356 is also bounded by a further piston extension opening that has a seal similar to seal 354. The piston extension opening seal is also operative to engage the cylindrical outer wall of the piston extension 344 in fluid tight engagement in most of the axial positions of the piston. In some exemplary arrangements having the piston extension journaled in the piston extension openings 350, 356 serves to help support and guide the piston so as to maintain its axially centered position as it is moved along the axis. Of course it should be understood that this configuration is exemplary and that other arrangements may be used.

The exemplary valve body further includes a plurality of fluid ports similar to the control valves that have been previously discussed. The exemplary valve body includes a liquid inlet port (A) that is not shown in the cross-sectional view of FIG. 18 but may be similar to the liquid inlet ports of the valves previously discussed. The liquid inlet port is in fluid connection with a fluid cavity 360 within the valve body. The exemplary valve body further includes a liquid outlet port (B) that is similar to the liquid outlet ports of the valves previously discussed but that is also not visible in the cross-sectional view shown. The outlet port (B) is in fluid connection with a fluid cavity 362 within the valve body.

The exemplary valve body 320 further includes a drain port 364 and labeled (C). The drain port is in fluid connection with a fluid cavity 366 within the valve body. The exemplary valve body 322 further includes an annular tank engagement portion 368. Tank engagement portion 368 is configured to releasably engage a liquid treatment tank which may be like the tanks previously discussed, in threaded fluid tight engagement. The annular tank engagement portion 368 includes a tank port 370 therein labeled (D) and another tank port 372 labeled (E) therein. The exemplary tank port (E) is configured to engage the top of a tube similar to tube 22, that extends in the tank to a strainer similar to strainer 30 previously discussed. Similar to the previously described arrangement the tank is configured to hold treatment material such as water softener resin which is operative to accomplish ion exchange and remove undesirable ions and other contaminants from water that passes therethrough. In the exemplary arrangement the tank port D is configured to be positioned in direct fluid connection with an upper side of the tank interior area above the treatment material in the tank, while the tank port E is fluidly connected through the tube in fluid connection with the opposed side of the treatment material. Of course this configuration is exemplary and in other arrangements other approaches may be used.

The exemplary valve body further includes a further port 374 which is labeled (F). In the exemplary arrangement the further port F is configured for fluid connection with a further tank that houses regeneration material that is usable to regenerate the treatment material housed in the liquid treatment tank. In the exemplary arrangement the further port F is in fluid connection with a water softener salt brine tank that holds brine that is usable to regenerate the treatment material in the water softener treatment tank in a manner like that previously discussed.

The exemplary valve 320 further includes within the valve body 322 an injector 376. The injector 376 may be similar to the injectors previously discussed that are usable to enable liquid from the inlet port A and regeneration material from the further port F to flow through the injector and be combined in the injector for delivery through the valve body and into one of the tank ports. The delivery of the regeneration material into the treatment material enables the treatment material to be regenerated in a manner like that previously discussed after the ion exchange capabilities thereof to remove undesirable ions have degraded. Of course the use of an injector 376 for this function of drawing and combining the liquid and the regeneration material is exemplary and in other arrangements other approaches may be used. Alternatively it should be understood that in some control valve arrangements the injector function may not be included. Further other exemplary valves may include additional features and components that enable different or other types of liquid treatment functions.

Exemplary arrangements of the valve 320 may be controlled by a valve controller in a manner like that previously discussed herein. Further in other arrangements the valve 320 may be in operative connection with the valve controller that operates as a slave controller responsive to communications with a remote master controller of the types discussed in the incorporated disclosures. As explained in the incorporated disclosures the use of a central or master controller enables the operation and control of multiple types of devices, sensors and components that may be part of a water management and control system that may be utilized in a facility to monitor and control the treatment and delivery of water or other liquids, and to monitor liquid use conditions and other types of conditions that may occur. Further such exemplary systems as described in the incorporated disclosures may enable a user to remotely monitor and control devices that are included in the water management and monitoring system. Numerous different arrangements for control of the exemplary fluid control valve may be provided in different arrangements.

Figure 18:
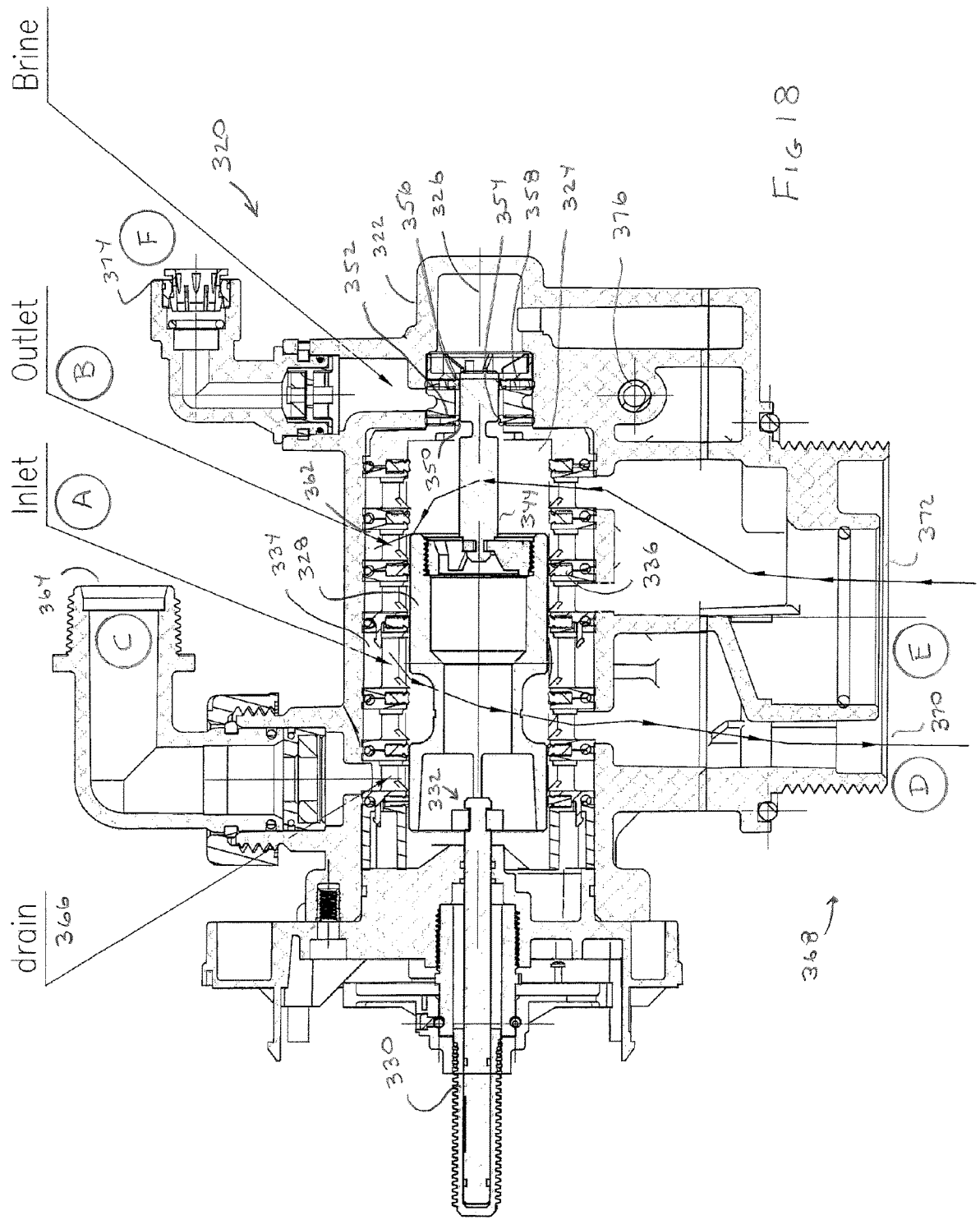
FIG. 18 is a cross-sectional view of an alternative exemplary control valve shown in a service condition.

FIG. 18 shows the valve 320 in a service condition in which liquid, which in the exemplary arrangement is primarily water, is delivered to the inlet port A of the valve. The water passes as represented by the arrows in the service position of the piston shown, through the flow passages in the valve and the piston 328 to the flow passage associated with tank port D. The water then flows downward in the connected tank in a manner like that previously discussed, and through the treatment material until it reaches the strainer at the bottom side of the treatment material. As the water passes through the treatment material the water undergoes ion exchange in a manner like that previously discussed as well as filtration.

The water that reaches the strainer flows therethrough and passes upward through the interior of the tube in a manner like that previously discussed. Water from the tube is delivered into the valve body through the tank port E. The treated water delivered from the tube to the tank port E passes through the fluid passages of the valve and the bore as shown, to the outlet port B. The treated water is then delivered from the outlet port through one or more delivery lines to the water use devices in the facility that utilize the treated water.

Figure 19:
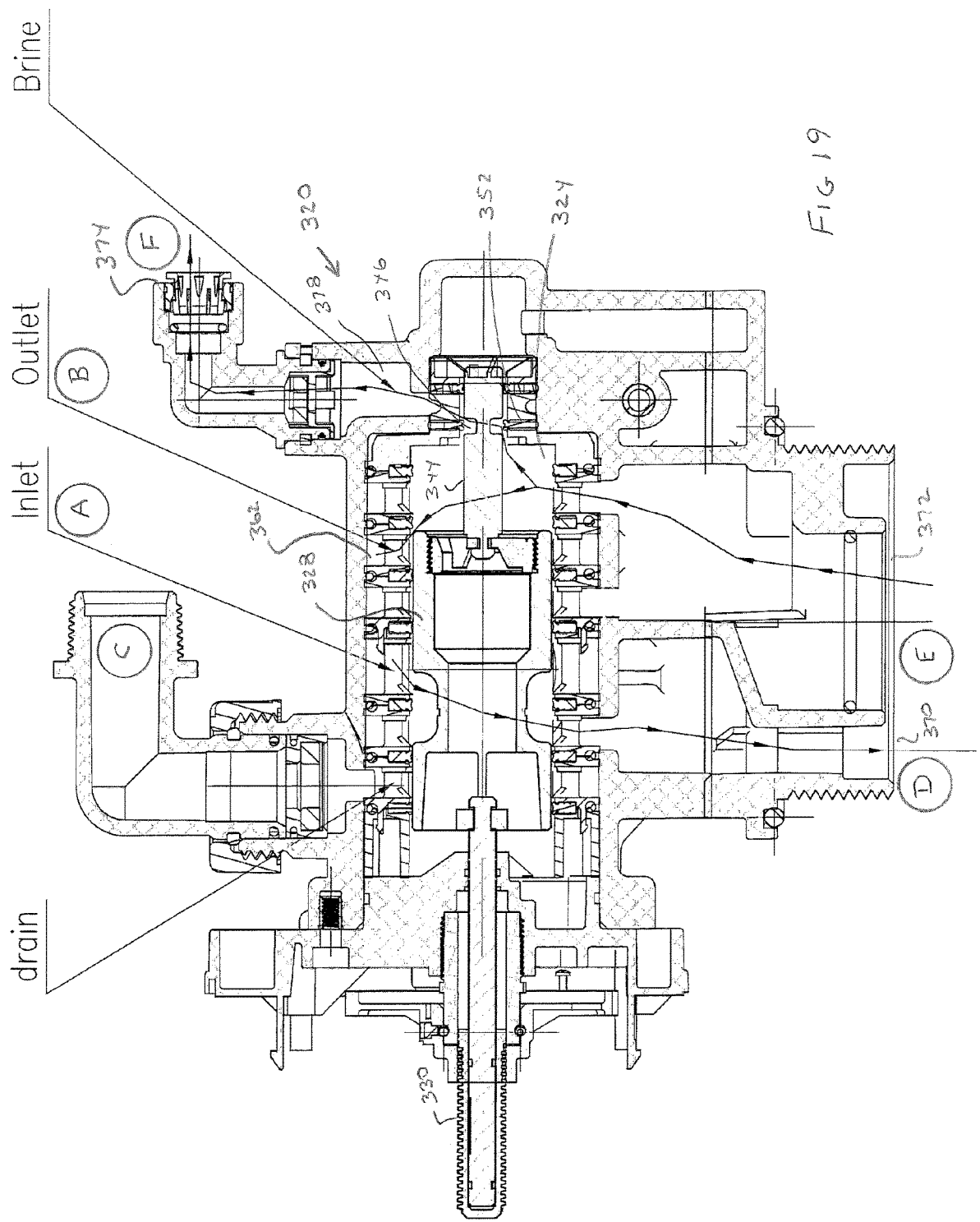
FIG. 19 is a cross-sectional view of the alternative exemplary control valve of FIG. 18 shown in a treated liquid delivery to further tank condition.

In the exemplary arrangement and responsive to operation of at least one valve controller in operative connection with the control valve, the controller is operative to determine that the further tank which in the exemplary system comprises a water softener salt brine tank, requires additional water therein for the generation of brine. Based on a determination of the need to provide additional filtered water to the water softener brine tank, the at least one valve controller is operative to cause at least one motor associated with the valve controller and in operative connection with the piston rod 332, to axially move the piston 328 from the service position of the piston shown in FIG. 18 to a treated liquid delivery to further tank position of the piston which is shown in FIG. 19.

In this exemplary arrangement in this position of the piston as represented by the arrows, water is enabled to flow from the inlet port A through the valve body and out of the tank port D and to pass through the treatment material. The water that has passed through the treatment material returns to the valve body through the tank port E and passes through the valve body to the outlet port B. As a result treated water continues to be delivered to the outlet port B when the piston is in the treated liquid delivery to further tank position. However in this position of the piston in the exemplary arrangement, the piston extension 344 is positioned so that the annular recess 346 therein is radially aligned with the divider wall 352. In this position the piston extension opening seal 354 is not engaged with the outer cylindrical surface of the piston extension. This enables the treated liquid to flow from the bore 324 within the valve body and across the radially extending divider wall 352 through the annular flow passage provided by the annular recess 346 in the piston extension. The treated water then flows through a passage 378 within the valve body and is delivered from the further port F. From the further port F the treated water is delivered to the water softener salt brine tank. The amount of water delivered to the tank is controlled in the manner like that discussed in connection with the incorporated disclosures and/or as later discussed herein so as to provide the proper amount of filtered water to the tank and produce a suitable amount of water softener salt brine for later use in regeneration of the treatment material. Of course it should be understood that this configuration for delivering treated water to the further tank that holds brine is exemplary and in other arrangements other approaches may be used.

Figure 20:
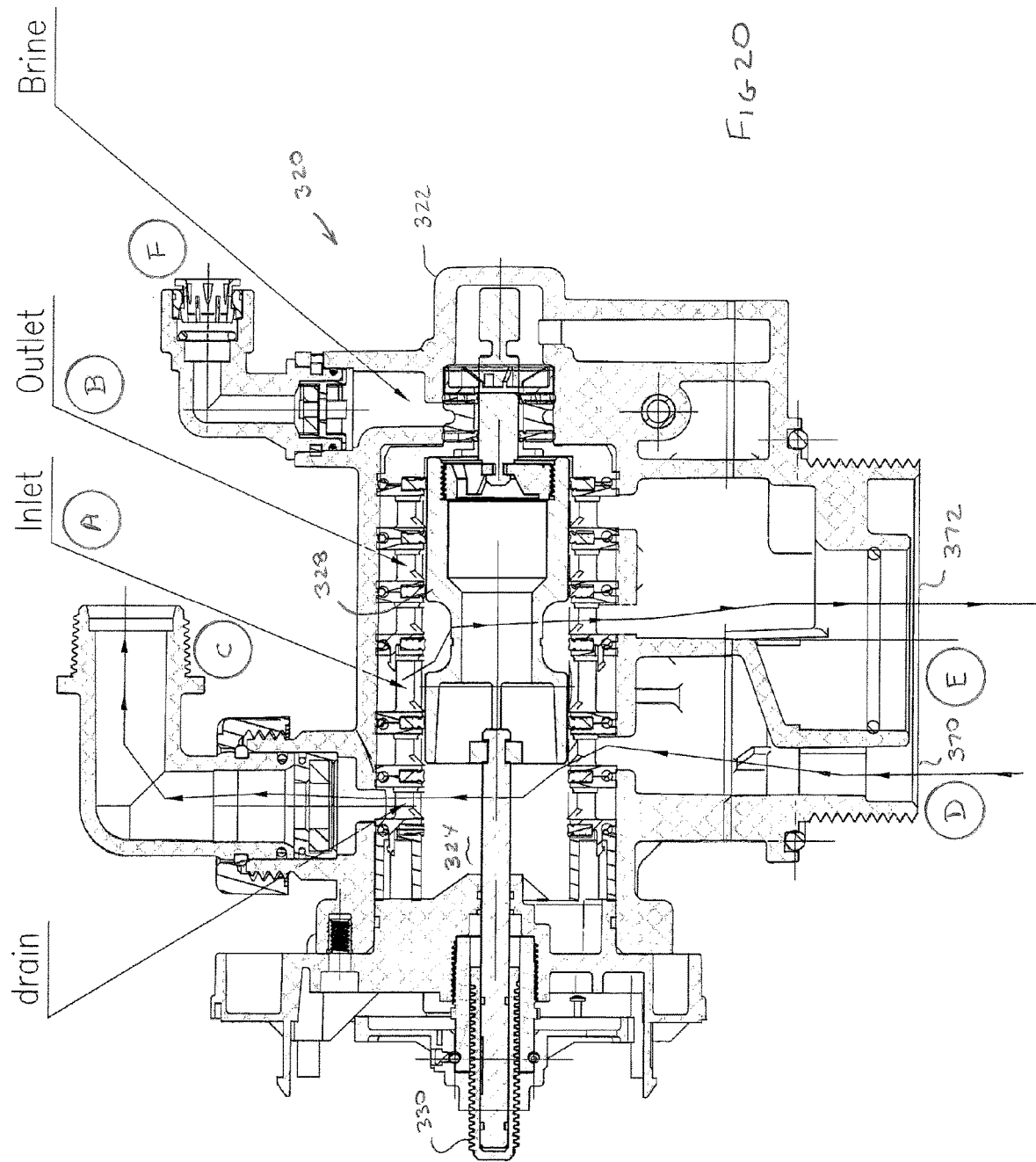
FIG. 20 is a cross-sectional view of the alternative exemplary control valve of FIG. 18 shown in a backwash condition.

As previously discussed herein, after the treatment material has been utilized for a period of time its ability to effectively treat the water that is passed therethrough declines. The determination of the permitted loss of effectiveness of the treatment material may be based on the passage of an amount of time, the amount of water that has passed through the material since the last regeneration cycle, sensing certain properties of the treated water or in other ways such as those previously discussed herein or that are discussed in the incorporated disclosures. When it is determined that the treatment material requires regeneration, the at least one valve controller is operative to move the piston 328 so that it is positioned in a backwash position that is shown in FIG. 20. In the exemplary arrangement in the backwash position, the piston 328 is positioned so that the fluid cavity 362 is closed off by the cylindrical outer surface of the piston, and the outlet port B of the valve is not in fluid flow connection with any other port of the valve.

In this backwash position of the piston 328, water is received through the inlet port A of the valve and passes through the flow cavities of the valve body and the piston and is delivered to the tank port E. The water passes downward through the tube and outward through the strainer that is positioned at the lower side of the treatment material within the tank. The water then flows upward through the treatment material backwashing the material. The backwashing of the treatment material frees contaminants that have collected in the material in a manner like that previously discussed. The water carrying the backwash contaminants flows upward in the interior area of the tank and into the tank port D of the valve body 322. The liquid then flows through the fluid passages and the bore 324, and flows out of the valve body through the drain port C. The water then flows from the drain port to a connected wastewater drain. In this backwash position of the valve the other valve ports are not in fluid flow connection and water does not flow through any other flow paths within the valve.

In the exemplary arrangement water passes through the control valve 320 and the tank in a backwash condition under the control of at least one valve controller. The duration of the backwash may be controlled and maintained for a period of time or based on other parameters such as flow rate and/or total flow so as to assure that the treatment material housed in the tank has been sufficiently backwashed. Of course it should be understood that this approach and the use of a backwash flow as an initial step in a regeneration process of the treatment material is exemplary and in other arrangements other approaches may be used.

Figure 21:
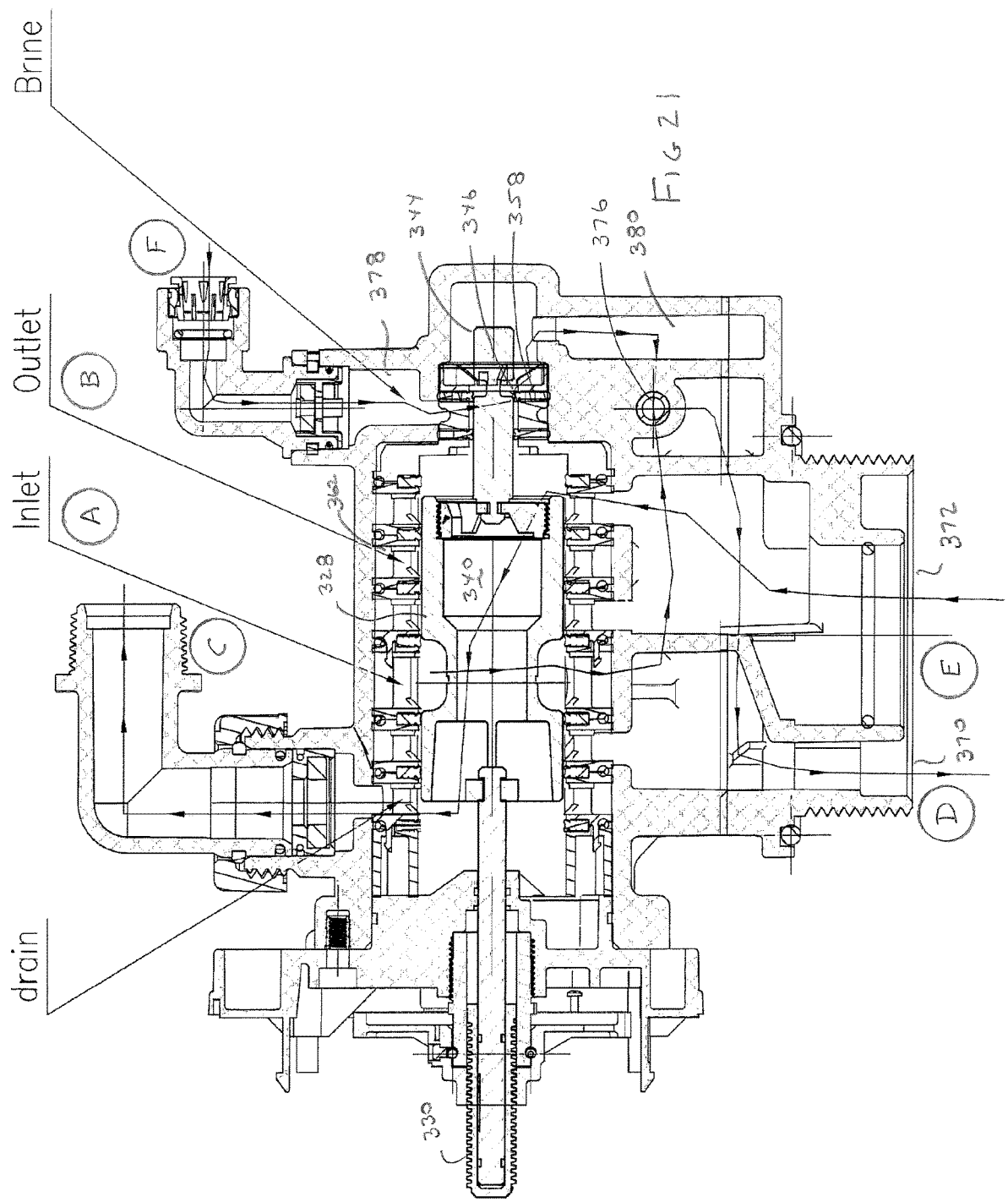
FIG. 21 is a cross-sectional view of the exemplary control valve of FIG. 18 shown in a regeneration material introduction condition.

After the treatment material has undergone the backwash flow the at least one valve controller is operative to cause the at least one motor to move the piston rod and position the piston 328 in a regeneration material introduction position shown in FIG. 21. In the exemplary arrangement in this position of the piston, water enters the body of the valve through the inlet port A and passes through the bore 324 and the flow cavities and passages in the valve to the injector 376. In this position of the piston, the piston extension 344 is axially positioned so that the annular recess 346 is radially aligned with the further piston extension divider wall 358. This enables the flow of water through the injector 376 and also enables water softener brine from the brine tank to enter the valve through the further port F and to flow through the passage 378. As represented by the flow arrows the brine is enabled to flow through the annular recess 346 and across the further divider wall 358 and into a passage 380 within the valve body that is in fluid connection with the injector 376.

The exemplary injector 376 may operate in a manner like that previously discussed to enable the water from the inlet port and the softener salt brine to flow through and be combined in the injector. In some exemplary arrangements the injector may function to provide a suction draw on passage 380 and Port F which helps the brine to flow into and through the passages of the valve. Of course it should be understood that in other arrangements external brine pumps, valves and other delivery and combining arrangements may be used.

As represented by the arrows in FIG. 21 the combined water from the inlet port A and the brine from the further port F flow together to the tank port D. The brine bearing water then flows downward through the treatment material causing the material to undergo regeneration in a manner like that previously discussed. The water softener salt regenerates the treatment material and the water with the displaced contaminants flows upward through the tube and into the tank port E of the valve. The water then flows through the fluid passages of the valve and axially through the axial passage 340 of the piston. The water then exits from the valve body through the drain port C.

Through this process in the exemplary arrangement the treatment material housed in the tank undergoes down flow brining to regenerate the treatment material. It should be understood that in other arrangements the control valve may be configured so that the treatment material may undergo up flow brining to regenerate the material or other alternative approaches may be taken to accomplish the necessary ion replacement and to return the treatment material to suitable water softening effectiveness. Further in other arrangements other types of liquids, treatment materials and regeneration approaches may be used.

Figure 22:
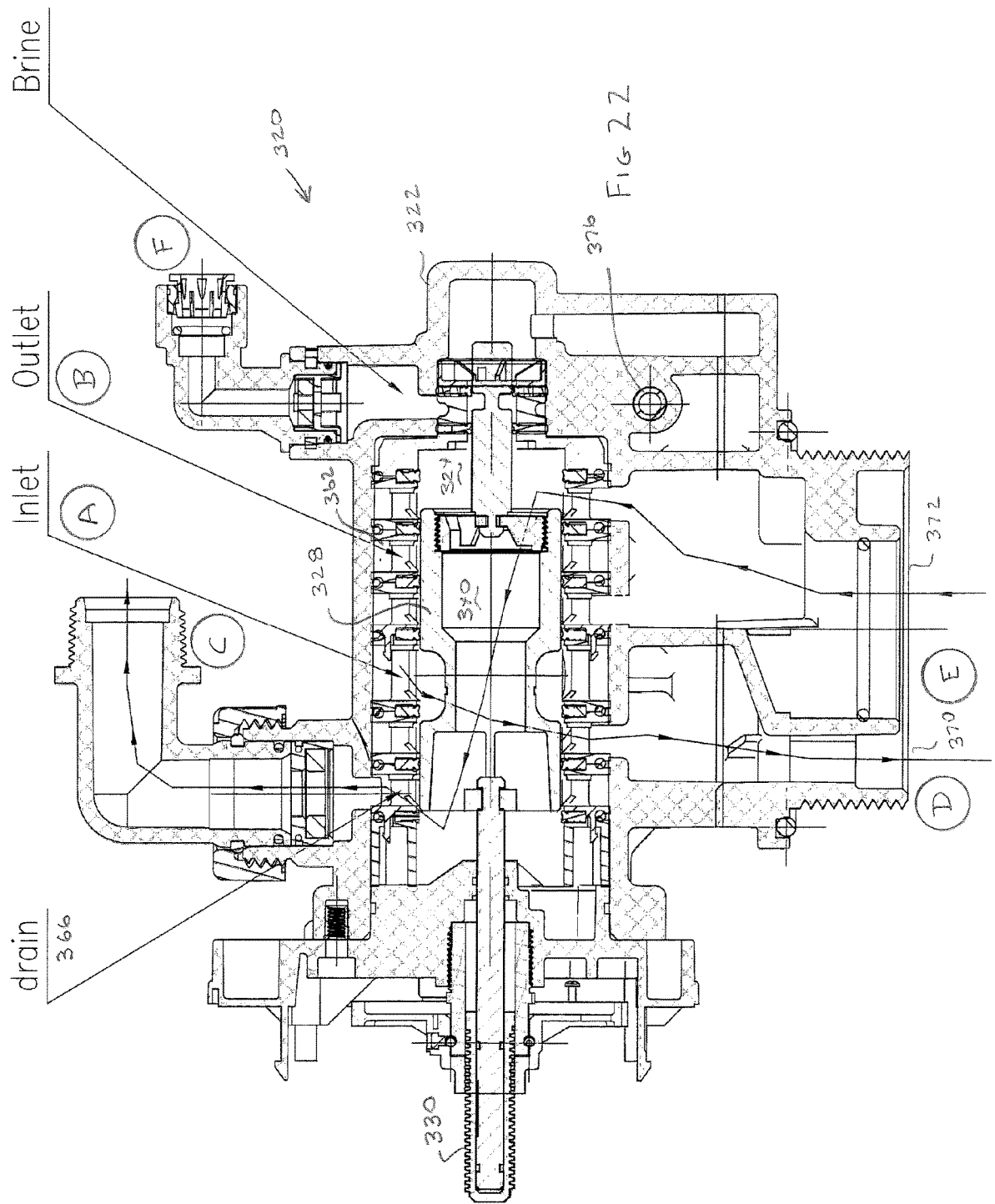
FIG. 22 is a cross-sectional view of the exemplary control valve of FIG. 18 shown in a rinse condition.
Figure 23:
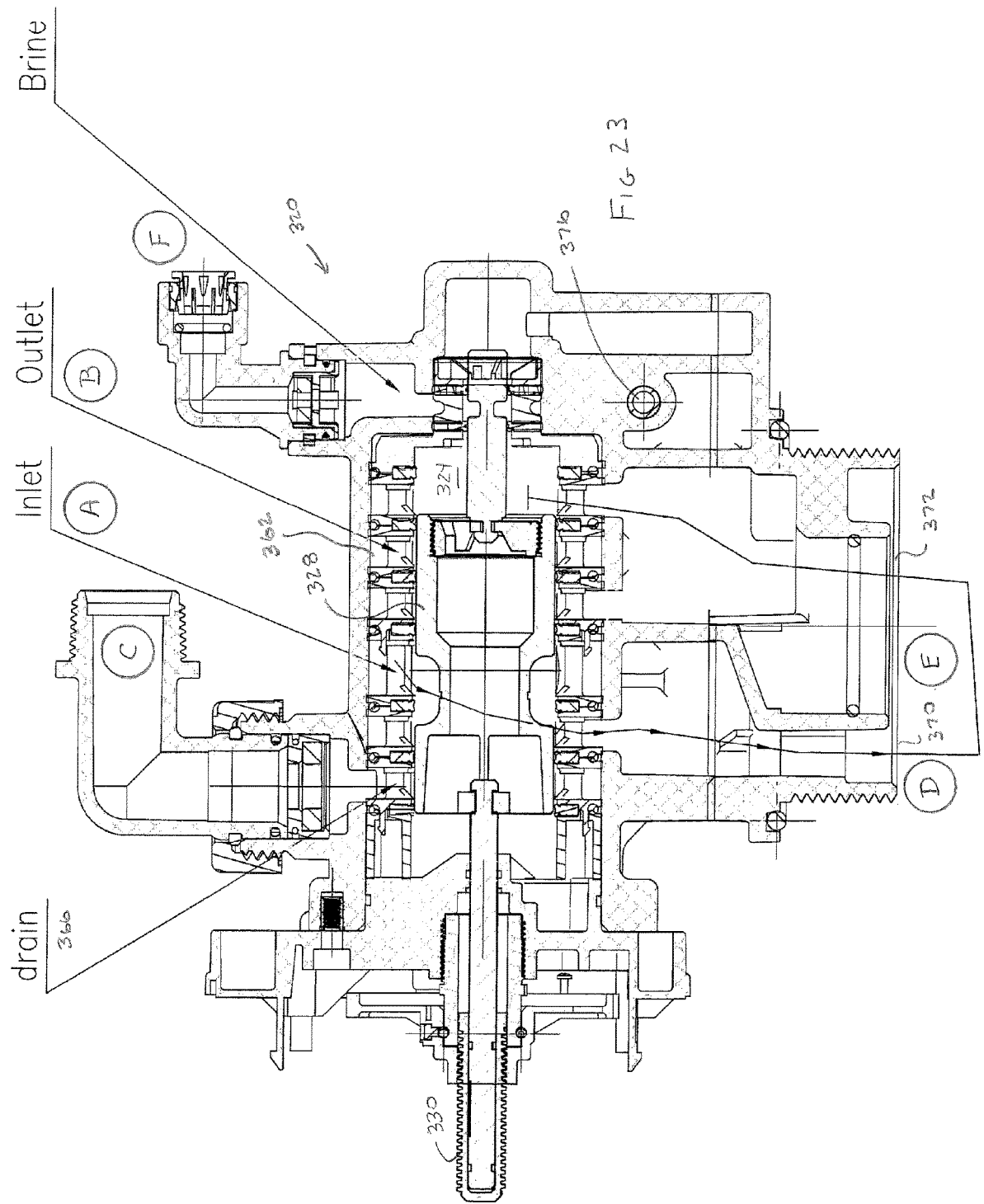
FIG. 23 is a cross-sectional view of the exemplary control valve of FIG. 18 shown in a shut off condition.

After the treatment material has been regenerated through the delivery of the regeneration material, the valve controller then operates to cause the piston 328 to axially move to the rinse position shown in FIG. 22. It should be appreciated that in some arrangements the controller may operate to cause a delay between the time when the regeneration material is disbursed into the treatment material within the interior area of the tank, and the placement of the control valve 320 in the rinse condition. In some arrangements a delay may be provided to further enable the regeneration material such as water softener salt brine, to react with the treatment material and cause more of the undesirable ions therein to be displaced. Of course it should be understood that the timing for the introduction and flow of the regeneration material through the treatment material may depend on the programming associated with the particular valve controller which is configured to be suitable for the type of treatment material and regeneration material that is utilized.

With the valve in the rinse condition water delivered through the inlet port A passes through the annular flow cavities in the valve and the piston as represented by the flow arrows, and leaves the valve body through the tank port D. The water delivered into the interior area of the tank from the tank port D passes downward through the treatment material and into the strainer at the lower side of the treatment material. The water then passes upward through the interior of the tube and back into the valve body through the tank port E. In the exemplary arrangement the rinse water received through the tank port E passes through the flow cavities and the bore 324. The rinse water then passes through the axial flow passage 340 and leaves the bore through the fluid cavity 366. The rinse water then leaves the valve through the drain port C.

The at least one valve controller is operative to cause the control valve 322 to remain in the rinse condition for a sufficient time to enable the regeneration material to be rinsed from the treatment material. Rinsing the regeneration material out of the treatment material helps to assure that only a minimal amount of the regeneration material will be delivered from the liquid treatment tank the next time the valve is returned to the service condition. As can be appreciated, the regeneration material and/or the contaminants which are dissolved in the rinse water may be undesirable for drinking or other water uses. Rinsing the treatment material for a sufficient time to remove virtually all the regeneration material from the interior area of the tank avoids these undesirable properties. Of course it should be understood that this approach is exemplary and in other arrangements other approaches may be used.

It should be noted that in the exemplary arrangement of the control valve 320 the outlet port B of the valve is not in fluid flow connection with any of the other ports of the valve when the piston is in and between each of the backwash, regeneration material introduction and rinse positions. When the valve is in these conditions as well as when the piston moves between these positions, the outlet port B neither receives nor delivers any liquid. This provides for the outlet port B to be closed off from the other flow cavities in the valve despite the fact that water that is delivered to the inlet port A can be directed during the backwash, regeneration material introduction and rinse conditions to cause the treatment material in the tank to undergo regeneration. As can be appreciated in and between each of these valve conditions, the fluid cavity 362 to which the outlet port is directly fluidly connected, is closed off by the engagement of the outer surface of the cylindrical piston with the annular seals that extend at the inward annular surfaces of the radially extending walls in the valve body that bound the cavity 362. As later discussed, this capability of the exemplary control valve may enable the water treatment unit in which the valve is used to have the treatment material undergo regeneration while other treatment units that are connected in parallel are enabled to continue to deliver treated liquid to water use devices. Of course this approach is exemplary and in other arrangements other approaches may be used.

After the at least one valve controller that is in operative connection with the valve 320 has caused the treatment material in the associated liquid treatment tank to undergo regeneration and rinse, the controller may operate to cause the valve to return to the service condition as represented in FIG. 18. This may be accomplished by axially moving the piston 328 from the rinse position shown in FIG. 22 to the service position. Alternatively the exemplary fluid control valve may be placed in a shut off/standby condition by moving the piston axially to a shut off position shown in FIG. 23. In the shut off condition the inlet port A is not in fluid flow connection with any other port of the valve through the valve body. In the exemplary arrangement as represented by the flow arrows in FIG. 23, while the inlet port A is fluidly connected through the valve body with the tank port D and the interior area of the treatment tank, and the tank port E is connected to the bore 324 of the valve, the fluid cavity 362 which is directly fluidly connected to the outlet port B is closed by the external cylindrical surface of the piston 328. As a result no flow through the valve or the tank may occur. Further as can be appreciated from FIGS. 22 and 23, no flow into or out of the outlet port B may occur as the piston is moved between the rinse position and the shut off position.

In the exemplary arrangement the valve in the shut off position maintains the fluid pressure that is applied at the inlet port A of the valve within the tank interior area. This helps to assure that suitable pressure is maintained on the tank walls and that there is no suction applied to the tank which might result in undesirable stresses or potential collapse of certain structures. Further in exemplary arrangements when the valve is changed from the shut off condition shown in FIG. 23 to the service condition or the other valve conditions, the risk of pressure spikes or shock is minimized. Further in exemplary arrangements the configuration of the exemplary control valve 320 which is enabled to be placed in a shut off/standby condition, enables the liquid treatment unit with which the valve is associated to remain ready after regeneration of the treatment material until delivery of treated liquid from the unit is required. Alternatively or in addition, in exemplary arrangements the ability to place the valve in the shut off position may facilitate holding regeneration material or other material within the interior area of the tank without flow therethrough for an extended period of time. This may be done by a valve controller in some arrangements to accomplish a greater degree of regeneration of the treatment material. Alternatively in other arrangements holding an introduced material in the interior area of the tank may facilitate other types of conditions that may be desirable such as cleaning and/or sterilization. Of course it should be understood that these approaches are exemplary and in other arrangements other approaches may be used.

FIGS. 25-28 show three fluidly interconnected water treatment systems 382, 384 and 386. Each of the water treatment systems includes a valve like the fluid control valve 320, and a liquid treatment tank like that previously discussed. In the exemplary arrangement each liquid treatment system comprises a water softener that is suitable for filtration and removing undesirable ions from water. Although not shown in the exemplary arrangement, each of the fluid control valves of the water softeners is in fluid connection with a water softener salt brine tank in a manner like that previously discussed.

As represented in FIGS. 25 through 28 each of the water softeners 382, 384 and 386 includes a respective fluid control valve 388, 390 and 392. Each of the fluid control valves in the exemplary arrangement have corresponding fluid ports and are capable of operating in the same manner as the control valve 320 previously described. Of course it should be understood that in some arrangements the components and configurations of the valves may be somewhat different. However for purposes hereof the valves will be considered to have corresponding fluid ports and to operate in the same manner as the valves have components that are capable of providing the functions that have been described in connection with valve 320 herein.

Each of the water softeners is in fluid connection with an untreated water delivery line 394. As can be appreciated line 394 is fluidly connected to the inlet port A of each respective control valve 388, 390 and 392. Each fluid control valve is also fluidly connected to a treated water outlet line 396. Water outlet line 396 is fluidly connected to each outlet port B of each fluid control valve 388, 390 and 392. Each of the fluid control valves associated with each of the water softener systems is also fluidly connected to a respective drain line which is connected to a water drain 398. In the exemplary arrangement valve 388 is connected to a drain line 400 that is fluidly connected to the drain port C of valve 388. A drain line 402 is connected to the drain port C of valve 390, and a drain line 404 is connected to the drain port C of valve 392. Further it should be appreciated that each of the fluid control valves 388, 390 and 392 include respective tank ports D and E which are located in the interior areas of the respective water softener tanks.

In the exemplary arrangement each of the fluid control valves 388, 390 and 392 are operated in coordinated relation through communication with a remote master controller in a manner like that described in the incorporated disclosures. Further each of the control valves is in operative connection with a slave controller similar to that described in the incorporated disclosures. The respective slave controller associated with the respective valve is in operative connection with the at least one motor that is operative to control the axial position of the respective piston of the valve and the condition of the respective valve. In this exemplary arrangement the remote master controller is operable to make determinations as to the conditions which exist in the water management system and to change the conditions of the valves and the water softeners as appropriate to meet the needs of the particular system.

Figure 25:
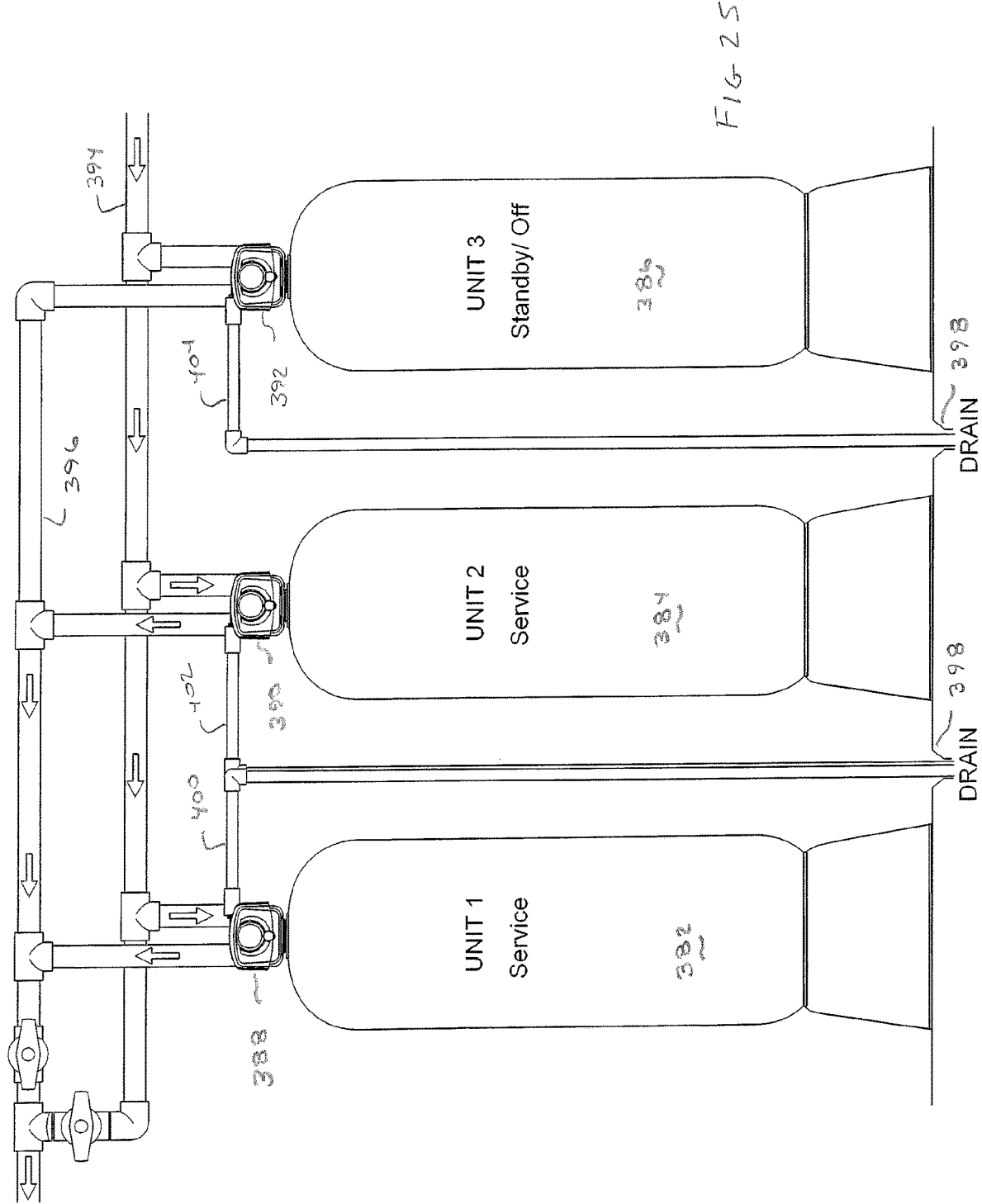
FIG. 25 shows an arrangement of three liquid treatment systems which comprise water softeners, with two of the units in the service condition.
Figure 26:
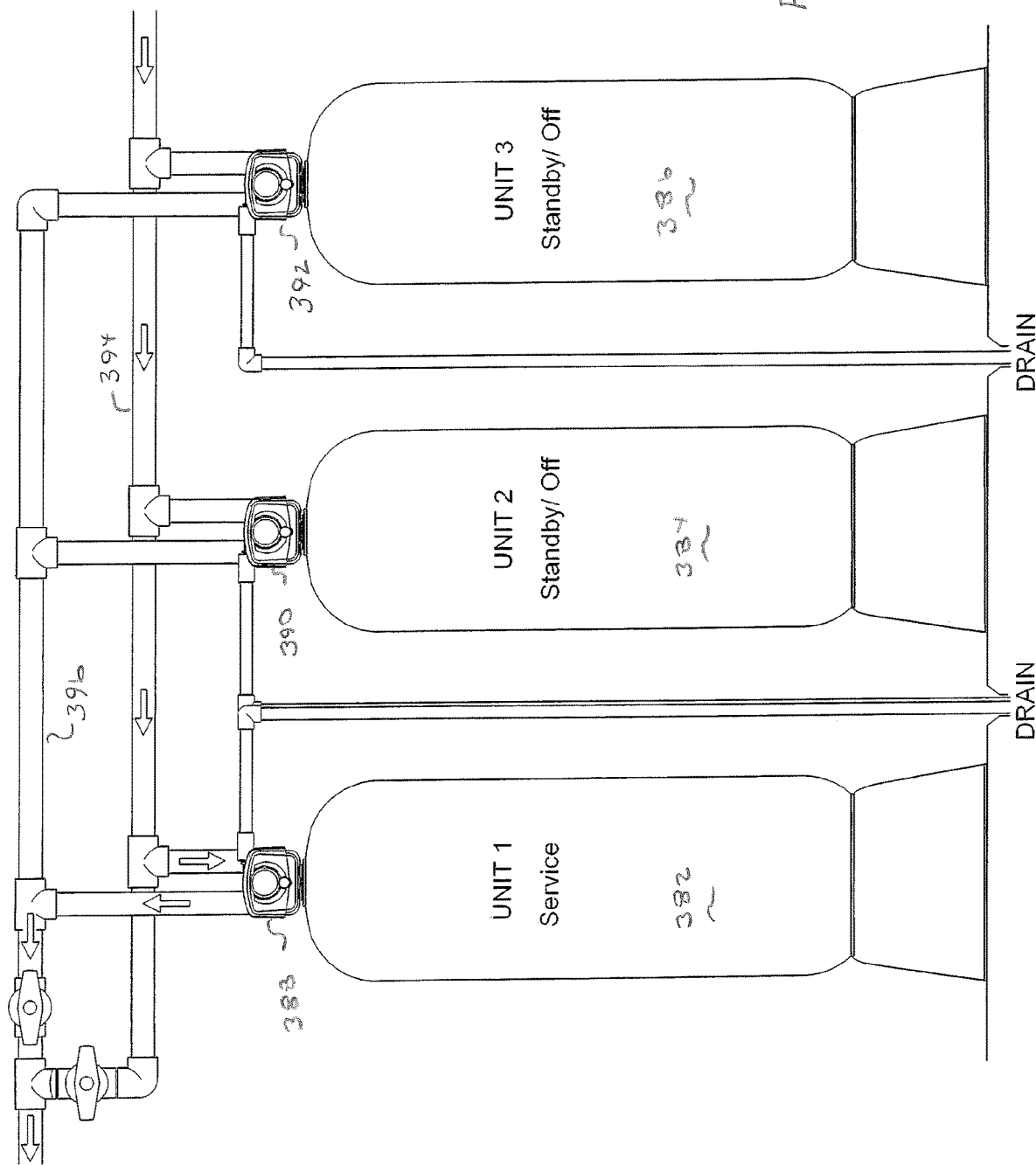
FIG. 26 shows the arrangement of three liquid treatment systems shown in FIG. 25 with one of the units in the service condition and two of the units in a shut off/standby condition.

As represented in FIG. 25 the water softener 382 and the water softener 384 are each in the service conditions. The water softener 386 is in the shut off/standby condition so that water does not flow through the valve or tank associated with water softener 386. The master controller may cause each of the two water softeners to be in the service condition based on sensed flow, pressure or other conditions that are detected through suitable sensors that are in operative connection with the master controller. As can be appreciated in exemplary arrangements if the master controller receives signals that further treated water flow is needed by the water use devices connected in the system, the master controller may operate to meet this need by changing the water softener 386 to the service condition. Likewise in the event that the master controller is operative to determine that a lesser volume of water is needed, the master controller may operate to cause the control valves of two of the water softeners to be in the shut off condition. This is represented in FIG. 26. Further as can be appreciated in some arrangements such as those discussed in the incorporated disclosures, the master controller may operate to cause all of the water softeners to be in the shut off condition. This may be done for example in situations when a leak or other undesirable conditions are detected. Alternatively this may be done on a timed basis based on programmed time windows when water is not to be delivered to water use devices. Further this may be done responsive to instructions that are received by the master controller from a remote computer such as a smart phone associated with the operator of the particular facility in which the water softeners are used. Of course these approaches are exemplary and in other arrangements other control approaches may be utilized.

Figure 27:
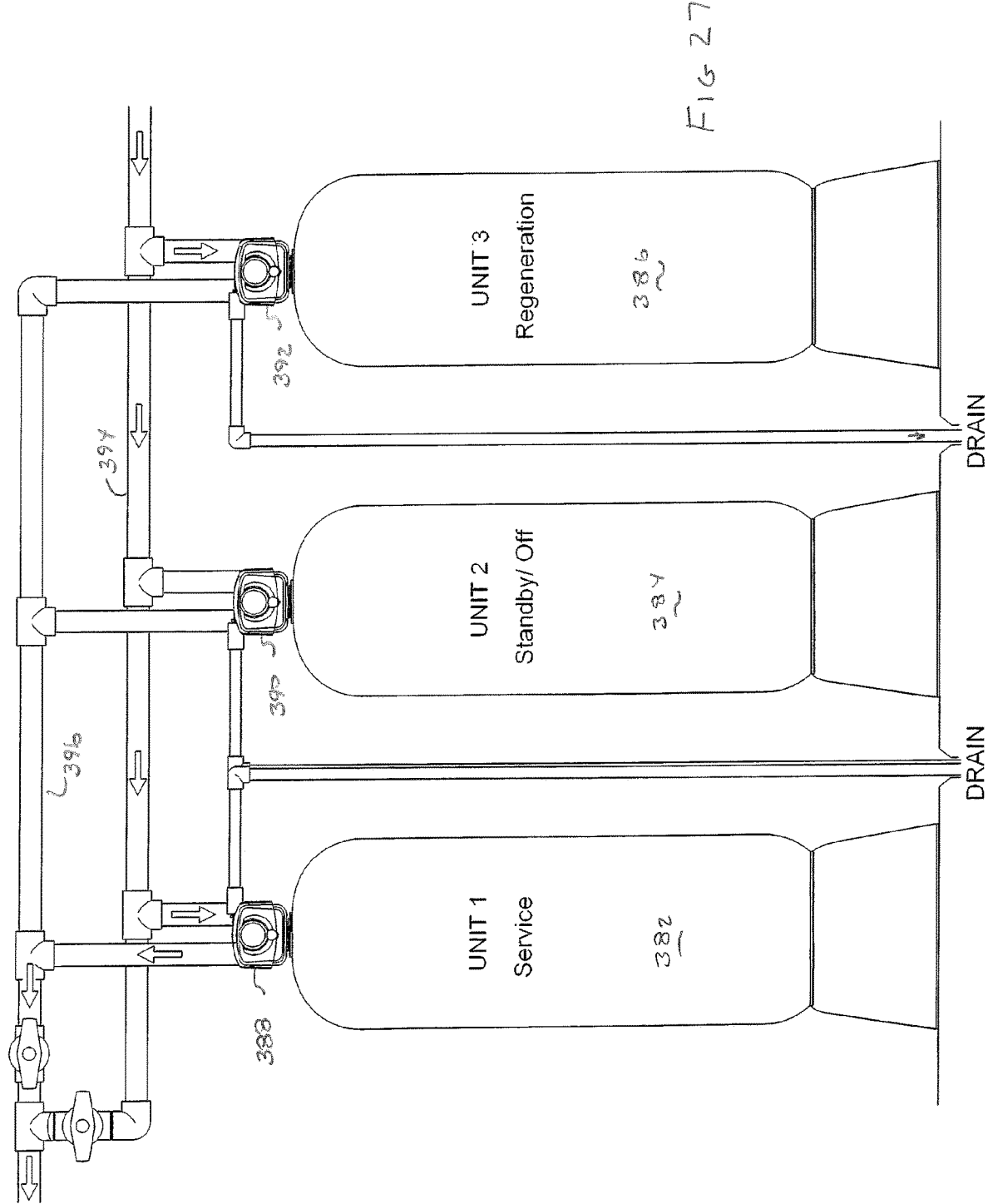
FIG. 27 shows the arrangement of three liquid treatment systems shown in FIG. 25 with one of the units in the service condition, another of the units in a shut off/standby condition and a third unit in a regeneration condition.

FIG. 27 represents a condition in which a valve controller has caused the water softener 382 to be in the service condition to provide treated water to the water outlet line 396. As represented in this condition water softener 384 has been placed in the shut off/standby condition. Water softener 386 is caused by the master controller to be placed in a regeneration cycle. As can be appreciated from the prior explanation concerning the exemplary control valve 320, the exemplary valve 392 enables the water softener 386 to go through a regeneration cycle including the backwash, regeneration material introduction and rinse conditions while the outlet port B of the valve is continuously maintained closed. Thus the exemplary water softener unit 386 is enabled to be fully regenerated without disturbing the supply of treated water to the water outlet line.

Figure 28:
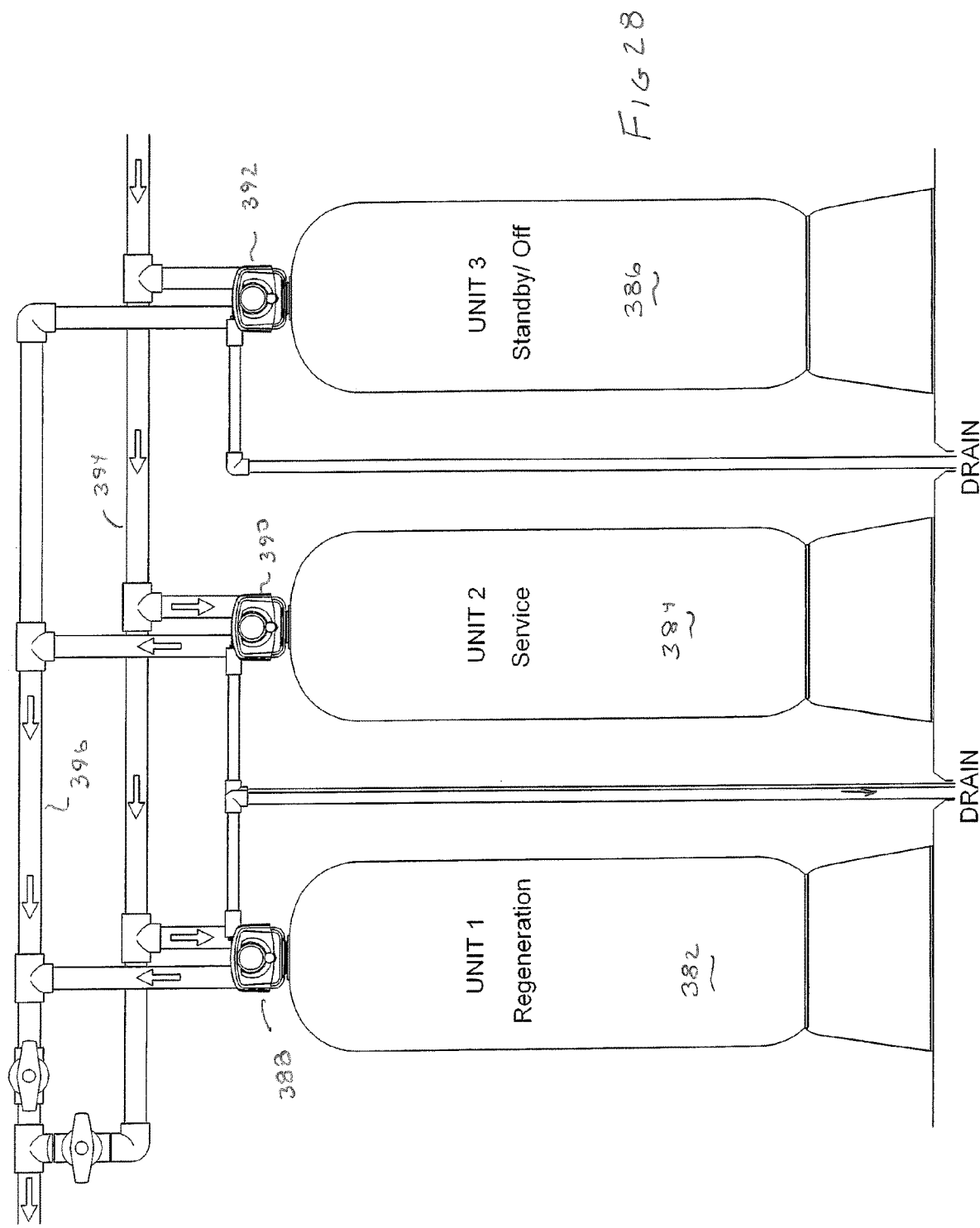
FIG. 28 shows the arrangement of three liquid treatment systems shown in FIG. 25 with the units changed from the conditions shown in FIG. 27.

As represented in FIG. 28 the exemplary master controller may control the valves associated with the respective water softeners to be changed to appropriate conditions as needed for the supply of treated water. For example water softener 392 after going through a regeneration cycle may be caused to be placed in the shut off/standby condition. If the master controller has determined that the water softener 382 which had been supplying the treated water to the water use devices is in need of regeneration, the water softener 384 which was in the shut off condition may be placed by the master controller into the service condition to supply the treated water needs of the water use devices. The master controller may then cause the water softener 382 to undergo a regeneration cycle.

As can be appreciated the exemplary control valves may be operated responsive to the master controller to independently place each of the water softeners in any desired condition as appropriate to meet the requirements of the water management system. It should be understood while in this exemplary system three separate water softeners are shown, in other arrangements a different number of water softeners or other water treatment systems may be utilized. The arrangement and components shown in the exemplary systems are exemplary and in other systems other arrangements and types of components may be utilized.

Figure 29:
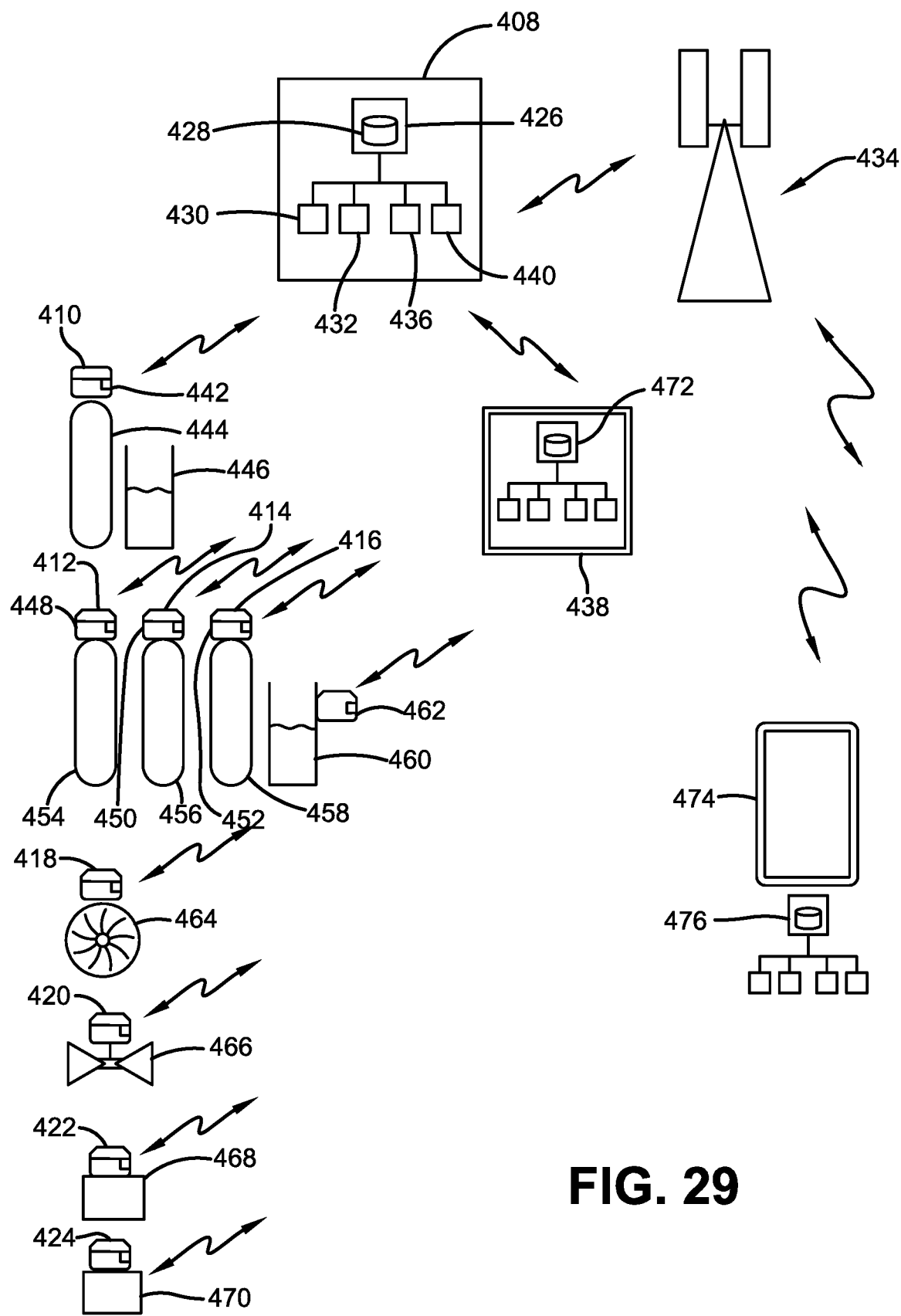
FIG. 29 is a schematic representation of an exemplary liquid treatment control system.

FIG. 29 shows schematically in exemplary system which may be used for liquid treatment such as water treatment. The exemplary system includes liquid treatment devices of the types previously described herein as well as treatment devices and other devices like those disclosed in the incorporated disclosures. The exemplary system includes a plurality of valve controllers. Exemplary controllers may include at least one master controller 408. The exemplary master controller may be similar to those described in the incorporated disclosures. The master controller includes one or more circuits that are operative to communicate signals with one or more slave controllers such as slave controllers 410, 412, 414, 416, 418, 420, 422, 424 and 462. In exemplary arrangements the master controller 408 includes at least one circuit including a processor schematically indicated 426 and at least one data store schematically indicated 428. In exemplary arrangements the processor 426 may include a processor suitable for carrying out circuit executable instructions that are stored on or in instruction storage mediums that serve as one or more associated data stores. The processor includes or is in operative connection with a nonvolatile storage medium including instructions that include a basic input/output system (BIOS). For example, the processor may correspond to one or more of the combination of a CPU, FPGA, ASIC or any other integrated circuit or other type of circuit that is capable of processing data and instructions. The data stores may correspond to one or more of volatile or nonvolatile memories such as random access memory, flash memory, magnetic memory, optical memory, solid-state memory or other structures that are operative to store circuit executable instructions and data. Circuit executable instructions may include instructions in any of a plurality of programming languages and formats including without limitation, routines, subroutines, programs, threads of execution, objects, methodologies and functions which carry out the actions such as those described herein and/or in the incorporated disclosures. Structures for processors may include, correspond to and utilize the principles described in the textbook entitled Microprocessor Architecture, Programming and Applications with the 8085 by Ramesh S. Gaonker, Sixth Edition (Penram International Publishing 2013) which is incorporated herein by reference in its entirety.

The exemplary data stores used in connection with exemplary arrangements may include any one or more of several types of mediums suitable for holding circuit executable instructions. These may include for example, magnetic media, optical media, solid-state media or other types of media such as RAM, ROM, PROMs, flash memory, computer hard drives or any other form of media suitable for holding data and circuit executable instructions. Exemplary master controllers may include other components such as hardware and/or software interfaces for communication with the slave controllers and other devices. Such interfaces may include for example a wireless interface 430 which provides wireless communication with the slave controllers via a local wireless network in a manner like that discussed in the incorporated disclosures. Further exemplary arrangements may include an interface 432 which is suitable for wireless communication in connection with a wide area network 434 such as for example a suitable cellular network or satellite network. Other exemplary arrangements may include for example an interface 436 for communication with a local user interface such as a tablet device 438. Other interfaces 440 may be provided to numerous other different types of devices and systems which are to be in operative connection with the master controller 408.

In the exemplary arrangements the slave controllers further include circuitry structures of the type used in the master controller 408. Each of the slave controllers is operative to communicate with the master controller wirelessly and in many cases to operate an associated device responsive to communication with the master controller. In the exemplary arrangement the master controller is shown in communication with a control valve 442 which may be like the control valves previously discussed, which is in operative connection with a liquid treatment tank 444 which houses treatment material. The exemplary valve 442 may be like the valves previously described and may be in operative connection with a further tank 446 which is suitable for housing regeneration material such as water softener salt and brine in a manner like the tanks described in the incorporated disclosures. Such disclosures include without limitation, U.S. Pat. No. 9,202,070 which is incorporated herein by reference in its entirety. Tank 446 may further include features of tanks configured for housing regeneration materials discussed herein.

Exemplary arrangements may also be in operative connection with liquid treatment tank arrangements of the type described herein. Such tank arrangements may include those that enable greater capacity of delivery of treated liquid as well as the ability to have one treatment tank undergo regeneration while one or more other liquid treatment tanks are in a service condition. For example, control valves 448, 450 and 452 are in operative connection respectively with slave controllers 412, 414 and 416. Control valves 448, 450 and 452 are respectively in operative connection with liquid treatment tanks 454, 456 and 458 respectively. In exemplary arrangements liquid treatment tanks 454, 456 and 458 may be in operative connection with one or more further tanks 460 that are configured for holding regeneration material such as softener salt and brine in a manner like that previously discussed. In some exemplary arrangements multiple liquid treatment tanks may be provided with regeneration material from a common regeneration material holding tank. Regeneration material holding tank 460 may include features like those discussed herein and/or in the incorporated disclosures. Further in exemplary arrangements the regeneration material holding tank 460 and the devices associated therewith may be in operative connection with a slave controller 462. Slave controller 462 is operative to communicate with the master controller or in some arrangements with other slave controllers to enable control of the associated devices of the regeneration material holding tank.

Exemplary systems may further include a liquid pump 464. As schematically shown, pump 464 is associated with a slave controller 418. Pumps in exemplary arrangements may be controlled responsive to the master controller to pump liquid to or from various locations in the system. It should be understood that in various systems multiple types of pumps or other devices for achieving the flow of liquid may be used.

Slave controller 420 is shown schematically in operative connection with a valve 466. Valve 466 may be a valve suitable for controlling the flow of liquid from various points of the system. Such valves may include valves with single or multiple fluid paths through the valve. Such valves may include valves of the types discussed in the incorporated disclosures which provide the capability of providing controlled liquid flow to various devices and points in the system. Of course it should be appreciated that systems may have numerous valves of different types in operative connection therewith.

As schematically shown slave controller 422 is in operative connection with a sensor 468 and slave controller 424 is in operative connection with a sensor 470. Sensors 468 and 470 may be of the types discussed in the incorporated disclosures. Such sensors may include for example moisture sensors, pressure sensors, flow sensors, temperature sensors, presence sensors or other suitable sensors which are useful in connection with operation of the system. Such sensors may also include sensors the types discussed herein. Further in exemplary arrangements slave controllers may be in operative connection with numerous different types of other devices that are utilized in connection with exemplary systems.

In the exemplary arrangement the tablet 438 provides a suitable local user interface for purposes of enabling user control and monitoring of the exemplary system. The exemplary tablet includes circuitry 472 which may include structures of the types previously discussed in connection with the master controller and the slave controller. The exemplary tablet further includes suitable interfaces for the associated devices which provide communications as required for controlling and monitoring of the system. Such functions may include those described in connection with the incorporated disclosures. Further it should be understood that although a tablet device is described as the exemplary local user interface other types of interface devices may be used. The reference to a tablet device will also be deemed to include laptops, PCs, augmented reality devices, virtual reality devices and other types of devices which include user interfaces with input and output devices that are suitable for monitoring and control of the particular system.

Further in exemplary arrangements the master controller may be in operative connection with a mobile wireless device 474. In exemplary arrangements the mobile wireless device may include a smart phone or other suitable device that can communicate in a wide area network with the master controller and/or other devices included in the system. The exemplary mobile wireless device includes circuitry schematically represented 476 that includes structures of the type previously described in connection with the master controller and the slave controllers. The exemplary mobile device may provide capabilities like those discussed in connection with the incorporated disclosures. These include monitoring the condition of devices that are part of the system, receiving alerts or other notices of conditions that are detected in the system, and/or remotely controlling devices included in the system.

Of course it should be understood that the controller configurator and the number and types of devices that are shown schematically in FIG. 29 are merely exemplary of the types of devices that may be included in exemplary liquid management systems. Other arrangements may include different controller configurations and types and numbers of devices and alternative control arrangements and capabilities.

In exemplary arrangements the at least one valve controller is operative to control at least one control valve associated with at least one liquid treatment tank to cause the delivery of a suitable quantity of regeneration material to the liquid treatment tank to regenerate the treatment material in the tank. Exemplary arrangements may be operative to detect and avoid conditions in which there is an inadequate supply of regeneration material in solution to regenerate the liquid treatment material. Exemplary arrangements of the at least one valve controller are further operative to detect and/or avoid certain conditions that impact the operation of the tank that holds the regeneration material or that may adversely impact operation of the system.

Figure 30:
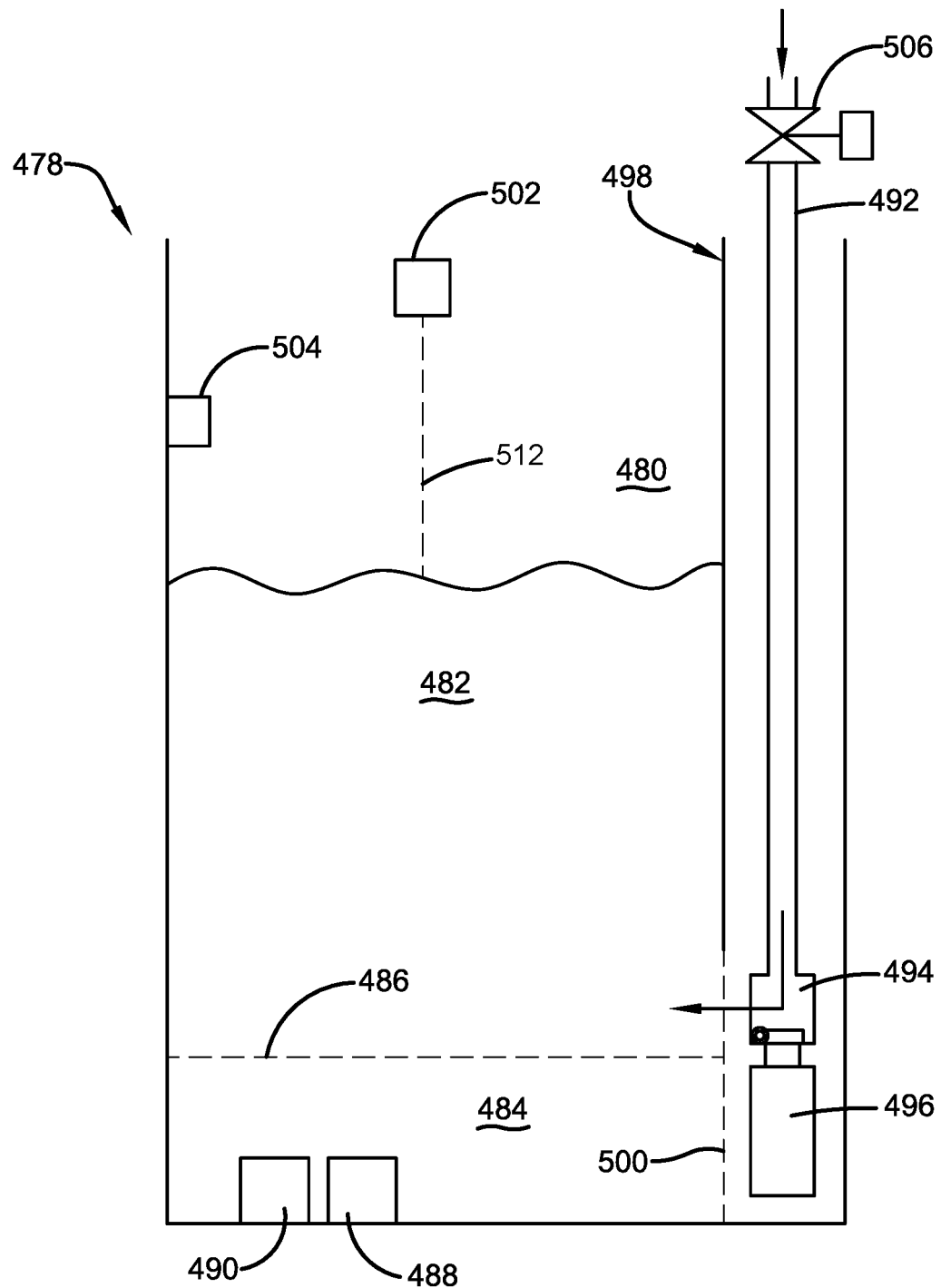
FIG. 30 is a schematic view of an exemplary tank in which solid regeneration material that can be used to regenerate treatment material in a liquid treatment tank, is dissolved in liquid, with liquid being shown added thereto.

FIG. 30 shows schematically a tank 478 which is configured for holding regeneration material such as water softener salt. Tank 478 includes an interior area 480 into which regeneration material 482 is introduced as a solid such as pellets or crystals. The regeneration material is dissolved in the liquid to produce a saturated solution which is alternatively referred to as a brine, in a manner like that discussed herein and in the incorporated disclosures. The dissolved regeneration material 484 in the interior area 480 of the tank extends to a liquid level 486 as shown in FIG. 30.

In the exemplary arrangement the tank includes therein at least one pressure sensor 488. The exemplary pressure sensor is positioned in close proximity to a bottom of the tank 478. The exemplary pressure sensor 488 is configured to detect the fluid pressure acting on the pressure sensor. The exemplary arrangement further includes at least one temperature sensor 490. The exemplary temperature sensor 490 is in an area proximate to the further tank, and in the exemplary arrangement is positioned in proximity to the pressure sensor. However it should be understood that in other arrangements the pressure sensor and the temperature sensor may be located in other locations. The temperature sensor in the exemplary arrangement is usable to determine temperature of the liquid which is housed in the tank. As a result it should be understood that in other exemplary arrangements at least one temperature sensor made be positioned for example, in the lines that supply the liquid into the tank, on an external surface of the tank or in one or more other areas that may provide a temperature reading that corresponds to or enables determination of a temperature of the liquid housed in the further tank.

The exemplary tank 478 further includes a fluid conduit 492 such as a pipe. The exemplary conduit 492 is fluidly connected to a source of treated liquid. This may include for example the brine port (F) of a respective control valve such as port 62 of valve 10, port 162 of valve 110, port 214 of valve 200 or port 374 of the valve 320. Of course it should be understood that fluid conduit 492 may be supplied with treated liquid from other conduits and sources in other arrangements.

The exemplary fluid conduit 492 is in operative connection with at least one valve 494. The exemplary valve 494 may include one or more check valves, 3 way valves or other suitable valves that enable directing flow of liquid from outside the tank 478 through the conduit 492 into the interior area 480 of the tank. The exemplary at least one valve 494 further enables solution that is moved by a pump 496 to pass from the tank 478 through the fluid conduit 492 without a significant amount of the pumped solution passing into the interior area of the tank. In some arrangements the at least one valve 494 may operate responsive to fluid pressure, while in other arrangements the at least one valve 494 may have actuators that operate responsive to electrical signals, and in other exemplary arrangements the at least one valve may operate responsive to a combination of both fluid pressure and electrical signals.

In the exemplary arrangement the at least one valve 494 and the pump 496 are positioned within a standpipe or other area separated from the rest of the interior area of the tank by a suitable divider, such area being referred to as a standpipe 498. The standpipe 498 includes an area at the bottom which includes a perforated screen 500 or other liquid permeable divider. In the exemplary arrangement the screen 500 enables liquid delivered into the interior area through the fluid conduit 492 to pass from the at least one valve 494 into the interior area of the tank, and enables solution to be drawn out of the interior area of the tank by the pump 496 and be passed out of the tank through the conduit 492. This condition is represented for example in FIG. 33. Of course it should be understood that this arrangement is exemplary and in other arrangements other approaches, structures and configurations may be used.

The exemplary arrangement associated with brine tank 478 further includes a regeneration material level sensor 502. The exemplary regeneration material level sensor is operative to detect a level of the top of the regeneration material 482 located in the interior area 480 of the tank. In some exemplary arrangements the regeneration material level sensor 502 may include a physical contact sensor such as the sensor including a movable contacting paddle described in the incorporated disclosures. In other exemplary arrangements the regeneration material level sensor may include an optical sensor, a sonic sensor, an ultrasonic sensor or other sensor that is suitable for detecting the location of the top of the solid or liquid regeneration material that is positioned in the tank. Of course it should be understood that numerous different types of regeneration material level sensors may be utilized in exemplary arrangements.

The exemplary arrangement further includes at least one tank full liquid sensor 504. The exemplary sensor 504 comprises a presence sensor that is operative to detect the presence of liquid at the sensor. In exemplary arrangements the presence sensor may correspond to sensors of the type described in the incorporated disclosures that are operative to sense moisture adjacent to the sensor. In exemplary arrangements sensor 504 is operative to sense liquid at a level in the tank that corresponds to the tank being filled with liquid. In some exemplary arrangements the sensor 504 may be positioned in fluid connection the interior area 480 of the tank by being positioned within the interior area. In alternative arrangements the sensor 504 may be positioned in fluid connection with the interior area of the tank by being positioned in an overflow line or similar conduit that is in fluid connection with the interior area of the tank. Of course it should be understood that this approach is exemplary and in other arrangements other approaches may be used.

In some exemplary arrangements the fluid conduit 492 may be in operative connection with a valve 506. In exemplary arrangements the valve 506 may be an electrically controlled valve that is suitable to selectively enable or prevent liquid flow through the fluid conduit 492. In some exemplary arrangements the valve 506 may be operative to work in coordination with or independent from the control valve of the liquid treatment tank, to allow or prevent the flow of liquid into or out of the fluid conduit 492 and the brine tank 478 which is alternatively referred to herein as a further tank.

Of course it should be understood that these components and features of the exemplary brine tank arrangement are merely examples of components that may be utilized in connection with such a tank used for housing and delivering regeneration material that can be used to regenerate treatment material in at least one associated liquid treatment tank. In other arrangements additional or different components, devices and configurations may be utilized.

FIGS. 40-44 schematically represent an exemplary logic flow carried out by at least one valve controller in connection with the production and delivery of a liquid solution of regeneration material to at least one liquid treatment tank of the types described herein. The logic shown in FIGS. 40-44 is generally limited to the logic carried out in connection with the further tank which houses the regeneration material and does not include the logic carried out in connection with controlling other aspects of the at least one control valve that is utilized to direct liquid flow through the liquid treatment tank as described herein and in the incorporated disclosures. Further it should be understood that the at least one controller which carries out the logic flow schematically represented, may include a standalone controller associated with a control valve of an associated liquid treatment tank, or alternatively an arrangement including a master controller which communicates with one or more slave controllers including a valve slave controller associated with a liquid treatment tank. Further it should be understood that exemplary arrangements may include control valves of the types described herein that include selectively movable piston valve elements of the types shown or other valve arrangements that include valve elements that are selectively movable to provide the desired flows to, from and through one or more liquid treatment tanks to produce treated liquid and to regenerate the treatment material housed in the one or more tanks.

In the exemplary logic flow the at least one valve controller is operative to determine the sensed pressure at the pressure sensor 488. This is represented by step 508. As can be appreciated, the pressure sensed by the pressure sensor 488 that is in proximity to a bottom area of the tank 478 corresponds to the pressure of the dissolved liquid regeneration material 484 that extends to the top liquid level 486 which is generally in overlying relation of the pressure sensor.

The exemplary controller is operative as represented in a step 510 to determine the temperature sensed by the sensor 490. This sensed temperature corresponds to the temperature of the liquid regeneration material solution housed in the tank. The controller is then operative responsive to the regeneration material level sensor 502 to determine a height (represented 512) of the regeneration material in the tank. This is represented by step 514. In the exemplary arrangement the determined height corresponds to a distance of the top level of the solid (or liquid if only liquid is present) regeneration material from the sensor 502. The sensed height is indicative of the amount of the available regeneration material in the tank. In this exemplary arrangement the sensed material height is usable to determine if there is sufficient available regeneration material in the tank to produce a quantity of saturated liquid brine solution to regenerate the treatment material in the associated treatment tank.

The exemplary at least one valve controller is operative as represented by step 516 to determine if the sensed height of the regeneration material is sufficient to produce enough saturated regeneration material to regenerate the treatment material in the liquid treatment tank. In exemplary arrangements this determination in step 516 is made by the at least one controller by comparing the sensed height value to at least one stored or determined threshold value to determine if the values have a predetermined relationship. Of course this approach is exemplary and in other arrangements other approaches to determining whether there is sufficient available regeneration material in the tank may be used.

If it is determined in step 516 that insufficient regeneration material is present in the tank 478 to produce the needed amount of regeneration material saturated solution, the at least one controller is operative to output a fault signal indicative of the determined condition. This is represented by step 518. In exemplary arrangements the controller may be operative responsive at least in part to the output fault signal to provide an indication of the condition through a local user interface such as a tablet device and/or through a remote user interface such as a mobile wireless device. Of course it should be understood that additional steps may be taken responsive to the determination in step 516 or the at least one output fault signal. This may include for example providing for the automatic introduction of additional regeneration material to the tank or other steps that may be helpful in remedying the condition. In the exemplary arrangement after the fault signal has been output the at least one controller operates to wait until it receives further signals to indicate that the condition has been corrected.

The at least one controller is then operative as represented by step 518 to determine an amount of liquid to add to the tank in order to produce the amount of saturated liquid regeneration material necessary to regenerate the treatment material in the liquid treatment tank. This corresponds to the amount of treated liquid that is added for example, in a treated liquid delivery condition of the control valve in which ports A and B, and ports E, B and F are in the fluid flow connection through the at least one valve by positioning of the at least one valve element. This condition in which treated liquid is added to the tank 478 is represented in FIG. 30.

In some exemplary arrangements the at least one valve controller may be operative responsive to stored data and circuit executable instructions in at least one data store to deliver a fixed volume of liquid into the tank 478. This programming may correspond to a set needed volume of regeneration material solution that is required to regenerate the treatment material in a particular treatment tank. In some exemplary arrangements this amount of material may be determined through data received responsive to operation of a flowmeter of the type described in the incorporated disclosures. Alternatively in other arrangements the amount of treated liquid material may be determined through sensed pressures by the pressure sensor 488 as later discussed.

In other exemplary arrangements the amount of treated liquid to add may be based on a stored time period value during which time period the at least one valve element is operative to be positioned to cause treated liquid to be delivered from the further port (F). This programmed time period in which treated liquid is delivered into the interior area of the tank may be based on one or more stored values which have been determined to correspond to a needed amount of liquid to produce the necessary amount of regeneration material solution.

Further in other exemplary arrangements the at least one valve controller may be operative in accordance with its circuit executable instructions to vary the amount of treated liquid delivered into the tank responsive to the determined temperature as detected by the at least one temperature sensor 490 in an area proximate to the regeneration material holding tank. In some exemplary arrangements the at least one valve controller may be operative in accordance with its programmed instructions to determine and control the amount of treated liquid that is added to the regeneration material holding tank based on the detected temperature. Such programming may be operative to determine the amount of material to add based on the sensed temperature due to the variable solubility of the regeneration material in the liquid based on the temperature of the liquid.

The exemplary at least one controller may therefore operate in accordance with its circuit executable instructions to add more liquid when the temperature is colder and the solubility of the regeneration material is lower, than when the temperature is higher in the solubility of the regeneration material is greater. In such exemplary arrangements in the step 518 the controller is operative to determine the amount of treated liquid to add responsive at least in part to the determined temperature. This determination may correspond to a volume of treated liquid material as determined by at least one flow sensor, the pressure sensor, or alternatively an elapsed time value during which at least one valve is in the treated liquid delivery condition and causes treated liquid to be delivered to the tank. Of course it should be understood that these approaches are exemplary and in other arrangements other approaches may be used.

The exemplary at least one controller is then operative as represented by step 520 to cause the determined amount of liquid to be added to the tank 478. During the period that the at least one controller is operative to cause the at least one valve to be in the treated liquid delivery position, the controller is operative to monitor the condition of sensor 504. The sensor 504 of the exemplary arrangement comprises a presence sensor that is operative to detect liquid within the interior area of the tank at a tank full level. The monitoring of the sensor 504 during this time period is represented by a step 522.

Figure 37:
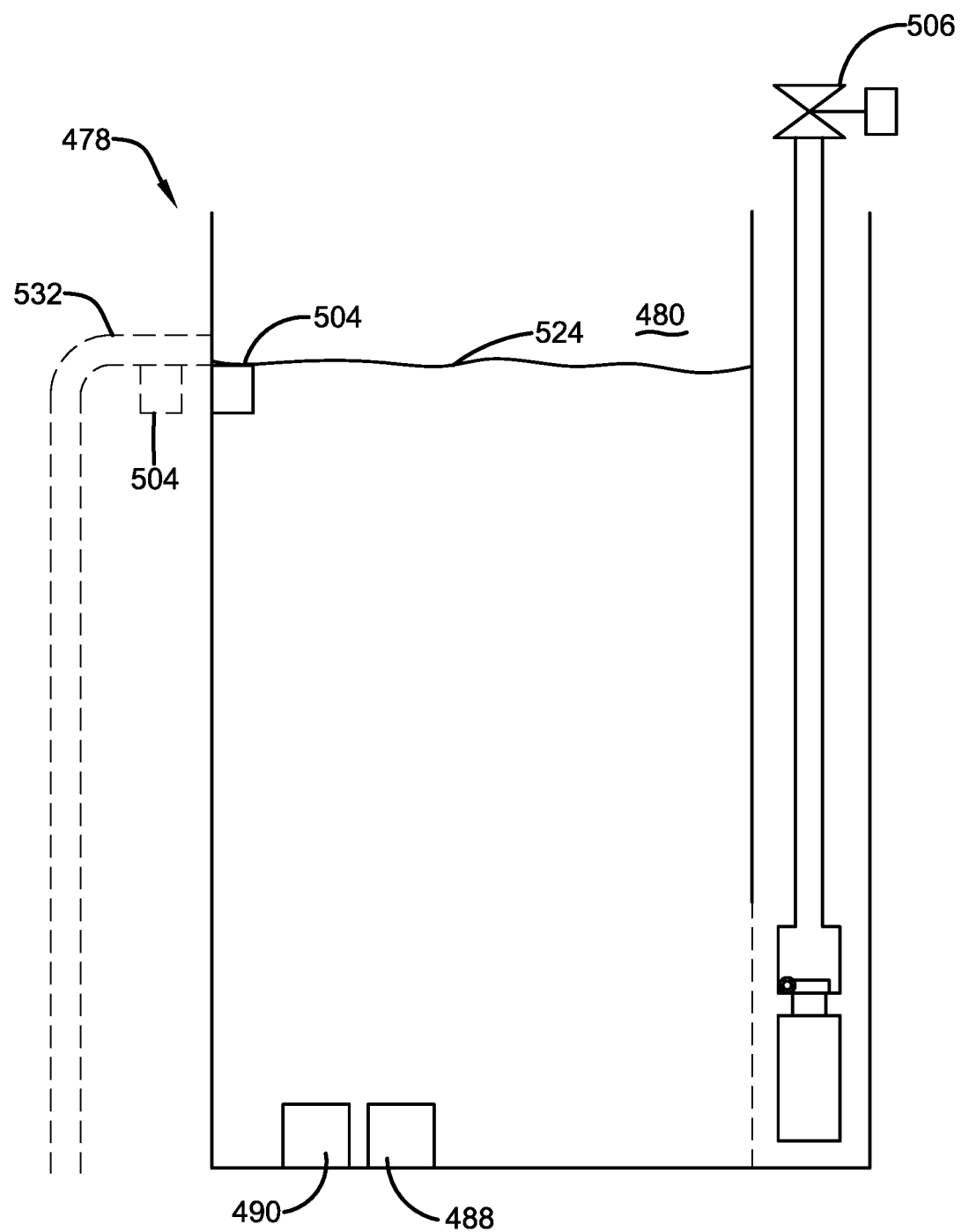
FIG. 37 is a further schematic view of the regeneration material tank with the liquid at a tank full level.

As can be appreciated from FIG. 37, in the event of a malfunction in which excessive liquid is added to the tank, monitoring the sensor 504 enables the at least one controller to make a determination that liquid is detected at the tank full level 524 at which the tank has been fully filled. If the level of the liquid in the tank is detected to be at the tank full level, the at least one controller operates as represented in step 526 to generate at least one signal that is operative to close the inflow valve 506 to prevent the further delivery of treated water to the interior area of the tank. This is represented by a step 528. In the exemplary arrangement when the liquid level is detected at the tank full level 524 the at least one valve controller is further operative to output at least one fault signal indicative of the detected condition. This is represented by a step 530. Of course it should be understood that this approach is exemplary and in other arrangements the steps of monitoring the tank liquid level may be omitted or alternatively other approaches may be used.

Also as represented in phantom in FIG. 37 in some arrangements the sensor that detects the presence of liquid at the tank full level 504 may alternatively be positioned in an overflow line 532 that is in fluid connection with the tank interior area 480 at the tank full level 524. The at least one sensor may be positioned in the overflow line to prevent the sensor from being exposed to possible impacts or other conditions within the interior area of the tank 478. Alternatively or in addition multiple sensors 504 such as sensors both within the interior area of the tank and in an overflow line may be used to assure that in overfilled condition of the tank is detected. Of course it should be understood that these approaches are exemplary and in other arrangements other approaches may be used.

In exemplary arrangements the at least one valve controller is operative to monitor conditions to determine when the desired amount of treated liquid has been added to the interior area of the tank 478. This is represented by a step 532. As previously discussed in some exemplary arrangements the at least one valve controller may monitor a time period in which the controller causes the at least one valve element to be in a treated liquid delivery position such that the desired amount of treated liquid is delivered into the tank 478. In alternative exemplary arrangements the at least one valve controller may be operative to determine the amount of liquid that has been added by detecting the volume of flowable material that flows into the tank 478 through operation of at least one flow meter of the type described in the incorporated disclosures.

Figure 31:
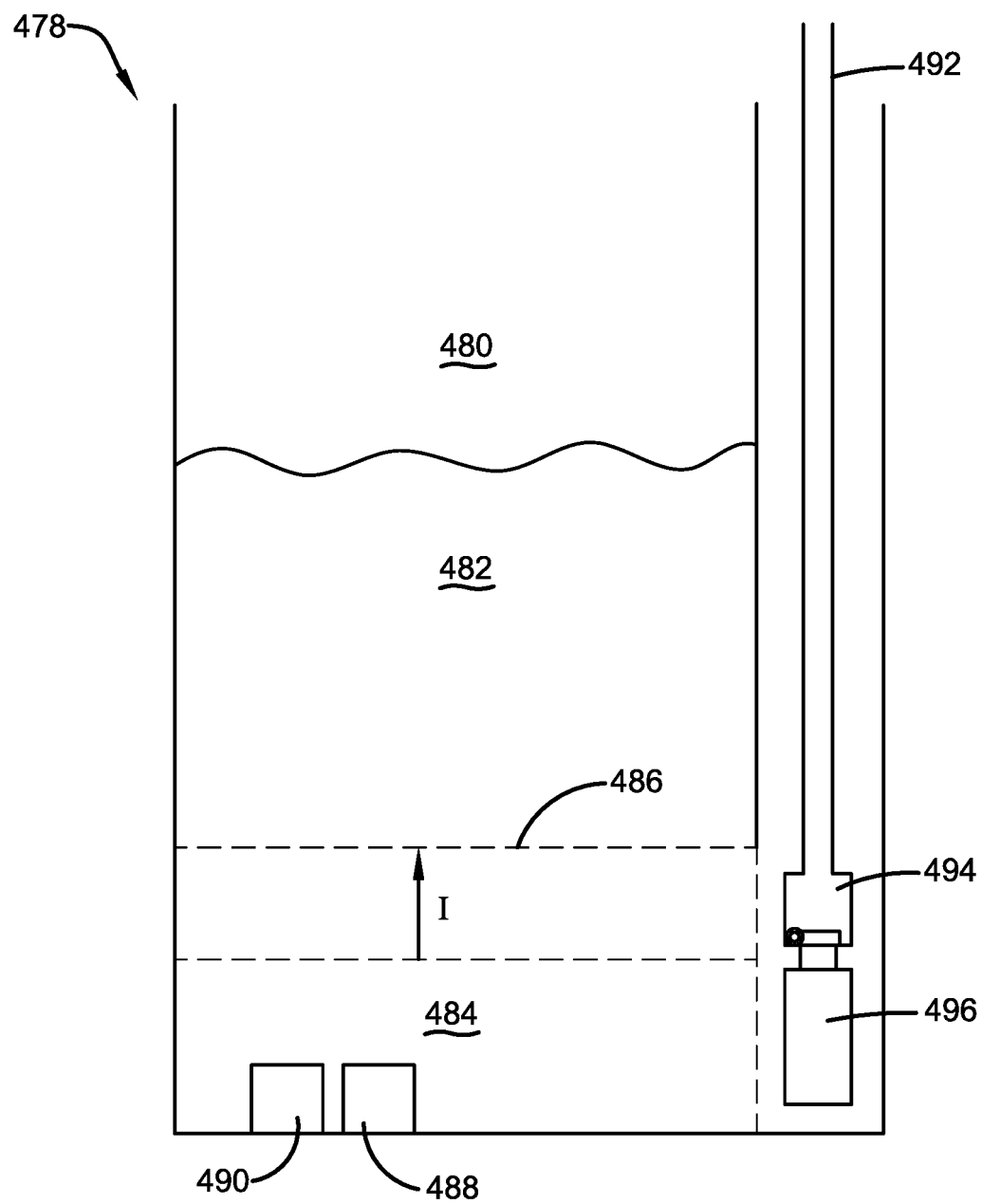
FIG. 31 is a schematic view of the exemplary regeneration material tank after liquid has been added.

In other exemplary arrangements the at least one controller may operate to monitor the amount of treated liquid added to the tank by determining a difference in pressure sensed by the pressure sensor 488. In exemplary arrangements the increase in the detected pressure level as a result of adding treated liquid to the tank may correspond to an increase in pressure head above the pressure sensor which corresponds to the desired additional amount of treated liquid being added. This is represented in FIG. 31 by the increase in the height of the level 486 which represents the level of the liquid in the interior area of the tank. The increase in the liquid level is represented in FIG. 31 by the Arrow I.

Figure 32:
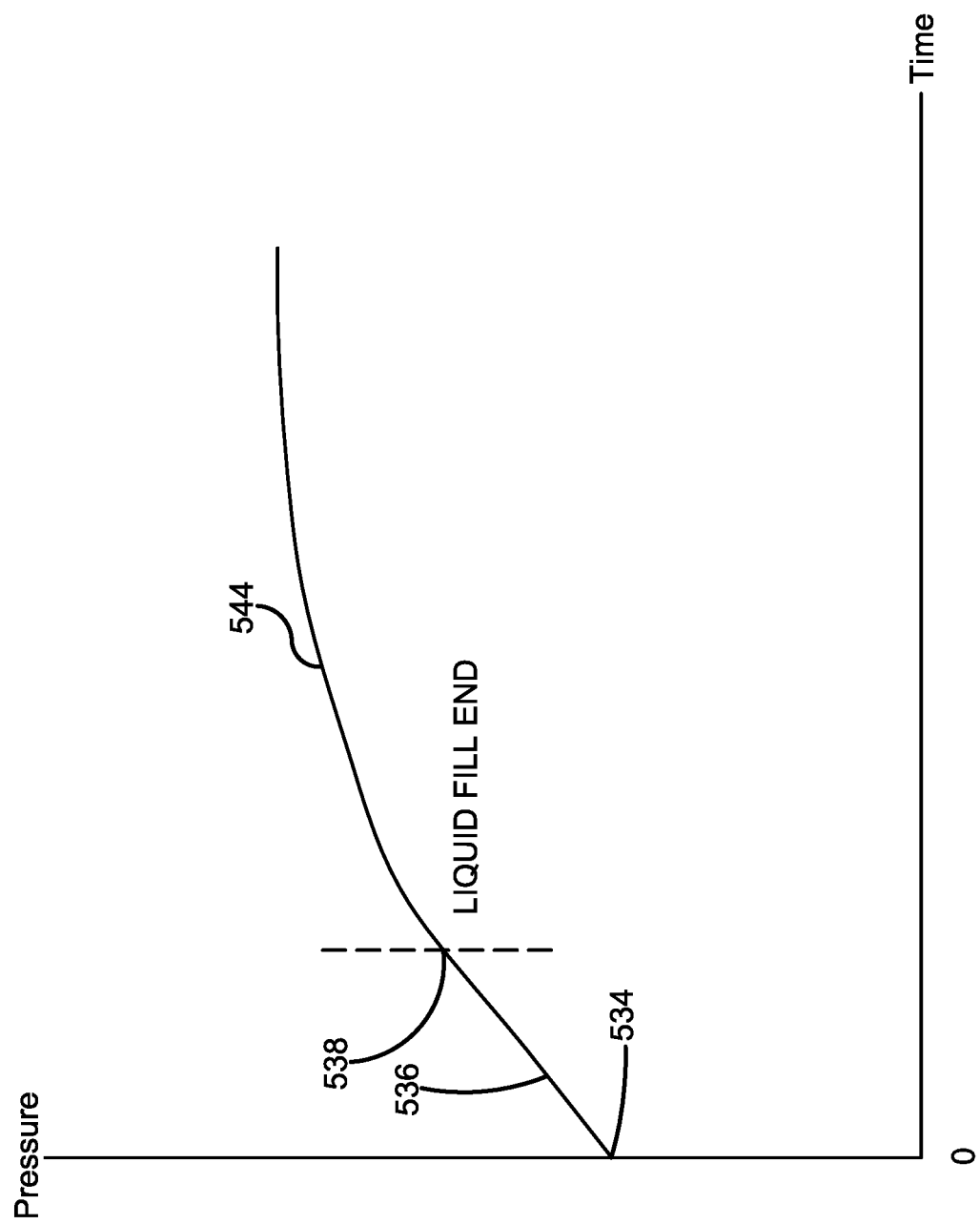
FIG. 32 is a graphical representation of how pressure varies during and after the addition of liquid to the exemplary regeneration material tank.

As represented graphically in FIG. 32, the addition of treated liquid to the interior area of the tank causes the pressure sensed by the pressure sensor 488 to increase with time as the liquid level rises from an initial level represented 534, which in the exemplary arrangement corresponds to when treated liquid has begun to be added to the tank. As graphically represented in FIG. 32 as liquid is added the sensed pressure increases as represented by the portion of the curve 536. In some exemplary arrangements the at least one valve controller is operative to calculate a pressure level or a change in pressure that corresponds to the addition of the desired amount of treated liquid to the tank. This is graphically represented in FIG. 32 by an endpoint 538. In exemplary arrangements the at least one valve controller may operate to determine that the desired amount of treated liquid has been added to the tank by monitoring the sensed pressure by the pressure sensor at a plurality of different points in time to determine if there has been a pressure increase during the treated liquid delivery condition that corresponds to the endpoint 538. When the endpoint is reached the at least one controller may operate in accordance with its circuit executable instructions to cease the further delivery of treated liquid into the tank for this cycle. Of course as can be appreciated these approaches are exemplary and in other arrangements other approaches to determining the amount of liquid to be added to the tank may be utilized.

Figure 41:
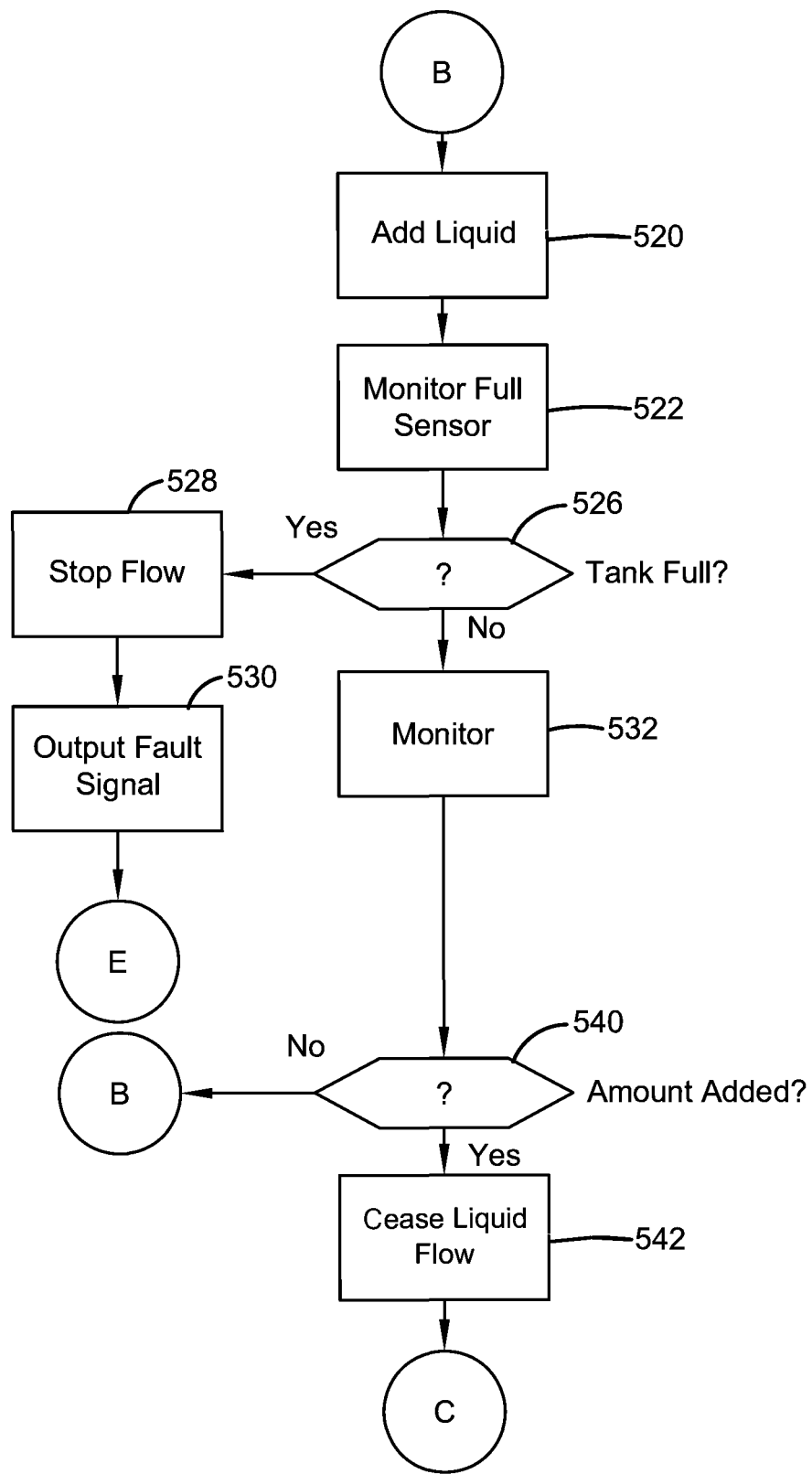
Figure 42:
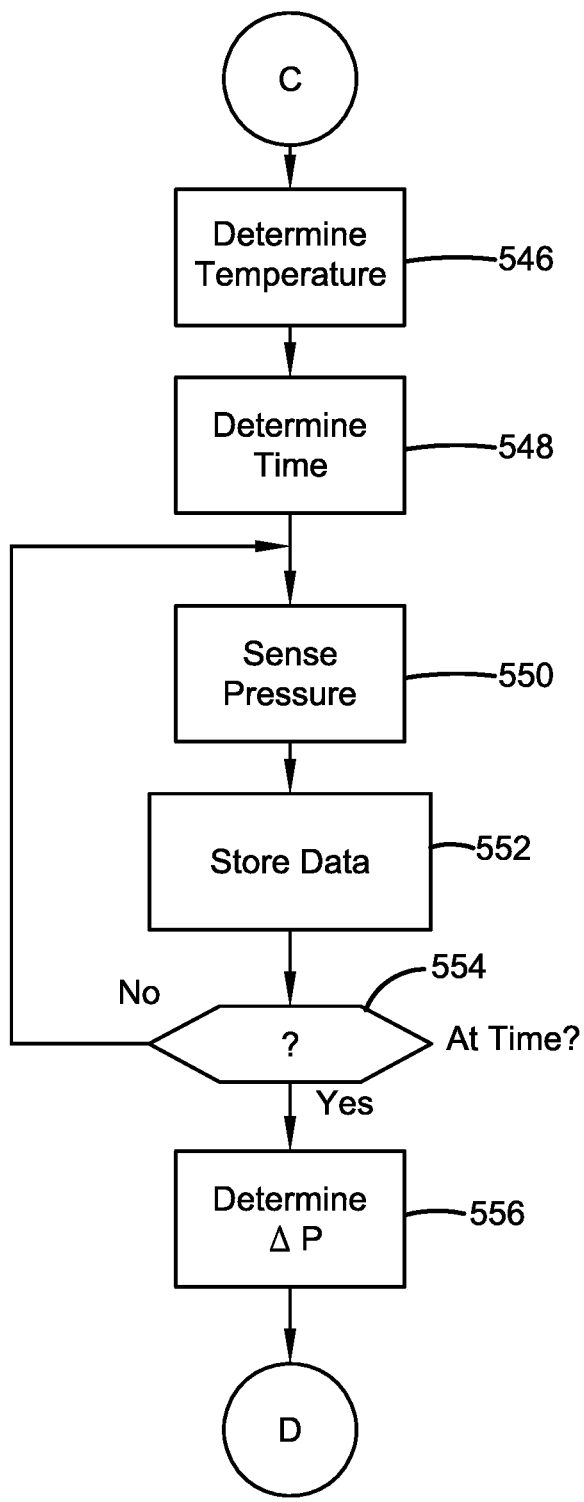
Figure 43:
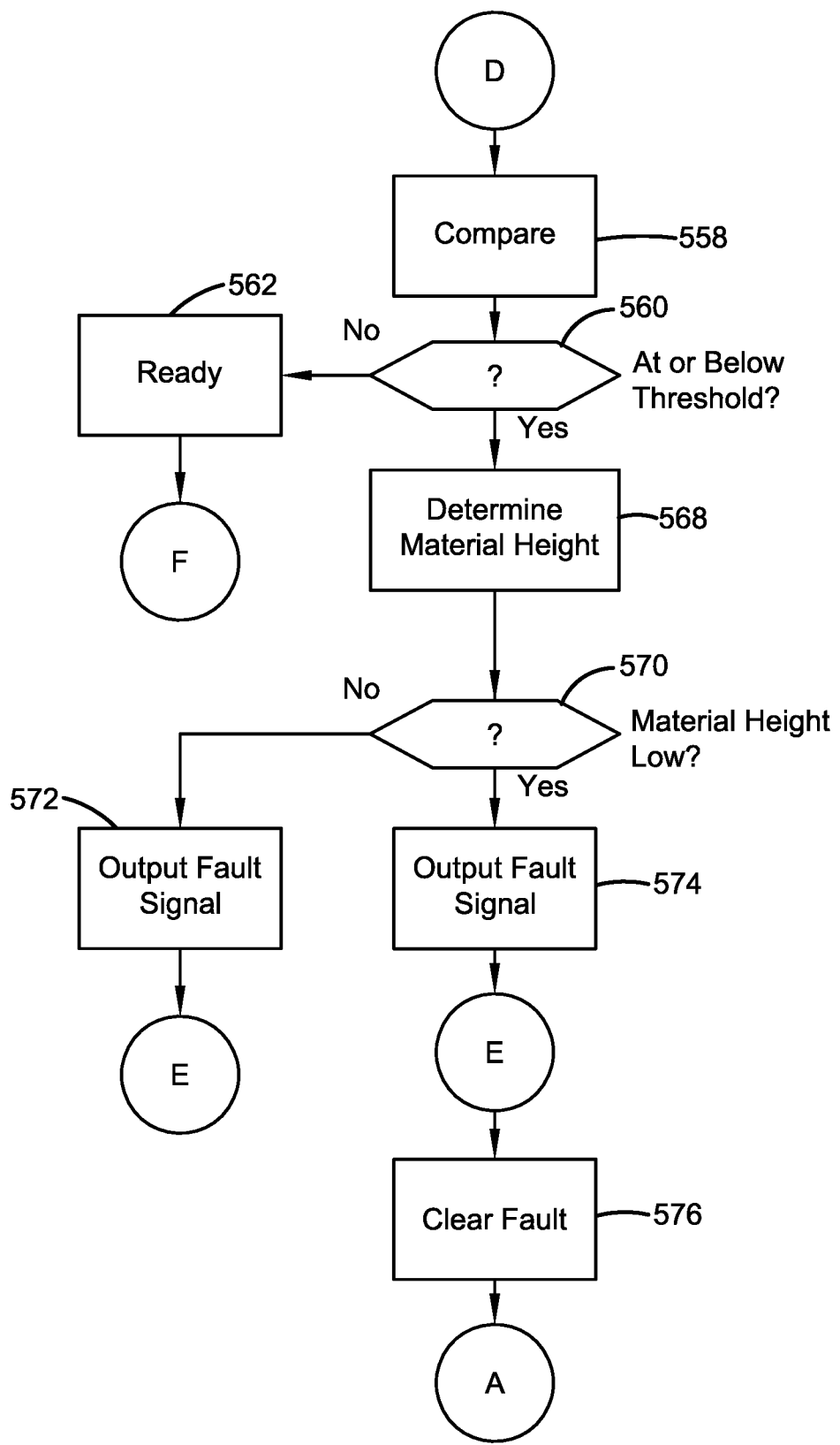
Figure 44:
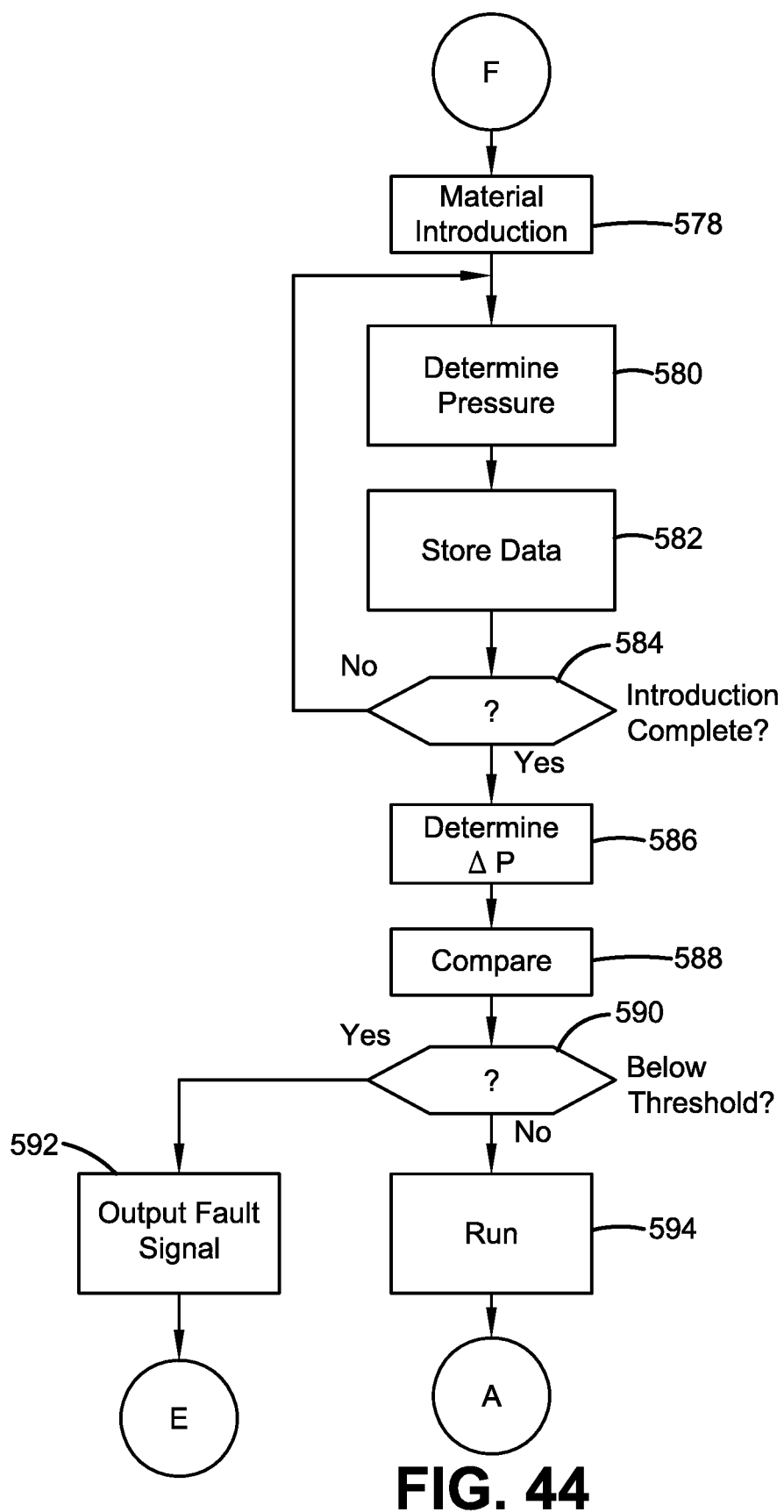

As represented in the schematic logic flow in FIG. 41, the at least one controller is operative to make a determination as to whether the desired amount of treated liquid has been added. This is represented by step 540. If the desired amount has not yet been reached, the exemplary controller continues to cause treated liquid to be added to the tank interior area. When in the step 540 the controller operates to determine that the amount has been added, the controller then operates to cease the treated liquid flow into the tank as represented by step 542. This may be carried out in exemplary arrangements by the at least one motor associated with the at least one valve element, moving the valve element to cause the cessation of delivery of liquid into the tank. Alternatively or in addition, cessation of liquid flow into the tank may be accomplished by closing the inflow valve 506. Of course in other arrangements other approaches to stopping the flow of incoming liquid to the tank holding the regeneration material may be used.

In some alternative arrangements the at least one controller may also operate to detect circumstances where a malfunction has occurred and adequate treated liquid has not been added to the tank to produce the necessary amount of liquid regeneration solution. For example in some exemplary arrangements where the amount of treated liquid to be added is based on a determined time in which the treated liquid will be delivered into the tank, the sensed pressures from the pressure sensor 488 may be utilized to verify that the amount of liquid added corresponds to a sufficient volume of liquid to produce the needed amount of saturated regeneration solution. This may be done in some exemplary arrangements by comparing the increase in pressure sensed by the pressure sensor during the time that the liquid is added, and a threshold for a predetermined relationship. Alternatively or in addition, a flow sensor may be utilized to determine the volume of liquid that is added to the tank during the time window in which the treated liquid is delivered into the tank. The exemplary at least one controller may operate to compare the calculated amount of liquid actually delivered as determined responsive to the pressure or flow sensor, and the needed amount. If for some reason the necessary amount of liquid has not been delivered, the at least one valve controller may operate to make such a determination and output at least one fault signal. Of course it should be understood that these approaches are exemplary and in other arrangements other approaches may be used.

When the treated liquid is added to the tank it is not immediately fully saturated with dissolved regeneration material. Rather after the liquid is introduced the regeneration material continues to dissolve in the liquid that is present until the liquid is fully saturated with the regeneration material so as to produce a desired brine solution for use in connection with regenerating the treatment material in the liquid treatment tank. This is represented graphically in FIG. 32 by the portion of the curve 544 that is shown to the right of the endpoint 538. After the amount of treated liquid has been added and the delivery of liquid into the brine tank has ceased, the regeneration material dissolving into the newly added liquid causes the pressure that is sensed by the pressure sensor 488 to continue to increase. This increase in pressure continues until the liquid reaches its saturation point after which the pressure no longer increases. The pressure level that is detected through operation of the pressure sensor is indicative of whether a sufficient volume of liquid that is saturated with dissolved regeneration material has been produced to regenerate the liquid treatment material in the liquid treatment tank.

In the exemplary arrangement the at least one valve controller is operative to determine if the level of saturated liquid is sufficient to provide the regeneration function by initially determining the temperature based on the temperature detected by sensor 490. This is represented by a step 546. Because the solubility of the regeneration material in the liquid varies with temperature, the exemplary at least one valve controller is operative to determine at least one time period after the inflow of liquid has ceased by which the pressure that is detectable by the pressure sensor should be indicative of the amount of saturated solution that will be produced in the brine tank as a result of the liquid being added. This is represented by step 548.

In an exemplary arrangement the at least one valve controller is operative to determine a sensed pressure a first time that has a corresponding relationship to the time of cessation of addition of treated liquid to the tank. This first time may be based on stored data or calculated values. In some exemplary arrangements pressure is sensed at a first time in close proximity to the endpoint 538 at which the addition of treated liquid to the tank is stopped. It should be appreciated that in some arrangements the initial pressure may be detected somewhat before, at, or after endpoint 538. The determination of the initial sensed pressure is represented by an initial step 550. The exemplary valve controller thereafter stores the data corresponding to the initial pressure as represented by step 552. Thereafter in the exemplary arrangement the exemplary at least one valve controller is operative to make a determination of whether the determined time in step 548 which corresponds to approximately when the added liquid should be fully saturated based on the temperature, has been reached. This determination is represented by a step 554. In the exemplary arrangement if the determined time has not been reached the at least one valve controller is operative to repeat the pressure sensing step and continue to gather pressure data until the determined time period has been reached.

In alternative arrangements the at least one valve controller may operate in accordance with its programming to evaluate the condition of the newly added liquid in an alternative manner. For example in other exemplary arrangements the at least one controller may operate to determine sensed pressure at a plurality of spaced apart points in time and evaluate the increase in sensed pressure. The controller may monitor the slope of the curve 544 after the endpoint 538 to determine a point at which the slope of the curve is zero or an amount below a set small threshold. The at least one controller can carry out this analysis to determine when the sensed pressure ceases to increase which indicates a condition that the available regeneration material has been dissolved in the newly added liquid. In this alternative arrangement after determining that the increase in pressure has stopped after the introduction of liquid at endpoint 538, the at least one controller may store the pressures at a first time which corresponds to a time in proximity to the endpoint, and a second time which corresponds to the determined later time at which the pressure has stopped increasing. Of course it should be understood that these approaches are exemplary and other arrangements other approaches may be used.

In the exemplary arrangement after it is determined at step 554 that the determined time has been reached, the exemplary at least one valve controller is operative to determine the increase in pressure between the first time which has a corresponding relationship to the cessation of delivery of treated liquid into the tank, and the second time which corresponds to a calculated time by which the point of saturation of the newly added liquid should be substantially reached. The determination of the increase in pressure is represented by a step 556. As can be appreciated, in exemplary arrangements the second time is determined after the first time and before any additional liquid or regeneration material is added to the tank. The comparison or other analysis of the pressures at these two times is indicative of the pressure and weight of the solution in which the regeneration material has been dissolved. Further it will be appreciated that the weight and pressure associated with fully saturated liquid will be greater than the pressure associated with liquid that is not fully saturated.

In the exemplary arrangement the at least one valve controller is operative to compare the increase in pressure detected by the pressure sensor and at least one threshold. This is represented by step 558. The at least one controller is then operative to determine if there is a predetermined relationship between the increase in pressure and the threshold. In the exemplary arrangement the predetermined relationship corresponds to whether the increase in pressure is at or below a particular threshold. However in alternative arrangements the comparison could be a determination that the difference in pressure is at least at a threshold or alternatively, above a threshold. In each case the comparison of the predetermined relationship represented by step 560 is operative to determine if sufficient saturated liquid has been produced.

In the exemplary arrangement in which the predetermined relationship evaluation in step 560 operates to determine if the increase in pressure that is detected between the first time and the second time indicates that the increase in pressure is at or below the threshold, the negative determination is indicative that sufficient saturated liquid has been produced. As a result when this determination is made the at least one valve controller determines that the system is in a ready state as represented by step 562. In this exemplary arrangement the at least one controller stores information indicative that the further tank holding the regeneration material solution is ready to supply the needed amount of liquid saturated with regeneration material when the valve controller next operates to cause the at least one valve element to be in the regeneration material introduction position in which the regeneration material solution is delivered into liquid treatment tank. The controller may also generate signals indicative of the condition. The valve controller may operate in accordance with its programming to cause the valve to change to the regeneration material introduction position responsive at least in part to the determination of this condition the next time the treatment material is determined to be in need of regeneration.

Figure 33:
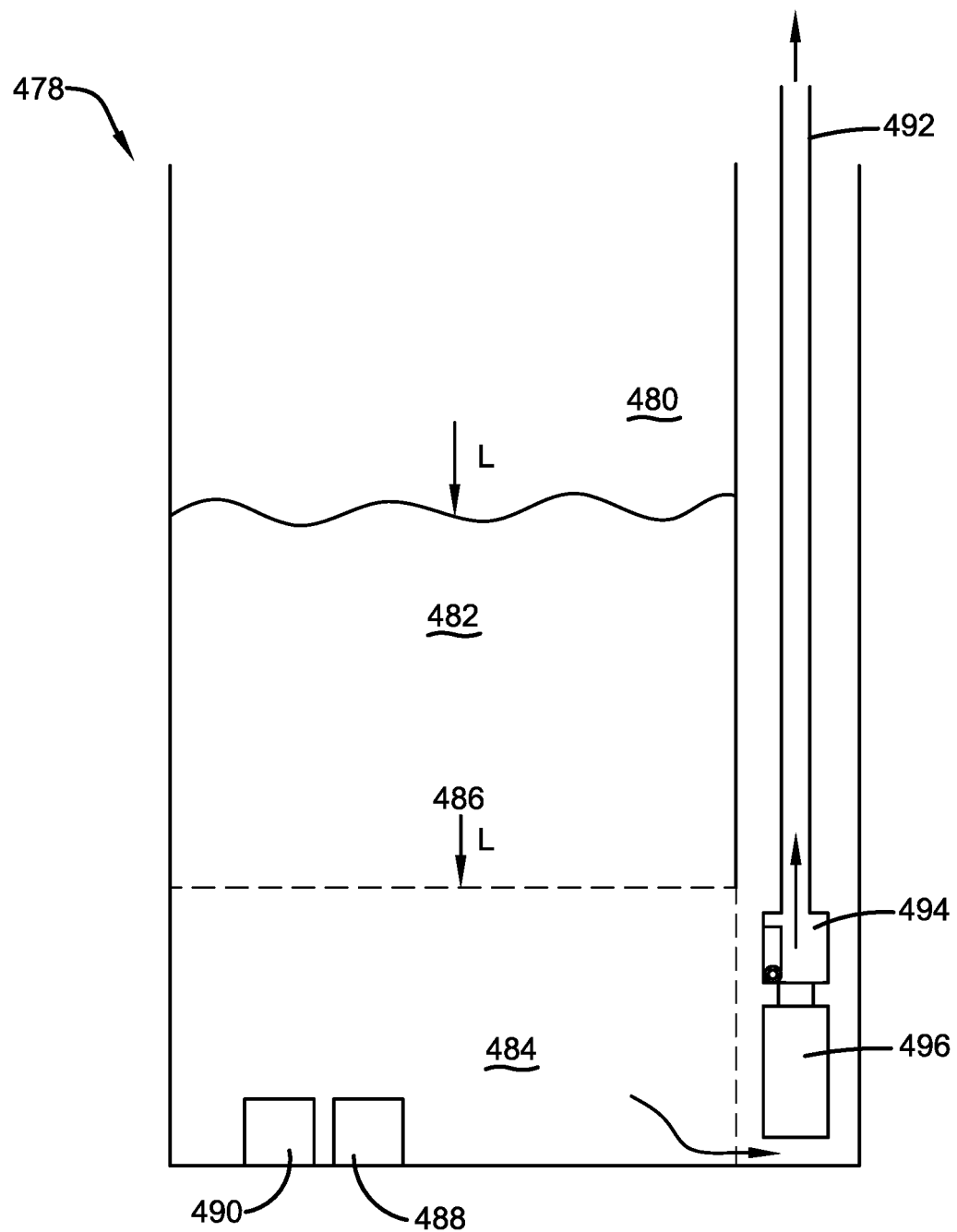
FIG. 33 is a schematic view of the exemplary regeneration material tank with the dissolved regeneration material being removed therefrom.

As previously discussed, this regeneration material introduction condition corresponds to a condition in which port F of the exemplary valves previously described herein, is in fluid flow connection with one of ports D and E, and the other of ports D and E is in fluid flow connection through the valve with the drain port C. In this condition the liquid from the brine tank that is saturated with regeneration material is delivered into the tank out of one of ports D and E, and after passage through the treatment material the liquid which has undergone ion exchange with the treatment material is received into the valve through the other of the ports D and E, and is discharged through the drain port C. Further this regeneration material introduction position corresponds to the condition of tank 478 as represented in FIG. 33 in which the pump 496 draws the saturated liquid out of the interior area of the brine tank and delivers the material through the fluid conduit 492 to the further port F of the valve in the exemplary arrangements previously described. Further in this condition as the saturated liquid is withdrawn from the brine tank the saturated solution level 486 as well as the top of the solid regeneration material decreases as represented by the Arrows L. Of course it should be appreciated that these conditions are exemplary and in other arrangements other configurations and valve structures may be utilized for purposes of providing the regeneration solution to the treatment material in the liquid treatment tank.

Figure 34:
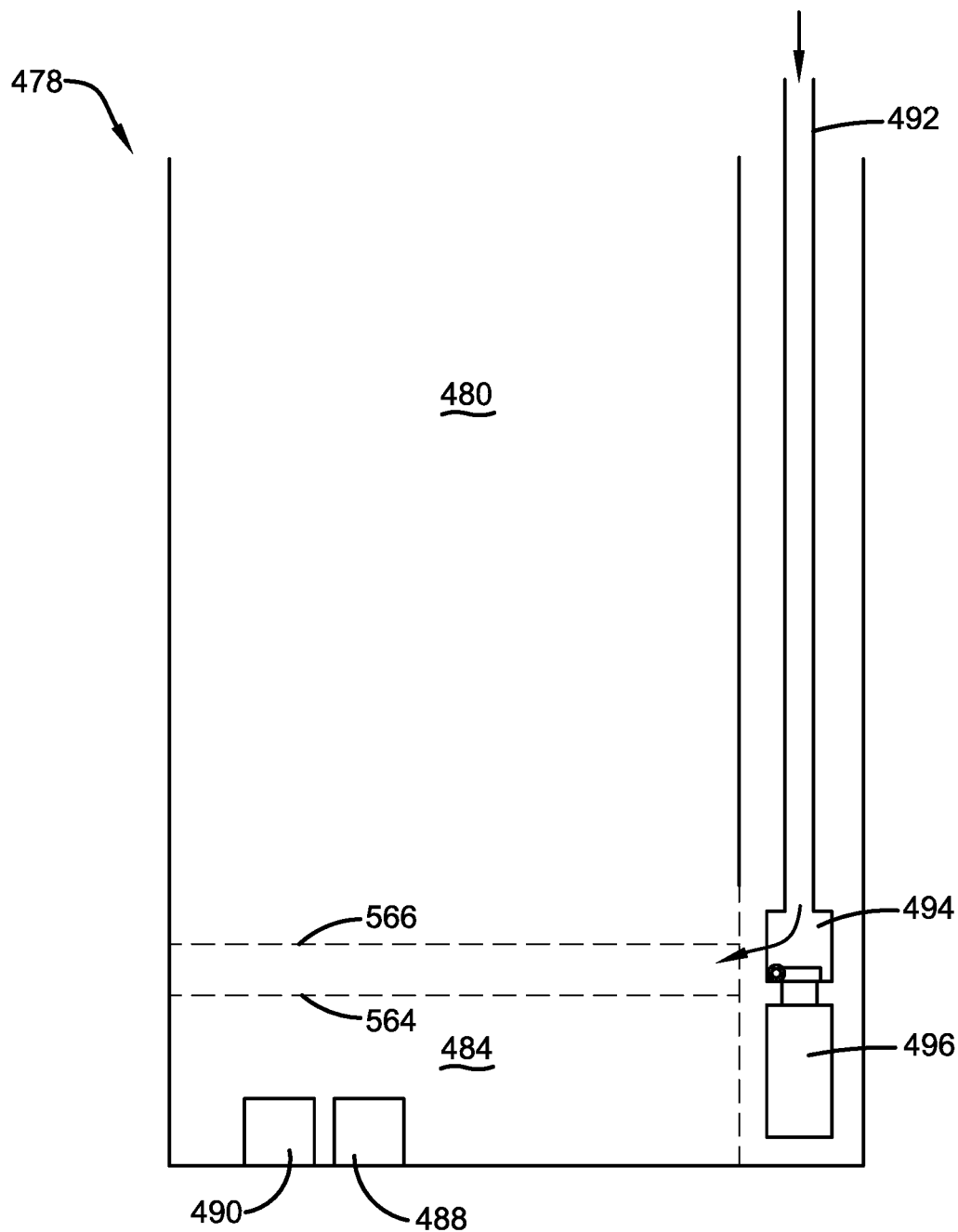
FIG. 34 is a further schematic view of the regeneration material tank with a low level of regeneration material therein and liquid being added thereto.
Figure 35:
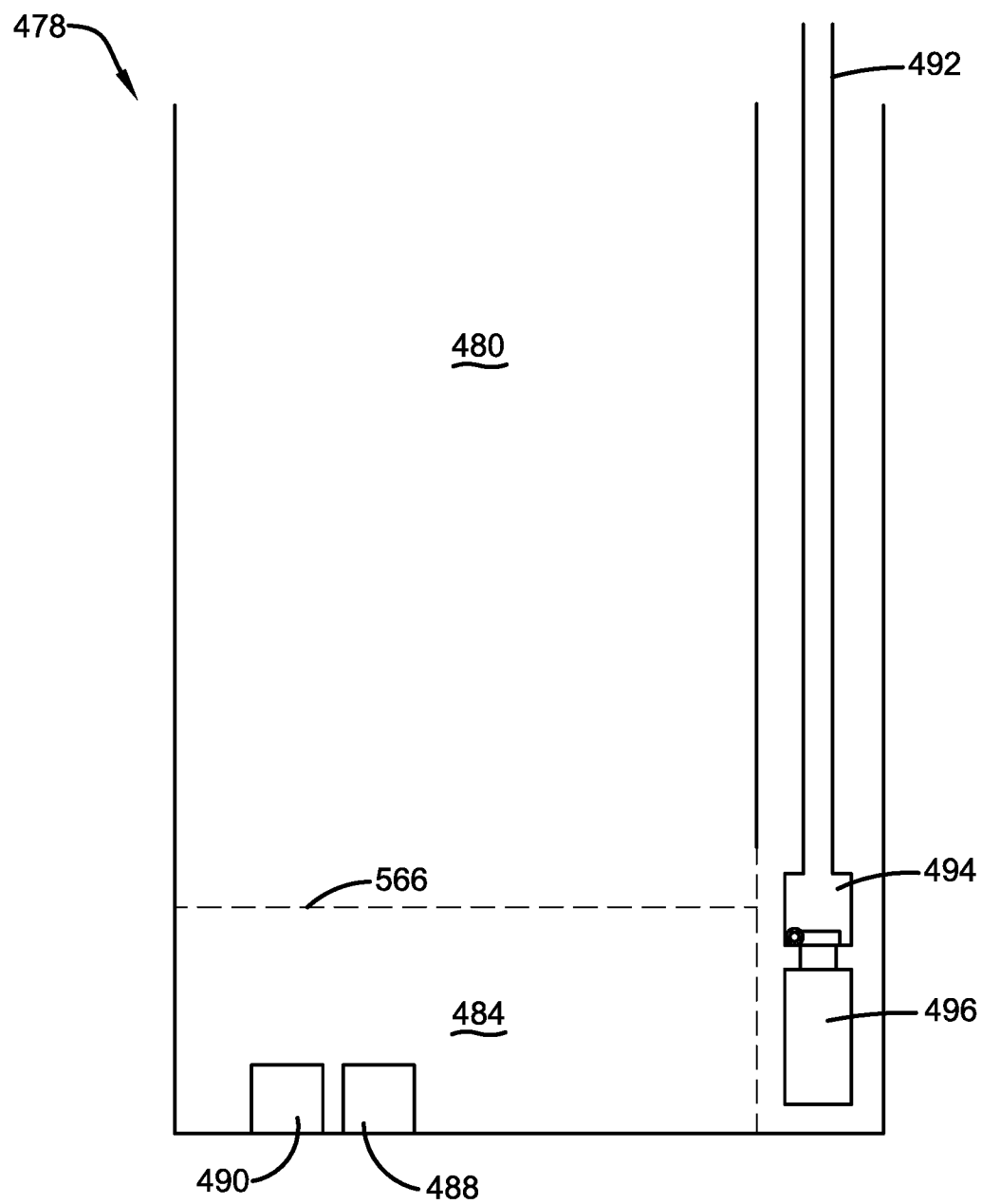
FIG. 35 is a further schematic view of the regeneration material tank with a low level of regeneration material after liquid has been added thereto.

FIGS. 34 and 35 are operative to graphically represent the operation of the exemplary system in which the increase in sensed pressure subsequent to the cessation of the delivery of liquid to the tank holding the regeneration material, is usable to detect circumstances where an adequate amount of saturated regeneration solution has not been produced. For example FIG. 34 represents a situation where there is an inadequate amount of solid regeneration material in the tank to produce the needed amount of liquid that is saturated with the regeneration material. FIG. 34 may correspond to a situation where the previously discussed regeneration material level sensor 502 is not present in the arrangement or is not operational.

As represented in FIG. 34 when the at least one valve controller causes the control valve to be in a treated liquid delivery position such that treated liquid is added to the tank 478, the level of the liquid in which the available regeneration solution is dissolved rises from a prior level 564 to a new level 566. However as represented in FIG. 35 there is insufficient solid regeneration material available in the tank to cause the available liquid to be fully saturated with regeneration material. As a result the increase in pressure after the endpoint 538 at which treated liquid ceases to be introduced, will be at or below the threshold in step 560. This will be indicative that the amount of available liquid that is saturated with regeneration material is insufficient to regenerate the liquid treatment material.

The condition where insufficient solid regeneration material is not in contact with the liquid to produce the needed amount of saturated solution may alternatively occur in situations where the solid regeneration solution has formed a pocket or bridge below the upper area of the solid regeneration material. This causes the liquid to not be in adequate contact with the regeneration material to produce the sufficient amount of saturated liquid solution. This condition is represented graphically in FIG. 36. In the exemplary arrangement the at least one valve controller is configured to identify this condition and distinguish it from the situation where insufficient regeneration material is present in the tank 478.

Figure 36:
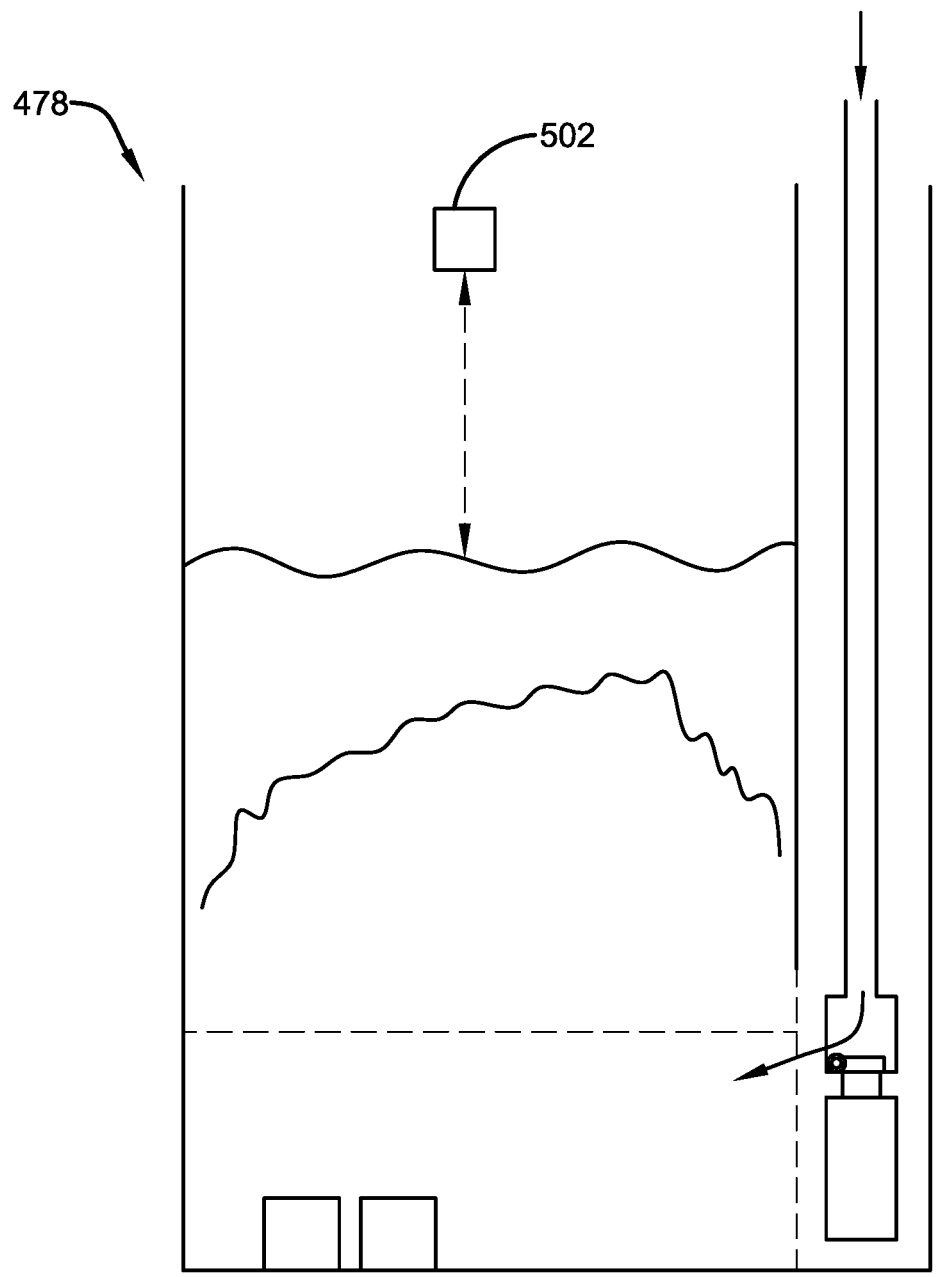
FIG. 36 is a further schematic view of the regeneration material tank with liquid being added thereto, when the regeneration material has formed a bridge or pocket that prevents the regeneration material from being in contact with the liquid introduced to the tank.

In the exemplary arrangement if it is determined in step 560 that the increase in pressure is not sufficient by being at or below the threshold, the exemplary at least one controller is operative to determine from the regeneration material level sensor 502 the material height of the regeneration material in the tank. This is represented by step 568. As can be appreciated this determination of the material height may correspond to detecting a height of the solid regeneration material such as shown in FIG. 36, or alternatively the material height of the unsaturated liquid such as is shown in FIGS. 34 and 35. The at least one valve controller is then operative in accordance with its associated circuit executable instructions to compare the material height to at least one threshold as represented in a step 570. The comparison analysis is operative to determine if the detected height of the regeneration material corresponds to insufficient regeneration material or a possible condition of bridging such as is represented in FIG. 36.

If it is determined in step 570 that the material height is not below the threshold the at least one controller is operative to output at least one fault signal indicative of the situation where there has been bridging of the solid regeneration material as represented in FIG. 36. This is represented by a step 572. Alternatively if in step 570 the determination is made that the detected height of the regeneration material is low such as represented in FIGS. 34 and 35, the at least one controller is operative to output at least one different fault signal which is indicative of the insufficient regeneration material being present in the tank 478. The output of this signal is represented by step 574. Of course it should be appreciated that these output signals are exemplary and other arrangements other or additional signals indicative of these or other detectable conditions may be output by the at least one valve controller.

In exemplary arrangements when the at least one valve controller has output at least one signal indicative of a fault condition, the at least one valve controller is operative to output information concerning the condition to a local and/or a remote user interface. The user may then investigate and correct the condition. When the user has corrected the condition, the user may provide at least one input to the user interface that is indicative that the fault has been cleared. This causes the at least one controller to clear the fault state as represented by step 576 and return to normal operation. Of course as can be appreciated in other arrangements additional steps and corrective actions may be carried out by the at least one controller to remedy such conditions either on automated basis or through the assistance of an individual who is notified of the particular fault condition.

When the brine tank 478 is determined by the at least one valve controller to be in condition to deliver the needed quantity of liquid saturated with regeneration material to the liquid treatment tank, the at least one valve controller is operative to cause the regeneration material to be delivered to the liquid treatment tank during the portion of the regeneration cycle to regenerate the treatment material. The at least one valve controller is operative to determine the need to regenerate the treatment material in the manner previously discussed herein and/or in ways described in the incorporated disclosures. The at least one valve controller is operative to move the at least one valve element to a regeneration material introduction position in which further port F is in fluid flow connection through the valve body with one of the ports D and F (depending on whether the regeneration material is to be introduced from the top or the bottom of the treatment material in the tank). The other of the ports D and E is placed in fluid flow connection through the body of the valve with the drain port C. As a result the regeneration material dissolved in the liquid is enabled to flow through the treatment material and after passing through the treatment material, is discharged through the drain port C. This material introduction condition of the at least one valve controller is represented as a step 578 in FIG. 44.

In the exemplary arrangement the at least one controller is operative to determine a sensed pressure responsive to the pressure sensor 488. In exemplary arrangements an initial pressure is determined at the start of the regeneration material introduction condition. This is represented by a step 580. The at least one controller is then operative to store data corresponding to the initial pressure value as represented at a step 582. As indicated by a step 584 a determination is made whether the material introduction operation has been completed such that the regeneration material is no longer being drawn into the treatment tank. If the material introduction process has not been completed, the at least one controller is operative to repeat the steps of determining the sensed pressure and storing the further data.

Once the material introduction process is completed as determined in step 584, the at least one controller is operative to determine the change in sensed pressures during the time that the saturated regeneration liquid was delivered to the liquid treatment tank. This change in the sensed pressures which corresponds to an amount of the saturated liquid that has been withdrawn from the brine tank, is represented by step 586. The at least one controller is then operative to compare data corresponding to the sensed differential pressure (and/or volume of liquid regeneration material withdrawn from the tank 478) and a threshold. This is represented by a step 588. As represented by a step 590 a determination is then made as to whether the pressure difference has a predetermined relationship to the threshold. In the exemplary arrangement the threshold corresponds to a pressure difference that would be experienced if an adequate amount of liquid saturated with regeneration liquid material was withdrawn from the further tank 478 and passed into the liquid treatment tank to regenerate the treatment material.

If it is determined in step 590 that the difference in the sensed pressures is below a threshold, indicating that the volume of liquid saturated with regeneration material withdrawn from the tank would be insufficient to regenerate the treatment material, the at least one controller is operative to output a fault signal indicative of the condition. This is represented by step 592. Alternatively if the amount of the pressure difference is not below the threshold (meaning it is at or above the threshold in this example) the amount of saturated regeneration liquid that has been withdrawn is sufficient to regenerate the treatment material. The at least one controller continues to operate to complete the regeneration process in a manner like that previously discussed herein and to return the valve and treatment tank to a service condition. This is represented by step 594.

Figure 45:
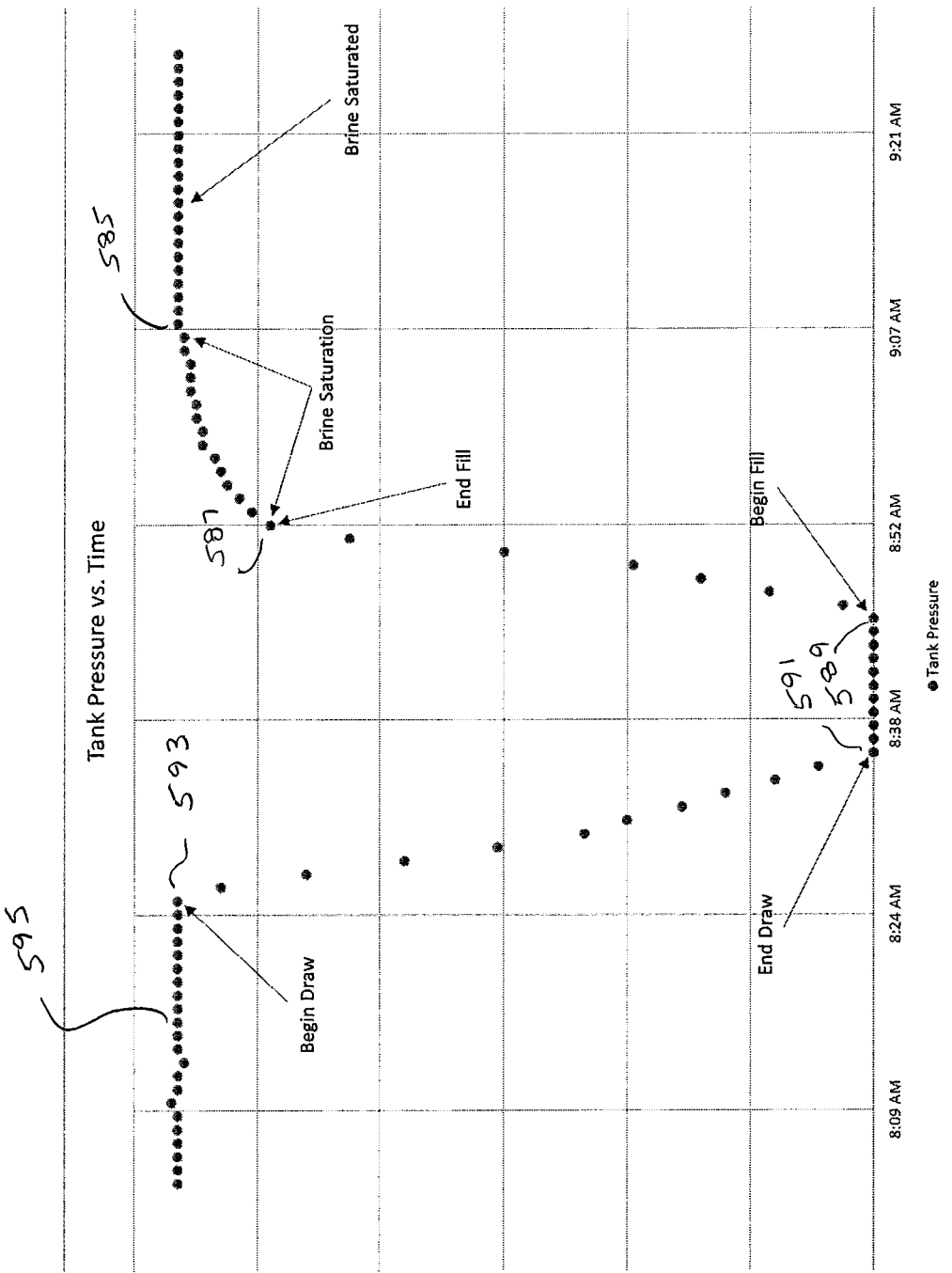
FIG. 45 is a graphical representation of how pressure varies in the regeneration material tank with the withdrawal of saturated liquid and the subsequent addition of treated liquid to produce more saturated liquid material.

FIG. 45 shows exemplary readings that may be obtained through operation of a pressure sensor over time in a tank from which liquid saturated with regeneration material is drawn for regeneration of treatment material in a treatment tank. The graphically represented data points correspond to pressure sensed at different points in time through operation of at least one valve controller. In the exemplary arrangement the sensed pressure level 595 corresponds to a level of pressure produced by the liquid saturated with regeneration material sufficient to regenerate treatment material in a liquid treatment tank. Responsive to operation of the at least one valve controller initiating the material introduction process at a first time corresponding to data point 593, the saturated liquid is drawn out of the tank. This is represented by the data points between data point 593 and a data point 591 at which the saturated liquid is no longer further drawn out of the tank.

At a later time the at least one valve controller is operative to cause the treated liquid to be introduced to the interior area of the tank so as to replenish the available supply of liquid saturated with the regeneration material in a manner like that previously discussed. In FIG. 45 the introduction of the treated liquid corresponds to a data point 589. The sensed pressure is determined at each of a plurality of spaced points in time until the endpoint of when the liquid is being added to the tank is reached, which in the graph shown corresponds to data point 587. As graphically represented in FIG. 45 the increase in sensed pressure continues after the treated liquid is no longer added to the tank as the liquid becomes saturated with the treatment material. The pressure stops increasing once the newly added liquid has become saturated which is indicated beginning at the data point 585. As can be appreciated in some exemplary arrangements the at least one valve controller is operative to calculate the slope of the curve produced by the different data points, and the line corresponding to the data points eventually reaches approximately a zero slope which is indicative of liquid saturation. The at least one valve controller is operative based on the evaluation of the increase in sensed pressure over time between the data points to make a determination that the liquid in the tank is saturated with the regeneration material and is available to be used to regenerate material in a liquid treatment tank.

As can be appreciated in some exemplary arrangements the sensed pressure can also be utilized for purposes of confirming that actions caused through operation of the at least one valve controller have occurred as directed. For example in situations where liquid is added to the tank and then discontinued responsive to operation of the at least one controller, if the sensed pressure indicates that the pressure level is continuing to rise beyond that which would be caused by liquid saturation, the controller may operate in accordance with its programming to make a determination that the introduction of liquid to the tank was not discontinued as directed and that a fault has occurred. Signals indicative of the fault may be generated. Likewise the exemplary pressure sensor arrangement may be utilized to determine that when the at least one valve controller has directed that liquid saturated with regeneration material cease being withdrawn from the tank, the detected drop in sensed pressure over time stops and the pressure stabilizes. If the sensed pressure continues to fall despite the at least one valve controller directing the cessation of the withdrawal of liquid from the tank, a further fault condition can be determined and a corresponding fault signal generated.

Further in exemplary arrangements the pressure sensed by the pressure sensor may be utilized for purposes of making determinations regarding actions that are directed through operation of the at least one valve controller. For example the sensed pressure values may be utilized to determine that the amount of liquid that has been withdrawn from the tank corresponds to the amount that is needed for purposes of regenerating the treatment material in a treatment tank. The at least one controller may cease the withdrawal of saturated liquid from the brine tank responsive to the sensed pressure values. Likewise the introduction of treated liquid to the tank to produce the saturated liquid may be controlled by the at least one valve controller responsive to the sensed pressure increase that has resulted from the introduction of the treated liquid to the tank. The utilization of the sensed pressure values for purposes of carrying out these functions by the at least one valve controller may be useful in that the pressure values can be directly measured. This avoids the need for the controller to carry out these functions responsive only to programmed instructions which are often based on expected operating parameters such as operating temperatures, available pressures and expected flow rates. The exemplary arrangements particularly when utilizing the sensed temperature and pressure readings enable the at least one valve controller more accurately and reliably produce the liquid saturated with regeneration material needed for the operation of one or more water conditioning systems.

Of course it should be understood that these arrangements are exemplary and in other arrangements other approaches, process steps, devices and methodologies may be used.

Figure 38:
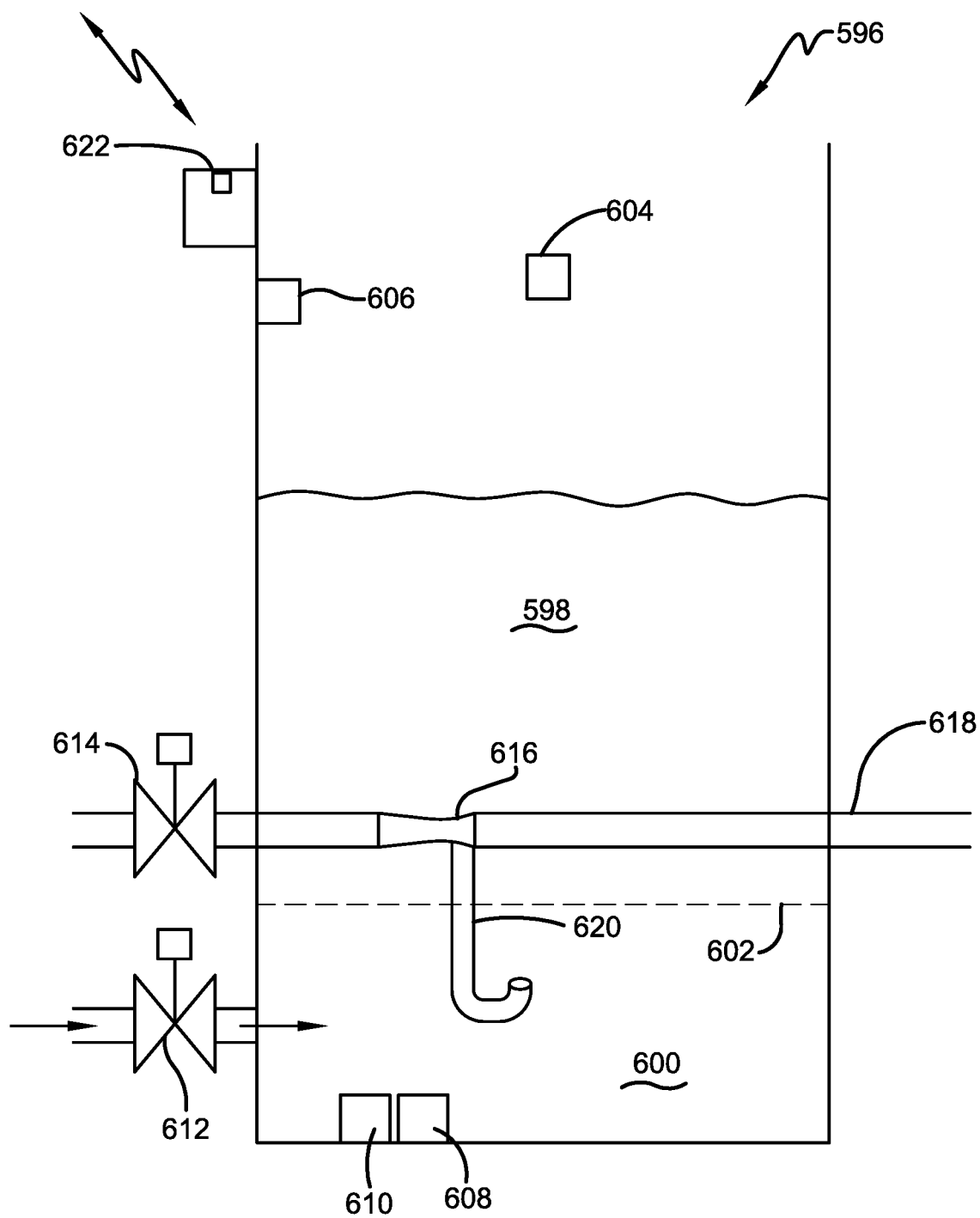
FIG. 38 is a schematic view of an alternative regeneration material tank with liquid being added thereto.
Figure 39:
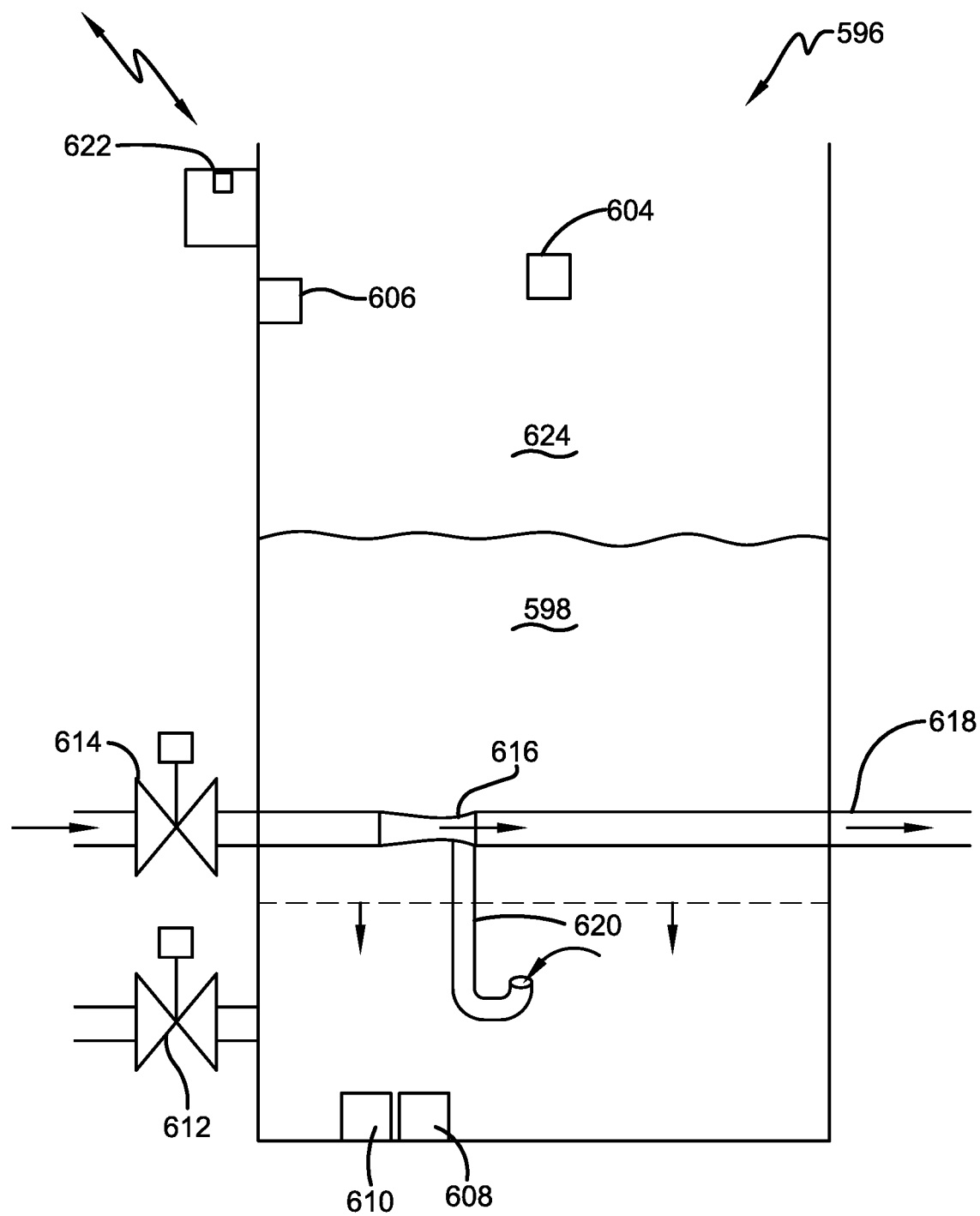
FIG. 39 is a schematic view of the alternative regeneration material tank with dissolved regeneration material being withdrawn therefrom via liquid flow through a Venturi arrangement.
Figure 40:
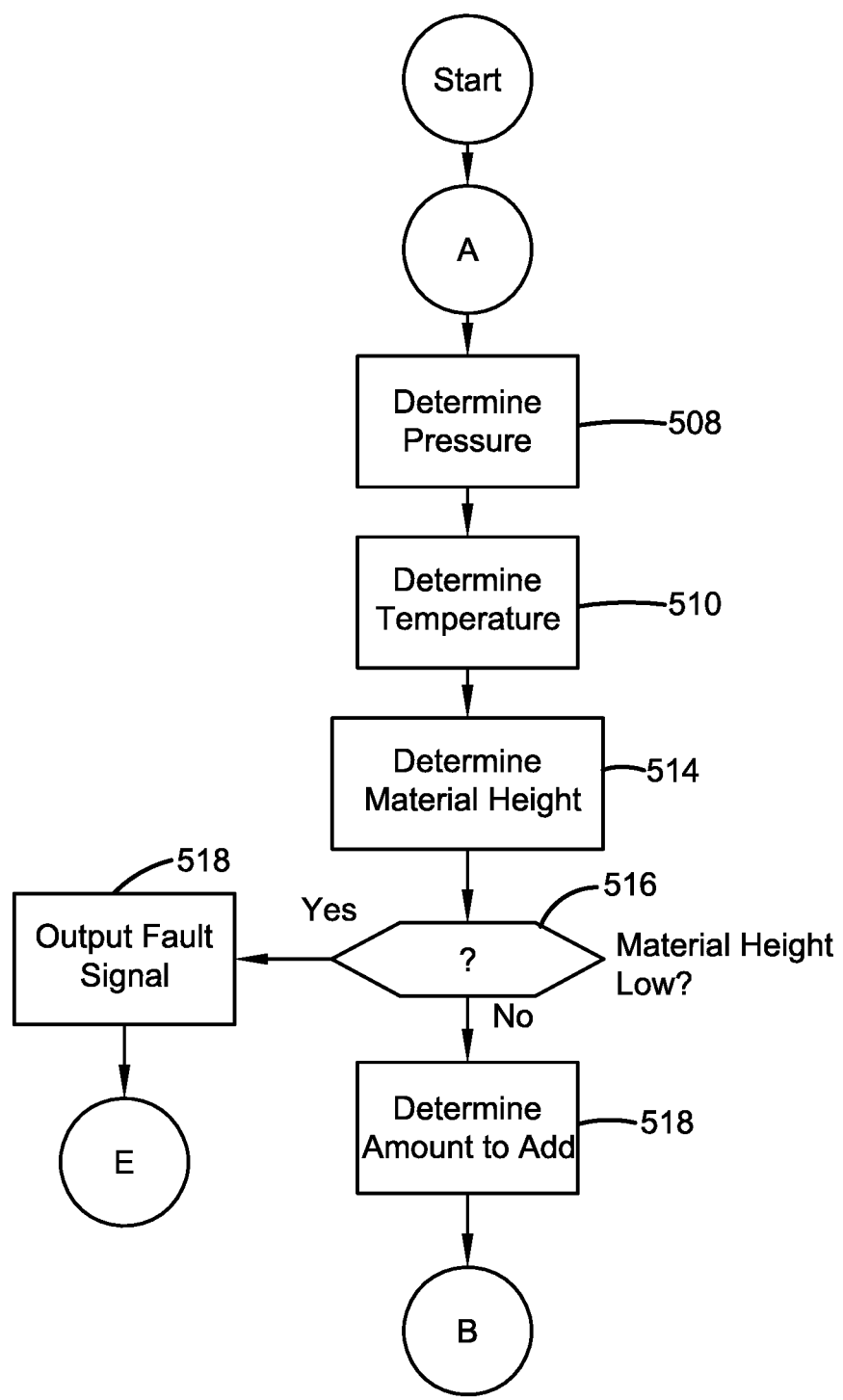
FIGS. 40-44 are a schematic representation of logic flow carried out by at least one valve controller which is operative to produce and deliver regeneration material to a liquid treatment tank.

FIGS. 38 and 39 show schematically an alternative regeneration material holding tank 596. Tank 596 which is alternatively referred to herein as a brine tank or other tank is generally similar to tank 478 except as otherwise described. Tank 594 is configured for holding regeneration material 598 that is introduced as a solid and which produces saturated liquid 600 in the lower area of the tank. In this exemplary arrangement level line 602 represents the interface between the solid regeneration material and the liquid saturated with the regeneration material.

In the exemplary arrangement tank 596 has an associated regeneration material level sensor 604 which may be similar to sensor 502 of the previously described arrangement. A presence sensor 606 which may be similar to sensor 504 is configured to sense liquid at a tank full level. Tank 596 further includes at least one pressure sensor 608 which may be similar to pressure sensor 488, and at least one temperature sensor 610 which may be similar to temperature sensor 490.

Further the exemplary tank 596 includes an inflow valve 612. Inflow valve 612 is an electrically actuated valve which is selectively operative to enable the delivery of treated liquid into the interior area of tank 596. In exemplary arrangements valve 612 may be configured similar to valve 506 and be in operative connection with a further port F of a control valve. In alternative arrangements valve 612 may be in operative connection with a treated liquid line which is operatively connected to one or a plurality of liquid treatment devices so that the valve 612 may deliver treated liquid into the tank 596 that is provided from any one of the liquid treatment units that is currently in the service condition. This is represented for example in FIG. 38.

The exemplary tank further includes a drive liquid valve 614. In the exemplary arrangement the drive liquid valve 614 is an electrically actuated valve that selectively delivers liquid through a Venturi nozzle which is alternatively referred to as an injector 616 and to a delivery line 618. In the exemplary arrangement the passage of liquid through the drive liquid valve 614 causes the Venturi nozzle to draw saturated liquid through a pickup line 620 and deliver the liquid saturated with regeneration material with the drive liquid through the delivery line 618. This is represented in FIG. 39. As can be appreciated, the liquid regeneration material may be utilized to regenerate treatment material housed in at least one liquid treatment tank in a manner like that previously discussed.

The exemplary brine tank 596 is in operative connection with a slave controller 622. The exemplary slave controller is in wireless connection with the master controller 408. In the exemplary arrangement communication between the slave controller 622 and the master controller enables the master controller to receive information concerning conditions detected by the sensors 604, 606, 608, 610 associated with the tank, and to control the condition of the valves 612, 614 associated with the tank. The exemplary slave controller 622 includes circuitry structures similar to those previously discussed as used in the master controller and the other slave controllers.

A useful aspect of the exemplary regeneration material tank 596 is that it may be operated responsive to the at least one valve controller, including the master controller in the system, to selectively produce liquid saturated with regeneration material in the interior area 624 of the tank for use in regenerating treatment material in one or more liquid treatment tanks independently from the condition of a particular control valve associated with a particular liquid treatment tank. A further benefit which may be provided by the exemplary brine tank 596 is the ability to use treated liquid for the drive liquid that is utilized to draw the regeneration material into the delivery line 618 and that is directed to liquid treatment tank to regenerate the treatment material therein. In certain arrangements previously discussed, untreated liquid is utilized for purposes of drawing liquid saturated with regeneration material into the control valve and the treatment tank. In some arrangements it may be beneficial to utilize treated liquid for this purpose rather than the untreated liquid which may contain contaminants or other materials that may limit the effectiveness regeneration process.

Further in some exemplary arrangements the control valve in operative connection with a liquid treatment tank may include multiple different valves which have respective valve elements that are respectively positioned responsive to the at least one valve controller. In some such arrangements the liquid saturated with regeneration material may be delivered through one or more valves and tank openings so as to cause the regeneration material to pass through the treatment material without having to pass through the same valve and/or in contact with the same valve element or passage through which the untreated liquid also passes. Of course it should be understood that these approaches are exemplary and in other arrangements other approaches may be used.

Further in other exemplary arrangements the exemplary regeneration material tank 596 may be operative to work in conjunction with a liquid treatment control valve in a manner like that previously discussed. For example in some arrangements the one or more valve elements included in the control valve may be modified so that treated liquid is delivered through the inflow valve 612 at appropriate times to produce liquid saturated with regeneration material. Further the control element may be operative to provide treated (or untreated) liquid to a drive liquid line that flows through the valve 614 and the Venturi nozzle 616 at appropriate times to cause the liquid bearing regeneration material to be drawn through the valve and into the treatment tank.

Alternatively in other arrangements alternative valve elements may be set up so that treated liquid is not delivered from the control valve to the inflow valve 612, but rather treated liquid is provided from a treated liquid line which receives treated liquid either from the same or different liquid treatment tank. Also liquid saturated with regeneration material may be provided by passing treated liquid (or untreated liquid) through the drive liquid line and the Venturi nozzle to a port on a control valve or a tank port for purposes of delivering regeneration material to the treatment material at appropriate times during the regeneration cycle.

Further as previously discussed the exemplary slave controller 622 of the exemplary arrangement may operate in conjunction with the master controller to carry out the logic flow features previously discussed for purposes of producing liquid regeneration material and ensuring the proper operation of the one or more liquid treatment tanks to which the brine tank 596 is connected. This includes the ability to verify that an adequate amount of liquid saturated with regeneration material is produced and delivered to a liquid treatment tank at the appropriate time to regenerate the treatment material. Of course additional features and capabilities may be included in exemplary arrangements including features and capabilities that are discussed in the incorporated disclosures.

Thus the exemplary arrangements achieve improved operation, eliminate difficulties encountered in the use of prior devices and systems and attain the useful results described herein.

In the foregoing description, certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful concepts are not limited to the features shown and described.

It should be understood that the features and/or relationships associated with one arrangement can be combined with features and/or relationships from one or more other arrangements. That is, various features and/or relationships from various arrangements can be combined in further arrangements. The inventive scope of the disclosure is not limited to only the specific arrangements shown or described herein.

Having described the features, discoveries and principles of the exemplary arrangements, the manner in which they are constructed and operated, and the advantages and useful results attained, the new and useful features, devices, elements, arrangements, parts, combinations, systems, equipment, operations, methods, processes and relationships are set forth in the appended claims.

We claim:

1. Apparatus comprising:
at least one valve controller, wherein the at least one valve controller includes circuitry including at least one processor, wherein the at least one valve controller is configured to control a valve used in liquid connection with a liquid treatment tank, wherein the liquid treatment tank is configured to house regeneratable liquid treatment material,
wherein the valve comprises:
a valve body, wherein the valve body includes
a plurality of fluid ports,
wherein the ports include
a liquid inlet port (A), wherein the liquid inlet port is configured to be operatively connected to a source of liquid at elevated pressure,
a treated liquid outlet port (B), wherein the treated liquid outlet port is configured to be operatively connected to at least one treated liquid use device,
a drain port (C), wherein the drain port is configured to be operatively connected to a waste liquid drain,
a first tank port (D), wherein the first tank port is configured to be operatively connected to a first area of the tank disposed on a first side of the liquid treatment material in the tank,
a second tank port (E), wherein the second tank port is configured to be operatively connected to a second area of the tank disposed on a second side of the liquid treatment material in the tank,
a further port (F), wherein the further port is configured to be in operative connection with a further tank that houses regeneration material usable to regenerate the treatment material, wherein the regeneration material is introduced to the further tank as a solid material that is soluble in the liquid,
at least one movable valve element in operative connection with the valve body,
a plurality of flow cavities within the valve body, wherein the at least one valve element is in operative connection with the plurality of flow cavities, wherein selected ports are enabled to be in fluid connection through the flow cavities,
at least one motor in operative connection with the at least one valve controller, wherein the at least one valve controller is operative to cause the at least one motor to selectively move the at least one valve element to a plurality of positions, wherein
in a service position ports A and D, and ports E and B are in fluid flow connection through the valve body, whereby liquid received through the inlet port A is enabled to be treated by passing through the treatment material and delivered from the valve through the treated liquid outlet port B,
in a backwash position ports A and E, and ports D and C are in fluid flow connection through the valve body, whereby liquid received through the inlet port A is enabled to backwash the treatment material and be discharged through the drain port C,
in a rinse position ports A and D, and ports E and C are in fluid flow connection through the valve body, whereby liquid received through the inlet port A is enabled to rinse the treatment material by passing therethrough and be discharged through the drain port C,
in a treated liquid delivery position ports A and D, and ports E, B and F are in fluid flow connection through the valve body,
wherein the at least one valve controller is operative to cause an amount of treated liquid to be delivered through port F to the further tank, and then to cease delivery of treated liquid to the further tank,
wherein the at least one valve controller is configured to be in operative connection with a pressure sensor, wherein the pressure sensor is positioned in an interior area of the further tank and below a top liquid level,
wherein the at least one valve controller is operative to cause
responsive at least in part to the pressure sensor, sensed pressure to be determined at a plurality of different times, wherein the plurality of different times include
a first time, wherein the first time has a corresponding relationship to cessation of delivery of treated liquid to the further tank, and
a second time, wherein the second time is subsequent to the first time but prior to further liquid or regeneration material being added to the further tank subsequent to the first time,
evaluation of an increase in sensed pressure between the first time and the second time,
determination of at least one condition responsive at least in part to the increase.

2. The apparatus according to claim 1
wherein the evaluation of the increase in sensed pressure includes comparison of the increase and a threshold and the determination includes that the increase is at least one of at or below the threshold,
responsive at least in part to the determination, the at least one valve controller is operative to cause output of at least one fault signal indicative of a deficiency in availability of liquid saturated with regeneration material usable to regenerate the treatment material in the further tank.

3. The apparatus according to claim 1
wherein the condition corresponds to the liquid in the further tank being saturated with regeneration material,
wherein responsive at least in part to the determination the at least one valve controller is selectively operative to move the at least one valve element to a regeneration material introduction position, wherein in the regeneration material introduction position further port F is in fluid flow connection through the valve body with one of ports D and E, and the other of ports D and E is in fluid flow connection through the valve body with the drain port C, wherein regeneration material dissolved in the liquid is enabled to flow from the further tank port through the valve body and out of one of ports D and E, and after passage through the treatment material, is received into the valve through the other of the ports D and E and is then discharged through the drain port C.

4. The apparatus according to claim 1
wherein the at least one valve controller is configured to be in operative connection with a temperature sensor, wherein the temperature sensor is operative to sense temperature in an area proximate to the further tank,
wherein the at least one valve controller is further operative to:
determine current temperature responsive at least in part to the temperature sensor,
vary an elapsed time between the first time and the second time responsive at least in part to the determined current temperature.

5. The apparatus according to claim 1
wherein the at least one valve controller is configured to be in operative connection with a temperature sensor, wherein the temperature sensor is operative to sense temperature corresponding to temperature of liquid in the further tank,
wherein the at least one valve controller is further operative to:
determine temperature responsive at least in part to the temperature sensor,
vary an elapsed time between the first time and the second time responsive at least in part to the determined temperature.

6. The apparatus according to claim 1
wherein the evaluation includes determination of a rate of sensed pressure increase as a function of time.

7. The apparatus according to claim 1
wherein the at least one valve controller is operative to
determine a rate of increase in sensed pressure as a function of time, and
determine the second time responsive at least in part to the rate of increase being below a set value.

8. The apparatus according to claim 1
wherein the first time corresponds to cessation of delivery of treated liquid to the further tank, and the second time is a controller determined time after the first time.

9. The apparatus according to claim 1
wherein the at least one valve controller is operative to cause
responsive at least in part to the pressure sensor, a liquid fill pressure increase to be determined during at least a portion of the valve controller operating to cause delivery of treated liquid through port F and prior to cessation of delivery of treated liquid to the further tank,
comparison of the liquid fill pressure increase and a threshold,
a deficiency determination that the liquid fill pressure increase is at least one at or below the threshold,
responsive at least in part to the deficiency determination, output of at least one fault signal indicative of a deficiency in the ability of the valve to deliver treated liquid to the further tank.

10. The apparatus according to claim 1
wherein the at least one valve controller is operative to cause
responsive at least in part to the pressure sensor, a liquid fill pressure to be determined during at least a portion of the valve controller operating to cause delivery of treated liquid through port F to the further tank, comparison of the liquid fill pressure and a threshold, cessation of delivery of treated liquid from the valve to the further tank responsive at least in part to the liquid fill pressure having a predetermined relationship to the threshold.

11. The apparatus according to claim 1
wherein the at least one valve controller is configured to be in operative connection with a temperature sensor, wherein the temperature sensor is operative to sense temperature in an area proximate to the further tank,
wherein the at least one valve controller is operative to
responsive at least in part to the temperature sensor, determine a current temperature, and
cause the valve to be in the treated liquid delivery position for a treated liquid delivery time, whereby the amount of treated liquid is delivered to the further tank during the treated liquid delivery time, wherein the treated liquid delivery time is determined responsive at least in part to the determined current temperature, whereby the amount of liquid delivered is varied responsive to current temperature.

12. The apparatus according to claim 1
wherein the at least one valve controller is configured to be in operative connection with a temperature sensor, wherein the temperature sensor is operative to sense temperature in an area proximate to the further tank,
wherein the valve controller is operative to
responsive at least in part to the temperature sensor, determine a current temperature,
cause the amount of treated liquid delivered to the further tank to be determined, wherein the amount is determined responsive at least in part to the determined current temperature.

13. The apparatus according to claim 1
wherein the at least one valve controller is configured to be in operative connection with a liquid presence sensor in operative connection with an interior area of the further tank at a tank full level,
wherein the at least one valve controller is operative to cause
at least one change of position of the at least one valve element to cause cessation of delivery of treated liquid to the further tank responsive at least in part to detection of liquid by the liquid presence sensor.

14. The apparatus according to claim 1
wherein the at least one valve controller is selectively operative to cause
the at least one valve element to be in a regeneration material introduction position, wherein in the regeneration material introduction position further port F is in fluid flow connection with one of ports D and E, and the other of ports D and E is in fluid flow connection with the drain port C, wherein regeneration material dissolved in the liquid is enabled to flow from the further tank through the valve and out of one of ports D and E, and after passage through the treatment material, is received into the valve through the other of the ports D and E and is then discharged through the drain port C,
responsive at least in part to the pressure sensor, further evaluation of a decrease in sensed pressure during at least a portion of a time the at least one valve element is in the regeneration material introduction position,
determination of at least one further condition responsive at least in part to the decrease.

15. The apparatus according to claim 1
wherein the at least one valve controller is selectively operative to cause
the at least one valve element to be in a regeneration material introduction position, wherein in the regeneration material introduction position further port F is in fluid flow connection through the valve body with one of ports D and E, and the other of ports D and E is in fluid flow connection through the valve body with the drain port C, wherein regeneration material dissolved in the liquid is enabled to flow from the further tank through the valve and out of one of ports D and E, and after passage through the treatment material, is received into the valve through the other of the ports D and E and is then discharged through the drain port C,
responsive at least in part to the pressure sensor, determination of at least one further sensed pressure during at least a portion of a time the at least one valve element is in the regeneration material introduction position,
comparison of the at least one further sensed pressure and at least one threshold,
a further determination that the at least one further sensed pressure and the at least one threshold have a predetermined relationship, wherein the predetermined relationship is indicative of inadequate delivery of dissolved regeneration material from the further tank to the valve,
responsive at least in part to the further determination, output of at least one further fault signal indicative of the inadequate delivery of dissolved regeneration material from the further tank to the valve.

16. The apparatus according to claim 1
wherein the at least one valve controller is selectively operative to cause
the at least one valve element to be in a regeneration material introduction position, wherein in the regeneration material introduction position further port F is in fluid flow connection through the valve body with one of ports D and E, and the other of ports D and E is in fluid flow connection to the valve body with the drain port C, wherein regeneration material dissolved in the liquid received from the further tank is enabled to flow through the valve and out of one of ports D and E, and after passage through the treatment material, is received into the valve through the other of the ports D and E and is then discharged through the drain port C,
responsive to the pressure sensor, determination of a plurality of further sensed pressures corresponding a plurality of further different times while the at least one valve element is in the regeneration material introduction position,
comparison of data corresponding to the plurality of further sensed pressures and at least one threshold,
a further determination that the plurality of further sensed pressures and the at least one threshold have a predetermined relationship, wherein the predetermined relationship is indicative of inadequate delivery of dissolved regeneration material from the further tank to the valve,
responsive at least in part to the further determination, output of at least one further fault signal indicative of the inadequate delivery of dissolved regeneration material from the further tank to the valve.

17. The apparatus according to claim 1
wherein the at least one valve controller is selectively operative to cause
the at least one valve element to be in a regeneration material introduction position, wherein in the regeneration material introduction position port F is in fluid flow connection through the valve body with one of ports D and E, and the other of ports D and E is in fluid flow connection to the valve body with the drain port C, wherein regeneration material dissolved in the liquid received from the further tank is enabled to flow through the valve and out of one of ports D and E, and after passage through the treatment material, is received into the valve through the other of the ports D and E and is then discharged through the drain port C,
responsive at least in part to the pressure sensor, determination of at least one further sensed pressure while the at least one valve element is in the regeneration material introduction position,
comparison of the at least one further sensed pressure and at least one threshold,
a further determination that the at least one further sensed pressure and the at least one threshold have a predetermined relationship, wherein the predetermined relationship is indicative of adequate delivery of dissolved regeneration material from the further tank to the valve,
responsive at least in part to the further determination, a change in position of the at least one valve element such that dissolved regeneration material from the further tank is no longer passed through the valve body.

18. The apparatus according to claim 1
wherein the valve controller is configured to be in operative connection with a regeneration material level sensor located in the further tank, wherein the regeneration material level sensor is operative to detect a material level of the regeneration material within the further tank,
wherein the at least one valve controller is further operative to cause
responsive at least in part to the regeneration material level sensor, determination a regeneration material level,
comparison of the determined regeneration material level and a threshold, wherein the threshold corresponds to an adequate regeneration material level in the tank to provide sufficient dissolved regeneration material,
a further determination responsive to the comparison that the determined regeneration material level is at least at the threshold,
wherein responsive at least in part to the further determination, output of at least one signal is indicative that regeneration material to produce sufficient dissolved regeneration material is present in the further tank.

19. The apparatus according to claim 1
wherein the at least one valve controller is configured to be in operative connection with a regeneration material level sensor located in the further tank, wherein the regeneration material level sensor is operative to detect a material level of the regeneration material within the further tank,
wherein the at least one valve controller is further operative to cause
responsive at least in part to the regeneration material level sensor, determination of a regeneration material level,
comparison of the determined regeneration material level and a threshold, wherein the threshold corresponds to an inadequate regeneration material level in the tank to provide sufficient dissolved regeneration material,
a further determination responsive to the comparison that the determined regeneration material level is not at least at the threshold,
wherein responsive at least in part to the further determination, output of at least one fault signal is indicative that inadequate regeneration material to produce sufficient dissolved regeneration material is present in the further tank.

20. The apparatus according to claim 1
wherein the at least one valve controller is configured to be in operative connection with an inflow valve, wherein the inflow valve is fluidly intermediate of further port F and the further tank,
wherein the at least one valve controller is further operative to cause
the inflow valve to change from an open condition to a closed condition to cause cessation of delivery of treated liquid to the further tank.

21. The apparatus according to claim 1
wherein the at least one valve controller is configured to be in operative connection with
an inflow valve, wherein the inflow valve is fluidly intermediate of further port F and the further tank,
a liquid presence sensor, wherein the liquid presence sensor is in fluid connection with an interior area of the further tank at a tank full level,
wherein the at least one valve controller is further operative to cause
the inflow valve to change from an open condition to a closed condition to cause cessation of delivery of treated liquid to the further tank responsive at least in part to the liquid presence sensor sensing liquid at the tank full level.

22. The apparatus according to claim 1
wherein the at least one valve controller is configured to be in operative connection with an inflow valve, wherein the inflow valve is fluidly intermediate of port F and the further tank,
wherein the at least one valve controller is further operative to cause
the inflow valve to change from an open condition to a closed condition to cause cessation of delivery of treated liquid to the further tank responsive at least in part to a sensed pressure level sensed by the pressure sensor, wherein the sensed pressure level corresponds to the amount of treated liquid being in the further tank.

23. The apparatus according to claim 1
wherein the at least one valve controller is configured to be in operative connection with an inflow valve, wherein the inflow valve is fluidly intermediate of port F and the further tank,
wherein the at least one valve controller is further operative to cause
the inflow valve to change from an open condition to a closed condition to cause cessation of delivery of treated liquid to the further tank responsive at least in part to a sensed pressure level sensed by the pressure sensor.

24. The apparatus according to claim 1
wherein the at least one valve controller includes
a master controller, and a valve slave controller,
wherein the master controller wirelessly communicates with a plurality of slave controllers including the valve slave controller,
wherein the valve slave controller is in operative connection with the at least one motor and is operative to control the at least one motor responsive to wireless communication with the master controller.

25. Apparatus comprising:
at least one valve controller, wherein the at least one valve controller includes circuitry including at least one processor, wherein the at least one valve controller is configured to control at least one valve used in liquid connection with a liquid treatment tank, wherein the liquid treatment tank is configured to house regeneratable liquid treatment material,
wherein the at least one valve includes
a plurality of fluid ports, wherein the ports include
a liquid inlet port (A), wherein the liquid inlet port is configured to be operatively connected to a source of liquid at elevated pressure,
a treated liquid outlet port (B), wherein the treated liquid outlet port is configured to be operatively connected to at least one treated liquid use device,
a drain port (C), wherein the drain port is configured to be operatively connected to a waste liquid drain,
a first tank port (D), wherein the first tank port is configured to be operatively connected to a first area of the tank disposed on a first side of the liquid treatment material in the tank,
a second tank port (E), wherein the second tank port is configured to be operatively connected to a second area of the tank disposed on a second side of the liquid treatment material in the tank,
a further port (F), wherein the further port is configured to be in operative connection with a further tank that houses regeneration material usable to regenerate the treatment material, wherein the regeneration material is introduced to the further tank as a solid material that is soluble in the liquid,
at least one movable valve element within the at least one valve,
at least one motor in operative connection with the at least one valve controller, wherein the at least one motor is operative to cause the at least one valve element to be positioned a plurality of different positions corresponding to respective liquid flow conditions, wherein
in a service condition ports A and D, and ports E and B are in fluid flow connection, whereby liquid received through the inlet port A is enabled to be treated by passing through the treatment material and delivered from the at least one valve through the treated liquid outlet port B,
in a backwash condition ports A and E, and ports D and C are in fluid flow connection, whereby liquid received through the inlet port A is enabled to backwash the treatment material and be discharged through the drain port C,
in a rinse condition ports A and D, and ports E and C are in fluid flow connection, whereby liquid received through the inlet port A is enabled to rinse the treatment material by passing therethrough and be discharged through the drain port C,
in a treated liquid delivery condition ports A and D, and ports E and F are in fluid flow connection,
wherein the at least one valve controller is operative to position the at least one valve element in the treated liquid delivery condition to cause an amount of the treated liquid to be delivered through the further port F to an interior area of the further tank, and then position the at least one valve element to cease delivery of treated liquid to the further tank,
wherein the at least one valve controller is configured to be in operative connection with a pressure sensor, wherein the pressure sensor is positioned in operative connection with an interior area of the further tank and below a top liquid level,
wherein the at least one valve controller is operative to cause
sensed pressure to be determined responsive at least in part to the pressure sensor at a plurality of different times, wherein the plurality of times include
a first time, wherein the first time has a corresponding relationship to cessation of delivery of treated liquid to the further tank, and
a second time, wherein the second time is subsequent to the first time and prior to further liquid or regeneration material being added to the further tank subsequent to the first time,
determination of at least one condition responsive at least in part to an increase in sensed pressure between the first time and the second time.

26. The apparatus according to claim 25
wherein the condition corresponds to liquid in the further tank being saturated with the regeneration material.

27. The apparatus according to claim 25
wherein the at least one valve controller is further operative to cause
comparison of the pressure increase and a threshold,
further determination that the sensed pressure increase has a predetermined relationship to the threshold,
responsive at least in part to the further determination, output of at least one signal indicative of a deficiency in availability of dissolved regeneration material usable to regenerate the treatment material in the further tank.

28. The apparatus according to claim 25
wherein the at least one valve controller is configured to be in operative connection with at least one temperature sensor, wherein the at least one temperature sensor is operative to sense at least one sensed temperature that corresponds to temperature of liquid in the further tank,
wherein the at least one valve controller is further operative to cause
an elapsed time between the first time and the second time to be determined responsive at least in part to the at least one sensed temperature.

29. The apparatus according to claim 25
wherein the at least one valve controller is configured to be in operative connection with at least one temperature sensor, wherein the at least one temperature sensor is operative to sense at least one sensed temperature corresponding to temperature of liquid in the further tank,
wherein the at least one valve controller is further operative to cause
the amount of liquid delivered into the interior area of the tank to be determined responsive at least in part to the at least one sensed temperature.

30. The apparatus according to claim 25
wherein the at least one valve controller is further operative to cause
the cessation of delivery of treated liquid to the further tank responsive at least in part to the pressure sensor.

31. The apparatus according to claim 25
wherein the at least one valve controller is configured to be in operative connection with at least one regeneration material level sensor located in the further tank,
wherein the at least one regeneration material level sensor is operative to detect a regeneration material level of the regeneration material within the further tank,
wherein the at least one valve controller is further operative to cause
determination of a regeneration material level responsive at least in part to the at least one regeneration material level sensor,
comparison of the determined regeneration material level and a threshold, wherein the threshold corresponds to an adequate regeneration material level in the tank to provide sufficient dissolved regeneration material,
a further determination responsive at least in part to the comparison, that the determined regeneration material level has a predetermined relationship to the threshold,
wherein responsive at least in part to the further determination, the at least one signal is indicative that adequate regeneration material to produce sufficient dissolved regeneration material is present in the further tank.

32. The apparatus according to claim 25
wherein the at least one valve controller is further operative to cause
the at least one motor to position the at least one valve element in a regeneration material introduction position wherein port F is in fluid flow connection with one of ports D and E, and the other of ports D and E is in fluid flow connection with the drain port C, wherein regeneration material dissolved in the liquid is enabled to flow from the further tank and from one of ports D and E into the liquid treatment tank, and after passage through the treatment material to be discharged through the drain port C.

33. The apparatus according to claim 25
wherein the at least one valve controller is further operative to cause
the at least one motor to position the at least one valve element in a regeneration material introduction position wherein port F is in fluid flow connection with one of ports D and E, and the other of ports D and E is in fluid flow connection with the drain port C, wherein regeneration material dissolved in the liquid is enabled to flow from the further tank and from one of ports D and E into the liquid treatment tank, and after passage through the treatment material to be discharged through the drain port C,
responsive at least in part to the pressure sensor, determination of at least one further sensed pressure during at least a portion of a time period when the at least one valve element is in the regeneration material introduction condition,
comparison of the at least one further sensed pressure and at least one threshold,
a further determination that the at least one further sensed pressure and the at least one threshold have a predetermined relationship, wherein the predetermined relationship is indicative of inadequate delivery of dissolved regeneration material from the further tank to the liquid treatment tank.

34. The apparatus according to claim 25
wherein the at least one valve controller is configured to be in operative connection with at least one liquid inflow valve, wherein the at least one liquid inflow valve is configured to be in fluid connection with a Venturi injector in operative connection with the interior area of the further tank, wherein liquid flow through the liquid inflow valve is operative to draw liquid saturated with regeneration material housed in the further tank through the Venturi injector to an injector outlet,
wherein the at least one valve controller is operative to cause
the at least one motor to position the at least one valve element in a regeneration material introduction position wherein the fluid inflow valve is in an open condition and is in fluid flow connection with at least one of port A and port B, and the injector outlet is in fluid flow connection with one of ports D and E, and the other of ports D and E is in fluid flow connection with the drain port C, wherein regeneration material dissolved in the liquid is enabled to flow from the further tank and from one of ports D and E into the liquid treatment tank, and after passage through the treatment material to be discharged through the drain port C.

* * * * *